(12) United States Patent
Tagami et al.

(10) Patent No.: US 7,403,353 B2
(45) Date of Patent: Jul. 22, 2008

(54) MAGNETIC RECORDING AND REPRODUCING SYSTEM WITH RECORDING LAYER HAVING PREDETERMINED CONVEX-CONCAVE PATTERN

(75) Inventors: Katsumichi Tagami, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 382 days.

(21) Appl. No.: 11/333,505

(22) Filed: Jan. 18, 2006

(65) Prior Publication Data

US 2007/0008639 A1 Jan. 11, 2007

(30) Foreign Application Priority Data

Jul. 11, 2005 (JP) ............................. 2005-201573
Jul. 12, 2005 (JP) ............................. 2005-202987

(51) Int. Cl.
*G11B 5/596* (2006.01)
*G11B 5/09* (2006.01)
*G11B 5/82* (2006.01)

(52) U.S. Cl. ..................... 360/77.08; 360/48; 360/135
(58) Field of Classification Search ................ None
See application file for complete search history.

(56) References Cited

U.S. PATENT DOCUMENTS

| | | | |
|---|---|---|---|
| 5,590,009 A | | 12/1996 | Ishida |
| 6,051,299 A | * | 4/2000 | Uchiyama et al. ........ 428/848.5 |
| 6,583,957 B1 | | 6/2003 | Takeshita et al. |
| 6,586,044 B1 | | 7/2003 | Takeshita et al. |
| 2005/0286155 A1 | | 12/2005 | Tagami et al. |
| 2006/0007573 A1 | | 1/2006 | Tagami |
| 2006/0023329 A1 | | 2/2006 | Tagami |

FOREIGN PATENT DOCUMENTS

| | | |
|---|---|---|
| JP | 6-111502 | 4/1994 |
| JP | 10-222944 | 8/1998 |
| JP | 11-328662 | 11/1999 |
| JP | 2000-195042 | 7/2000 |

OTHER PUBLICATIONS

U.S. Appl. No. 11/333,505, filed Jan. 18, 2006, Tagami et al.

* cited by examiner

*Primary Examiner*—Joseph Feild
*Assistant Examiner*—Daniell L Negrón
(74) *Attorney, Agent, or Firm*—Oblon, Spivak, McClelland Maier & Neustadt, P.C.

(57) ABSTRACT

The invention is directed to a magnetic recording/reproducing system wherein each burst pattern in discrete media is configured in a substantially trapezoidal shape (truncated quadrangular pyramid shape, and which satisfies given relations between W1, W2, Tp and Wr. W1 is the upper side of the trapezoidal shape in the track width direction, which corresponds to the surface of said convex-form magnetic recoding layer, W2 is the lower side of the trapezoidal shape in the track width direction, which corresponds to the bottom surface of said convex-form magnetic layer, Tp is the data track pitch at the data information recording portion, and Wr is the read width of the magnetic head, so that loads on burst pattern shape in medium fabrication processes can be far more reduced and far more precise position error signals can be obtained.

27 Claims, 85 Drawing Sheets

MAGNETIC RECORDING AND REPRODUCING SYSTEM WITH RECORDING LAYER HAVING PREDETERMINED CONVEX-CONCAVE PATTERN

FIELD OF THE INVENTION

The present invention relates to a magnetic recording/reproducing system comprising a magnetic recording medium having a magnetic recording layer in a predetermined concave-convex pattern on a substrate and, hence, so-called serve areas and information data areas (a discrete type magnetic recording medium), and a magnetic head operable to detect servo signals on the medium and record and reproduce information data on and from the medium.

DESCRIPTION OF THE PRIOR ART

So far, improvements in the areal recording densities of magnetic mediums such as hard disks have been achieved by both techniques of (1) making linear recording densities higher and (2) making track densities higher. In order to achieve ever higher densities from this time on, it will be necessary to improve the recording densities based on both techniques mentioned above.

Referring here to the improvements in track densities, side fringe, crosstalk or other problems have loomed large for the reasons of limits to magnetic head processing and the spreading of magnetic heads' magnetic fields; that is, there would now be limits to the improvements in areal recording densities by technologies for improving on the track densities of magnetic heads, which are only an extension of existing tweaks.

On the other hand, improvements in the linear recording densities of current longitudinal recording media have been achieved by slimming down their layers and increasing their coercive forces. To allow media to have ever higher densities and more enhanced stability of recording magnetization against thermal fluctuations, however, attention is now directed to perpendicular magnetic recording media that meet those conditions.

Such being the case, a magnetic recording medium of the discrete track disk type with a recording layer formed in a given concave-convex pattern has been proposed as the technique for improving on areal recording densities and obtaining a backup to making magnetic heads have higher track densities. For instance, JP(A)11-328662 shows a magnetic recording medium in which a single-layer perpendicular magnetic layer is formed along a concave-convex pattern pre-formed on a substrate.

A lot narrower spacing is required to have higher recording densities. With the concave-convex configuration of the recording layer, however, there is often no stable levitation of the magnetic head, which may otherwise result in head crash or other problems. With this in mind, JP(A)10-222944 shows a recording medium having a concave-convex configuration varying in its track width direction so as to obtain the stability on levitation of a magnetic head.

Further, JP(A)2000-195042 comes up with a magnetic recording medium of the discrete type wherein to ensure the stability on levitation of a magnetic head, a non-magnetic material or other material is filled in convex sites.

Furthermore, JP(A)6-111502 teaches how to, in a longitudinal recording medium, specify relations between the width of a tracking servo burst pattern by a rectangular concave-convex structure, a track pitch and a reproducing head's read width.

Generally, a magnetic recording medium used with a magnetic disk system has a magnetic head-tracking servo area recorded by a servo track writer.

The servo area generally includes an ISG (initial signal gain) portion, an SVAM (servo address mark) portion, a gray code portion, a burst portion, and a pad portion, which are in the form of various magnetic patterns for performing their own functions, respectively.

In these magnetic patterns, the burst portion is normally recorded at about one track pitch of width in the radial direction of the magnetic recording medium. Other portions, i.e., the ISG portion, the SVAM portion, the gray portion and the pad portion are each normally recorded continuously in the disk radial-direction or continuously over at least a few or more tracks in the disk radial direction.

The burst portion is a pattern to obtain precise position information that tracks the magnetic head precisely to a track position. A pattern for such a burst portion, for instance, comprises (1) a set of the first and second bursts provided such that they equally step over a centerline for defining the adjacent track pitches, or (2) one more set of the third and fourth bursts added to the first set and offset from it by a 1/2 track pitch.

Referring here to one exemplary tracking operation of the simplest combination ever of the first and second bursts, as a magnetic head travels sequentially over the first burst and the second burst, it allows for a comparison of an output signal Sa from the first burst pattern with an output signal Sb from the second burst pattern at a differential amplifier to obtain the value of a position error signal PES=(Sa−Sb). The value of this position error signal PES=(Sa−Sb) is entered in a servo control circuit, so that depending on the magnitude of the position error signal, a tracking servo actuator is driven to operate the magnetic head in such a way as to make its center follow the center of the data track.

In the discrete media, however, the burst patterns are each a rectangular pattern. Although the rectangular patterns are ideal for obtaining accurate position error signals, yet a lot higher accuracy is required in terms of shape and dimension upon their formation.

Such demands for accuracy on formation would account for a lot more loads on media fabrication processes.

In order to provide solutions to such problems, Applicant already filed Japanese patent application No. 2004-188121 to come up with a magnetic recording/reproducing system comprising a discrete medium comprising two pairs (sets) of burst patterns, wherein each burst pattern is configured in a substantially trapezoidal shape (truncated quadrangular pyramid shape) in the track width direction and in the track circumference direction, and the magnetic recording/reproducing system satisfies given relations between W1, W2, Tp and Wr where W1 and W2 are the upper side and the lower side of the trapezoidal shape in the track width direction, which correspond to the surface and the bottom surface of a convex-form magnetic recording layer, respectively, Tp is a data track pitch at a data information recording portion, and Wr is the read width of a magnetic head. With this proposal, it is possible to provide a magnetic recording/reproducing system that incorporates a magnetic recording medium having a burst pattern shape much reduced in loads on medium fabrication processes yet capable of obtaining more precise position error signals.

The situation being like this, (1) the invention according to the first group in this application, and (2) the invention according to the second group in this application has been accomplished.

(1) Regarding the discrete media already proposed by Applicant and comprising two pairs (sets) of burst patterns, it has experimentally been found that there is a range of optimum exploitation even when there is a change in the track pitch vs. burst pitch relation. The object of the invention according to the first group is to seek protection for that wide range of exploitation. In other words, the object of the invention is to provide a magnetic recording/reproducing system that incorporates a magnetic recording medium having a burst pattern shape that, even when used in a much wider range of exploitation, is much more reduced in loads on medium fabrication processes yet capable of obtaining far more precise position error signals.

(2) The object of the invention according to the second group is to provide a magnetic recording/reproducing system that incorporates a magnetic recording medium having a burst pattern shape that, even when a variety of track pitch vs. burst pitch relations are involved, is far much more reduced in loads on medium fabrication processes yet capable of obtaining far more precise position error signals, With the addition of one or more burst patterns, it is possible to make a practical range capable of obtaining far more precise position error signals so wider that the range of flexibility in system designs can be made wider.

SUMMARY OF THE INVENTION

The object referred to at (1) above is accomplished by the inventions according to the first group, as embodied lust below.

There is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst and a fourth burst, each comprising a plurality of convex-form magnetic recording layers with the burst signals recorded thereon, said first burst and said second burst in pair form are located such that the convex-form magnetic recording layers are formed with centerlines defined at positions mutually offset by two track pitches of distance (2Tp) in a track width direction, said third burst and said fourth burst in pair form are located such that the convex-form magnetic recording layers are formed with centerlines defined at positions mutually offset by two track pitches of distance (2Tp) in the track width direction, and said third burst and said fourth burst are located such that the convex-form magnetic recording layers are formed with centerlines defined at positions offset from centerlines of said first burst and said second burst by one track pitch of distance (1Tp), said convex-form magnetic layers are each configured in a substantially trapezoidal shape (truncated quadrangular pyramid shape) in the track width direction and in a track circumference direction, respectively, and said magnetic recording/reproducing system satisfies the following condition provided that W1>Tp:

$$1.25W2 > Wr \geq 0.5W2$$

where $W1$ is an upper side of said trapezoidal shape in the track width direction, which corresponds to a surface of said convex-form magnetic recoding layer, $W2$ is a lower side of said trapezoidal shape in the track width direction, which corresponds to a bottom surface of said convex-form magnetic layer, $Tp$ is a data track pitch at said data information recording portion, and $Wr$ is a read width of said magnetic head.

There is also provided a magnetic recording/reproducing system, comprising a magnetic recording medium having a data information recording portion and a servo information portion for tracking, and a magnetic head operable to-detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst and a fourth burst, each comprising a plurality of convex-form magnetic recording layers with the burst signals recorded thereon, said first burst and said second burst in pair form are located such that the convex-form magnetic recording layers are formed with centerlines defined at positions mutually offset by a (2/3) track pitch of distance ((2/3)Tp) in a track width direction, said third burst and said fourth burst in pair form are located such that the convex-form magnetic recording layers are formed with centerlines defined at positions mutually offset by a (2/3) track pitch of distance ((2/3)Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp), said convex-form magnetic layers are each configured in a substantially trapezoidal shape (truncated quadrangular pyramid shape) in the track width direction and in a track circumference direction, respectively, and said magnetic recording/reproducing system satisfies the following condition provided that Tp>W2:

$$1.5W2 \geq Wr \geq 0.5W1$$

where $W1$ is an upper side of said trapezoidal shape in the track width direction, which corresponds to a surface of said convex-form magnetic recoding layer, $W2$ is a lower side of said trapezoidal shape in the track width direction, which corresponds to a bottom surface of said convex-form magnetic layer, $Tp$ is a data track pitch at said data information recording portion, and $Wr$ is a read width of said magnetic head.

Preferably in the inventions according to the first group, the magnetic recording/reproducing system satisfies the following condition:

$$\tan 85° \geq 2h/(W2-W1) \geq \tan 50°$$

where h is a height from the lower side W2 of to the upper side W1 of the convex-form magnetic recording layer.

Preferably in the inventions according to the first group, the magnetic recording/reproducing system satisfies the following condition:

$$Wr<2Tp-W$$

where W is a data track width, Wr is the magnetic read width, and Tp is the track pitch.

The object referred to at (2) above is accomplished by the inventions according to the second group, as embodied just below.

There is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by one track pitch of distance (1Tp) in a track width direction, said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp), said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp), said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that Tp>W2:

$$2W2>Wr \geq 0.5W2$$

$$0.5W2<W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

There is also provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by one track pitch of distance (1Tp) in a track width direction, said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp), said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp), said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that Tp=W2:

$$2W2-W1 \geq Wr \geq 0.444W2$$

$$0.444W2<W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Further, there is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by one track pitch of distance (1Tp) in a track width direction, said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp), said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp), said convex-form magnetic layers are each configured in a substantially trapezoidal shape (truncated quadrangular pyramid shape) in the track width direction and in a track circumference direction, respectively, and said magnetic recording/reproducing system satisfies the following condition provided that Tp=W1:

$$1.5W1 \geq Wr \geq 0.444W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Further, there is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by one track pitch of distance (1Tp) in a track width direction, said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp), said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp), said convex-form magnetic layers are each configured in a substantially trapezoidal shape (truncated quadrangular pyramid shape) in the track width direction and in a track circumference direction, respectively, and said magnetic recording/reproducing system satisfies the following condition provided that Tp<W1:

$$1.5W1 \geq Wr \geq 0.333W2$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Further, there is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by a (3/4) track pitch of distance ((3/4)Tp) in a track width direction, said third burst and said fourth burst in pair form are located such that the convex-form magnetic recording layers are formed with centerlines defined at positions mutually offset by a (3/4) track pitch of distance ((3/4)Tp) in the track width direction, and said third burst and said fourth burst are located such that the convex-form magnetic recording layers are formed with centerlines defined at positions offset from centerlines of said first burst and said second burst by a (1/4) track pitch of distance ((1/4)Tp), said fifth burst and said sixth burst in pair form are located such that the convex-form magnetic recording layers are formed with centerlines defined at positions mutually offset by a (3/4) track pitch of distance ((3/4)Tp) in the track width direction, and said fifth burst and said sixth burst are located such that the convex-form magnetic recording layers are formed with centerlines defined at positions offset from centerlines of said first burst and said second burst by a (1/2) track pitch of distance ((1/2)Tp), said convex-form magnetic layers are each configured in a substantially trapezoidal shape (truncated quadrangular pyramid shape) in the track width direction and in a track circumference direction, respectively, and said magnetic recording/reproducing system satisfies the following condition provided that Tp>W2:

$$1.5W2 \geq Wr \geq 0.5W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Further, there is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by (3/2) track pitches of distance ((3/2)Tp) in a track width direction, said third burst and said fourth burst in pair form are located such that the convex-form magnetic recording layers are formed with centerlines defined at positions mutually offset by (3/2) track pitches of distance ((3/2)Tp) in the track width direction, and said third burst and said fourth burst are located such that the convex-form magnetic recording layers are formed with centerlines defined at positions offset from centerlines of said first burst and said second burst by a (1/2) track pitch of distance ((1/2)Tp), said fifth burst and said sixth burst in pair form are located such that the convex-form magnetic recording layers are formed with centerlines defined at positions mutually offset by (3/2) track pitches of distance ((3/2)Tp) in the track width direction, and said fifth burst and said sixth burst are located such that the convex-form magnetic recording layers are formed with centerlines defined at positions offset from centerlines of said first burst and said second burst by one track pitch of distance (1Tp), said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that W1>Tp:

$$1.5W2 > Wr \geq 0.333W2$$

$$0.333W2 < W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Further, there is provided a magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by three track pitches of distance (3Tp) in a track width direction, said third burst and said fourth burst in pair form are located such that the convex-form magnetic recording layers are formed with centerlines defined at positions mutually offset by three track pitches of distance (3Tp) in the track width direction, and said third burst and said fourth burst are located such that the convex-form magnetic recording layers are formed with centerlines defined at positions offset from centerlines of said first burst and said second burst by one track pitch of distance (1Tp), said fifth burst and said sixth burst in pair form are located such that the convex-form magnetic recording layers are formed with centerlines defined at positions mutually offset by three track pitches of distance (3Tp) in the track width direction, and said fifth burst and said sixth burst are located such that the convex-form magnetic recording layers are formed with centerlines defined at positions offset from centerlines of said first burst and said second burst by two track pitches of distance (2Tp), said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that W1>Tp:

$$1.5W2 > Wr \geq 0.444W2$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

Preferably in the inventions according to the second group, the magnetic recording/reproducing system satisfies the following condition:

$$\tan 85° \geq 2h/(W2-W1) \geq \tan 50°$$

where h is a height from the lower side W2 of to the upper side W1 of the convex-form magnetic recording layer.

Preferably in the inventions according to the second group, the magnetic recording/reproducing system satisfies the following condition:

$$Wr < 2Tp - W$$

where W is a data track width, Wr is the magnetic read width, and Tp is the track pitch.

DETAILED EXPLANATION OF THE INVENTION

The present invention is now explained in details with reference to its embodiments.

First of all, the first group of the invention is explained at great length.

(1) Invention of the First Group in this Application

The magnetic recording/reproducing system of the invention is built up of a magnetic recording medium comprising a data information recording portion and a servo information portion for tracking, and a magnetic head operable to detect servo information on the servo information portion and to record and reproduce data information on and from the data information recording portion.

To make those skilled in the art have an understanding of the whole structure of the system, one exemplary structure of the magnetic recording/reproducing system is now explained with reference to FIG. 6.

Figure 6:
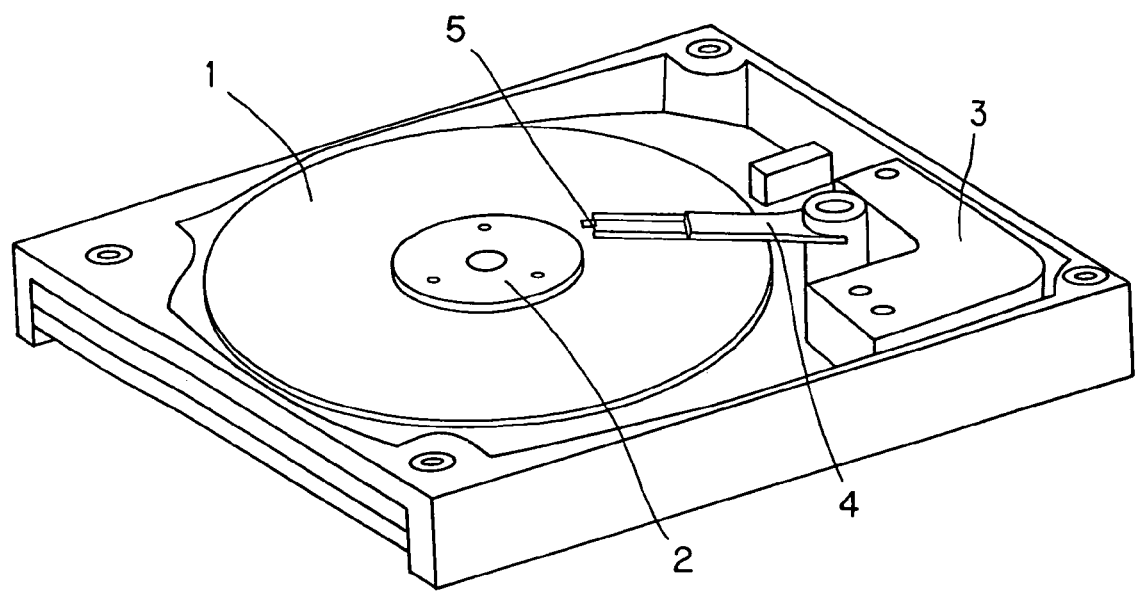
FIG. 6 is illustrative in schematic perspective of a magnetic recording/reproducing system.

Explanation of One Exemplary Structure Of The Magnetic Recording/Reproducing System FIG. 6 is illustrative in schematic perspective of the magnetic recording/reproducing system that is one embodiment of the invention. In FIG. 6, reference numeral 1 stands for a magnetic recording medium for which a disk-shaped perpendicular magnetic recording medium (discrete medium) is used. This medium is rotationally driven by a spindle motor 2.

In order to read and write data from and to the magnetic recording medium, a recording/reproducing magnetic head 5 is attached to the free end of a rotating arm 4 that extends from the outer periphery to the center of the medium. The rotating arm 4 is rotated by a voice coil motor 3 so that the magnetic head 5 can be positioned at a given track, for instance, in response to servo signals detected by the recording/reproducing magnetic head 5.

The recording/reproducing magnetic head 5 comprises a recording device and a reproducing device. For instance, a single pole head of the main pole excitation type is used as the recording device, and a GMR (giant magneto-resistance effect) head is used as the reproducing device. Instead of the GMR head, a TMR (tunneling magneto-resistance effect) head or the like could be used.

While one example of the magnetic recording medium used herein is explained with reference to a perpendicular magnetic recording medium, it is understood that the invention could be applied to a so-called longitudinal recording medium.

Explanation of the Magnetic Recording Medium

The construction of the magnetic recording medium is now explained.

Figure 1:
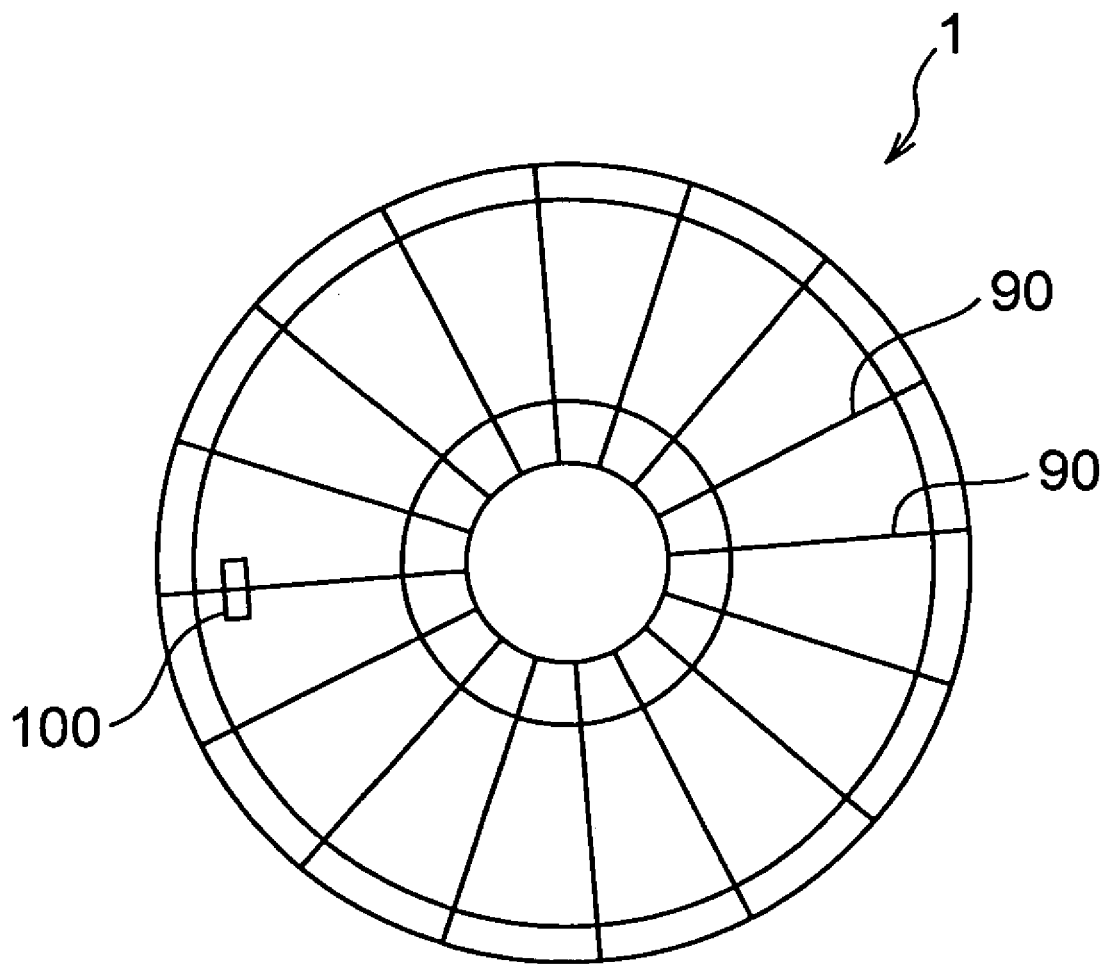
FIG. 1 is illustrative in schematic plan of the whole shape of one disk-shaped magnetic recording medium according to the invention.
Figure 2:
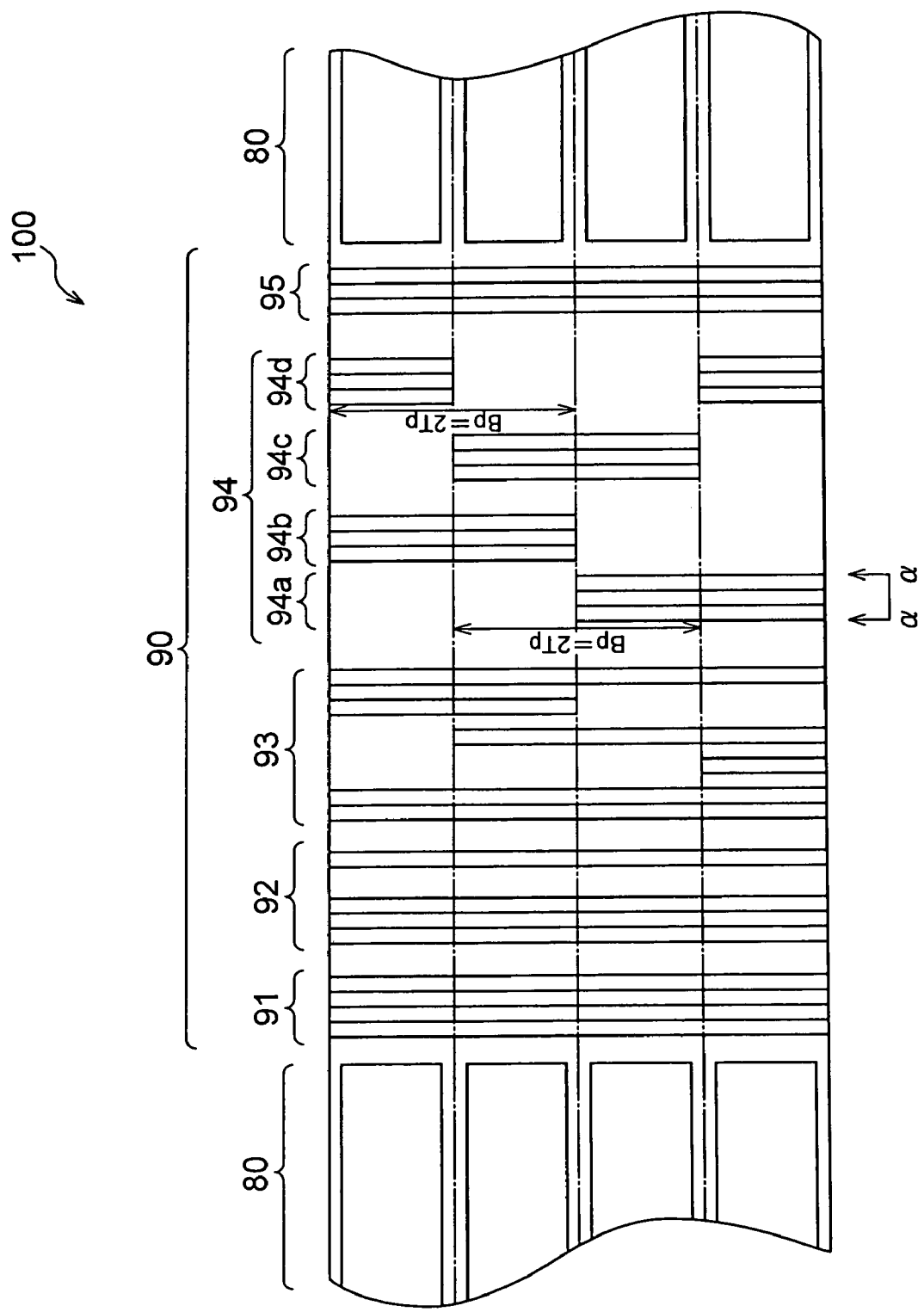
FIG. 2 is an enlarged schematic view of the small area surrounded by a rectangle in FIG. 1.

FIG. 1 is illustrative in schematic plan of the whole configuration of a disk-shaped magnetic recording medium 1 used herein, and FIG. 2 is an enlarged schematic view of a small area 100 surrounded by a rectangle in FIG. 1. In FIG. 2, a serve information portion 90 that is an area with servo signals recorded and a data information recording portion 80 that is a group of data tracks for recording and reproducing purposes are illustrated in conception.

Figure 3:
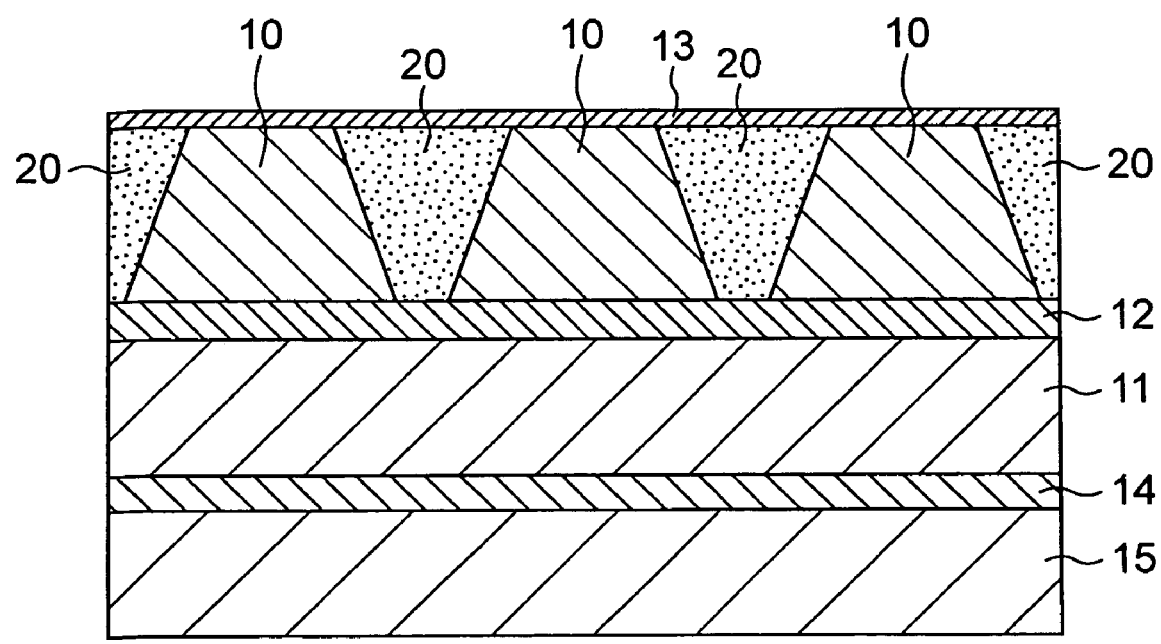
FIG. 3 is a sectional view illustrative in section of one preferred embodiment of the magnetic recording medium of the invention.

FIG. 3 is illustrative in section of a preferred embodiment of the magnetic recording medium according to the invention. In other words, FIG. 3 is substantially tantamount to a sectional view taken on α-α arrows in FIG. 2.

Although not shown in FIG. 1, a plurality of data track groups for recording and reproducing purposes are concentrically located and formed on a disk substrate.

A servo signal area (a servo information portion 90 indicated by a radial line) is formed outwardly from the center of the disk. To put it another way, the so-called sector servo arrangement wherein the disk surface is divided into sectors is applied. Servo information is then recorded on the servo information portion 90 of the magnetic recording medium by means of a servo tracking writer.

Referring in detail to the structure of the servo information portion 90, the servo information portion (the so-called servo area) comprises an ISG division 91, an SVAM division 92, a gray code division 93, a burst division 94, and a pad division 95, as depicted in FIG. 2.

The ISG (initial signal gain) division 91 is in the form of a continuous pattern provided for eliminating variations in the magnetic properties of a magnetic film (magnetic layer) in the magnetic recording medium, and the amount of levitation of the magnetic head. That division 91 is continuously formed in the track radial direction. While such ISG division 91 is subjected to reproducing operation by the magnetic head, the gain of a servo demodulation circuit is determined by an automatic gain control (AGC) to implement correction of output variations due to the magnetic recording medium or the magnetic head. The automatic gain control (AGC) that implements such operation is turned off upon detection of the SVAM (servo address mark) division 92 in the servo area, enabling the reproduction amplitude in the next bust division 94 to be standardized at the amplitude of the ISG division 91.

The gray code division 93 has information on each track number and each sector number recorded in it.

The burst division 94 is a pattern for obtaining precise position information that precisely tracks the magnetic head to a track position. As depicted in FIG. 2 as an example, that pattern comprises a set of a first burst 94a and a second burst 94b (in pair form) each equally stepping over a centerline provided at two track pitches of spacing, and a set of a third burst 94c and a fourth burst 94b (in pair form) found at a position offset or shifted from the first set by one track pitch of distance.

In other words, the first burst 94a and the second burst 94b are located such that, as can be seen from one embodiment of FIG. 2, convex-form magnetic recording layers are formed with centerlines mutually defined by positions offset or shifted by two track pitches of distance (i.e., Bp=2Tp where Bp is a burst pattern pitch and Tp is a track pitch). Likewise, the third burst 94c and the fourth burst 94d are located such that convex-form magnetic recording layers are formed with centerlines defined by positions offset from shifted from the centerlines of the first burst 94a and the second burst 94b by one track pitch of distance (i.e., Bp=2Tp). The radial length of the first burst 94a, the second burst 94b, the third burst 94c, and the fourth burst 94d is equal to two tracks of distance. In connection with the fourth burst 94d, note that, in FIG. 2, it is shown only with one track of length for reasons of space.

As shown, the first burst 94a to the fourth burst 94d are patterned sequentially toward the downstream side.

In the present disclosure, the first burst track (VTR1) to the fourth burst track (VTR4) will sometimes be used as an alternative term to the first burst 94a to the fourth burst 94d.

In the burst division comprising two pairs (sets) of burst patterns, the pitch Bp vs. track pitch Tp relation of burst patterns in pair form are considered in the case where Bp=2Tp, and Bp=(2/3)Tp, as discussed in detail later.

The pat division 95 is a pattern provided for taking up a delay in the demodulation circuit system in such a way as to maintain clock generation while the servo area is subjected to reproducing operation by the servo demodulation circuit.

The ISG division 91, the SVAM division 92 and the pad division 95 are recorded continuously in the disk radial direction. The gray code division 93, too, is recorded over at least a few or more tracks in the radial direction.

One preferable, exemplary sectional arrangement of the magnetic recording medium is now explained with reference to FIG. 3. FIG. 3, for instance, could be thought of as a sectional view taken on α-α arrows in FIG. 2.

As depicted from FIG. 3, the magnetic recording medium comprises a substrate 15, an orientation layer 14 formed on the substrate 15, a soft magnetic layer 11 formed on the orientation layer 14, an intermediate layer 12 formed on the soft magnetic layer 11, a perpendicular magnetic layer 10 and a nonmagnetic layer 20 both formed on the intermediate layer 12, wherein the magnetic layer 10 corresponds to a convex portion of the concave-convex arrangement and the nonmagnetic layer 20 corresponds to a concave portion thereof, and a protective layer 13 formed on the layers 10 and 20.

For the substrate 15, a glass substrate, an NiP-coated aluminum alloy substrate, an Si substrate, etc. is preferably used. The orientation layer 14, for instance, may be formed of an antiferromagnetic material such as PtMn, which applies an anisotropic magnetic field to the soft magnetic layer 11 in the track width direction. Alternatively, a nonmagnetic alloy for orientation control could be used.

The soft magnetic layer 11 may be formed of a CoZrNb alloy, a Co-based amorphous alloy, a soft magnetic/non-magnetic multilayer film, soft magnetic ferrite or the like. Alternatively, a multilayer structure with a non-magnetic layer sandwiched between nonmagnetic layers could be used.

The intermediate layer 12 is provided to control the perpendicular magnetic anisotropy and crystal grain size of the perpendicular magnetic recording layer formed on that intermediate layer. For instance, CoTi nonmagnetic alloys could be used or, alternatively, nonmagnetic metals, alloys or alloys of low permeability having similar functions could be used.

The convex-form perpendicular magnetic recording layer 10 is preferably formed of a medium obtained by incorporating ferromagnetic particles such as CoPt particles in an oxide material such as $SiO_2$ in a matrix form, CoCr-based alloys, FePt alloys, Co/Pd-based artificial lattice multilayer alloys or the like. The recording layer 10 having a function of generating servo signals in the invention is configured in a trapezoidal shape, as described later.

For the material of the concave-form nonmagnetic layer 20, nonmagnetic oxides such as $SiO_2$, $Al_2O_3$, $TiO_2$ and ferrites, nitrides such as AlN, and carbides such as SiC are used.

Usually, the protective layer 13 such as a carbon thin film is formed on the surface of the convex-form perpendicular magnetic recording layer 10 or the concave-form nonmagnetic layer 20 by means of CVD techniques or the like.

The perpendicular magnetic recording layer 10 and nonmagnetic layer 20 according to the concave-convex pattern (the so-called discrete type medium), for instance, may be formed by etching the perpendicular magnetic recording layer 10 formed with a constant thickness to a predetermined concave-convex configuration, and then sputtering $SiO_2$ corresponding to a etching depth to fill the thus etched recess with it. After that, while the medium is rotated, an excessively deposited $SiO_2$ on the perpendicular magnetic recording layer 10 is removed by oblique ion-beam etching or the like, thereby flattening the whole surface of the medium.

As depicted in FIG. 3, it is noted that the etching treatment, by which the perpendicular magnetic recording layer 10 and nonmagnetic layer 20 according to the concave-convex pattern (the so-called discrete type medium) are formed, is stopped at the bottom of the recording layer. However, the etching treatment could be implemented to the degree that the etching depth reaches the area of the soft magnetic layer 11, thereby preparing a concave-convex pattern.

Figure 4:
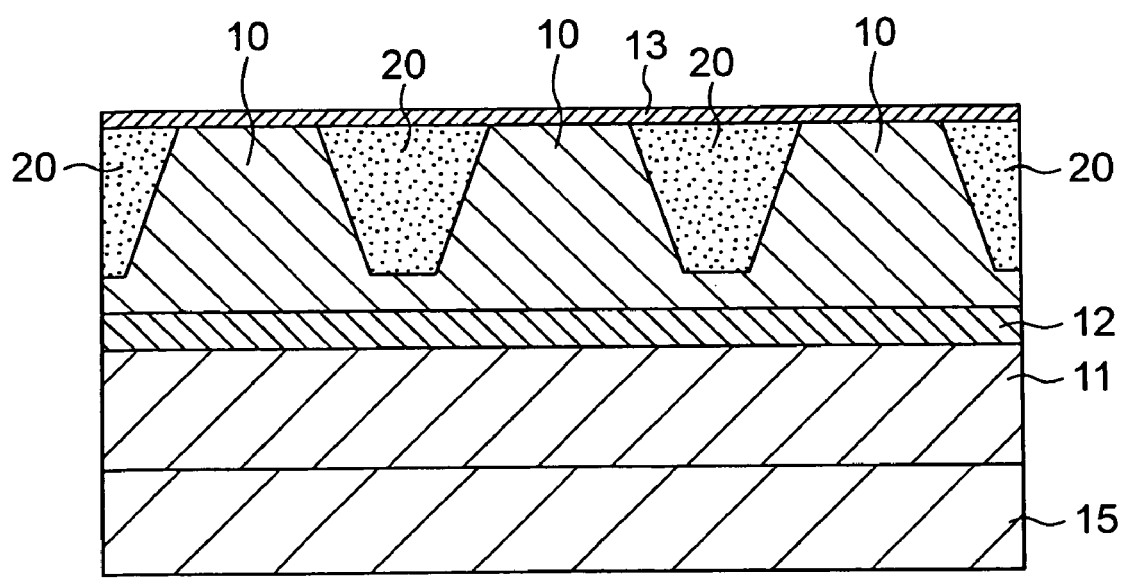
FIG. 4 is a sectional view illustrative in section of another preferred embodiment of the magnetic recording medium of the invention.

FIG. 4 shows a modification to FIG. 3. The embodiment of FIG. 4 differs from that of FIG. 3 in that when the perpendicular magnetic recording layer 10 formed with a constant thickness is etched to the predetermined concave-convex configuration, a thin magnetic layer is allowed to remain at the concave portion position without detrimental to the magnetic properties. Both the embodiments of FIGS. 4 and 3 are those of the invention, and like references in FIGS. 4 and 3 refer to like parts.

Determination of the Specifications for the Servo Area (Servo Information Portion)

The subject matter of the invention is (1) to get hold of some dimensional accuracy margin in medium fabrication processes, thereby lessening fabrication loads on accuracy, and (2) to obtain precise position error signals for tracking purposes. Two such requirements can be satisfied by configuring the burst pattern of the burst division in the servo area of the discrete medium in the form of two pairs (sets) of burst patterns, wherein each burst pattern is in a substantially trapezoidal shape (truncated quadrangular pyramid shape) in both the track width direction and the track circumference direction, and by determining the arrangement of the medium in such a way as to satisfy given relations between W1, W2, Tp and Wr, where W1 is the upper side of the trapezoidal shape in the track width direction, which corresponds to the surface of the convex-form magnetic recording layer, W2 is the lower side of that trapezoidal shape which corresponds to the bottom surface of the convex-form magnetic recording layer, Tp is a data track pitch at the data information recording portion, and Wr is the read width of the magnetic head. Note here that a trapezoidal perpendicular magnetic recording layer with the upper side having no delimited angles is acceptable.

In this connection, it is to be understood that the read width Wr of the magnetic head of the invention (the reproduction track width of the magnetic head) is defined as follows, unlike a so-called optical width dimension actually measured by SEMs or the like.

Figure 26:
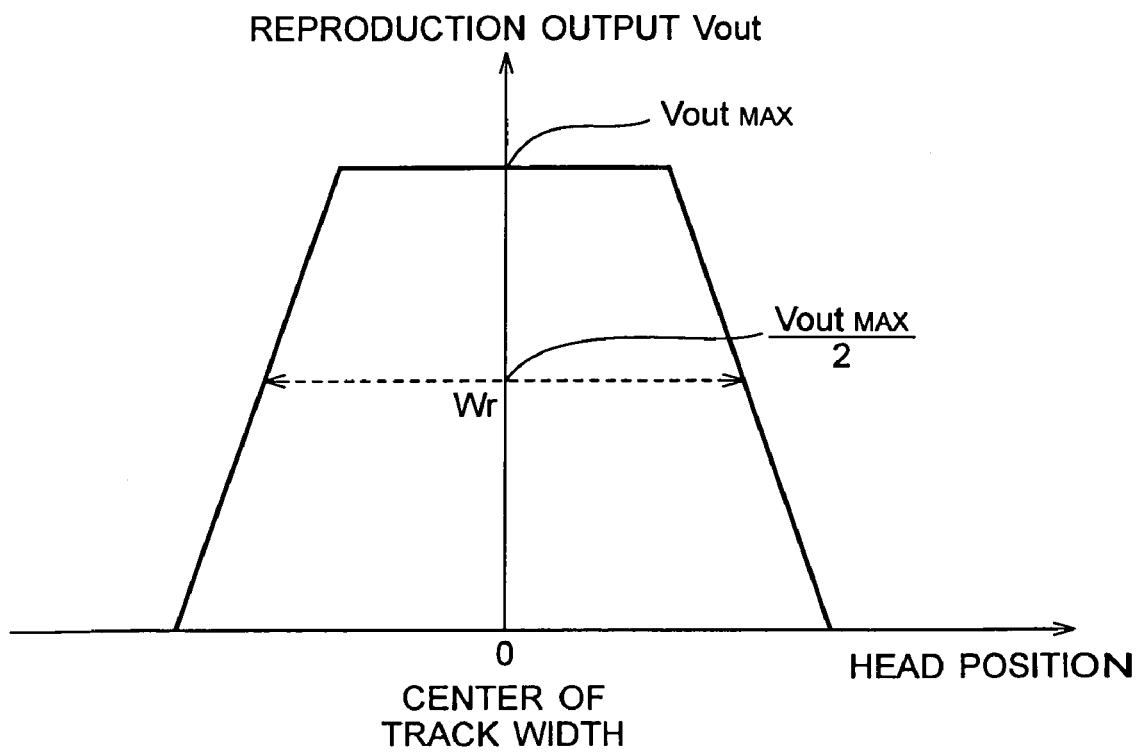
FIG. 26 is illustrative of explaining the definition of "read width Wr".

That is, a microtrack far much smaller than a write width is formed. The magnetic head is run successively in the track width direction to measure the off-track profile of a reproduction output $V_{out}$ of the magnetic head, and the width (the so-called full width at half maximum) at an output value ($V_{out Max}/2$) that is half the maximum value ($V_{out MAX}$) of $V_{out}$ is defined as the "read width Wr". FIG. 26 is a state diagram for the definition of the "read width Wr".

In two pairs (sets) of burst patterns at the burst division of the invention, each pair (set) of burst patterns are at the same pitch Bp, and the centerline of each pair (set) that determines the burst pattern pitch Bp are located in such a way as to shift successively by (1/2)Bp. The burst pattern pitch Bp is also determined in such a way as to have diverse values with respect to the data track pitch Tp at the data information recording portion. In the present disclosure, two cases of Bp=2Tp and Bp=(2/3)Tp are now considered.

The subject matter of the invention is that, in two such cases, each burst pattern is configured in a substantially trapezoidal shape (truncated quadrangular pyramid shape) in both the track width direction and the track circumference direction, wherein the arrangement of the medium is determined in such a way as to satisfy given relations between W1, W2, Tp and Wr, where W1 is the upper side of the trapezoidal shape in the track width direction, which corresponds to the surface of the convex-form magnetic recording layer, W2 is the lower side of that trapezoidal shape which corresponds to the bottom surface of the convex-form magnetic recording layer, Tp is the data track pitch at the data information recording portion, and Wr is the read width of the magnetic head.

It appears that those skilled in the art could have a better understanding of the determination of the specifications for the burst patterns, etc. by reference to, and consideration of, the results of experimentation in specific examples. Thus, the invention is now explained with reference to various experiments including inventive and comparative examples.

[I] EXPERIMENTAL EXAMPLE 1 WHERE M=2, AND n=1

Figure 7:
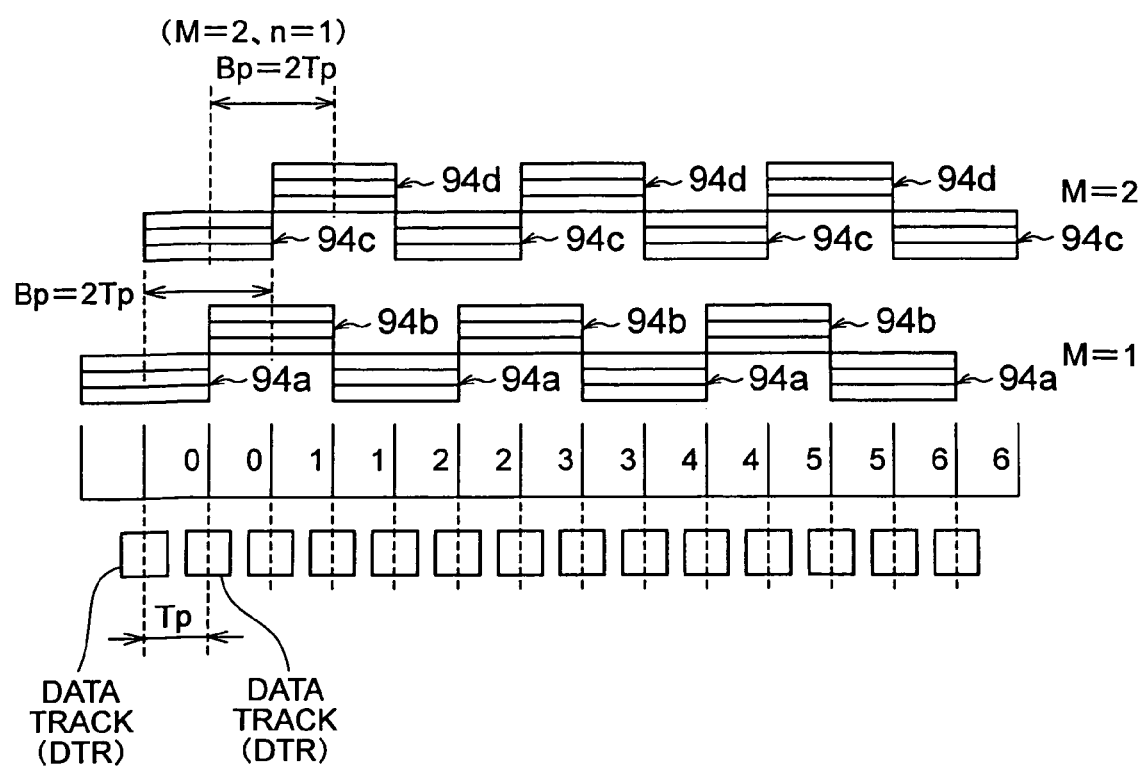
FIG. 7 is a schematic plan view illustrative of the structure of the burst portion in a typical case where M=2 and n=1, including its relation to the track pitch.

As shown in FIGS. 2 and 7, this example is directed to the case where M=2 (where M is the number of pairs (sets) of burst patterns, and when the burst pattern pitch Bp vs. data track pitch Tp relation is represented by Bp=(2/n)Tp, n=1. In other words, Example 1 is directed to the case where in the burst division comprising two pairs (sets) of burst patterns, the burst pattern pitch Bp vs. data track pitch Tp relation is represented by Bp=2Tp.

In this case, the first burst (VTR1) 94a and the second burst (VTR2) 94b in pair form are located such that the convex-form magnetic recording layers are formed while centerlines are defined at positions mutually offset by two track pitches of distance (2Tp) in the track width direction.

The third burst (VTR3) 94c and the fourth burst (VTR4) 94d in pair form are located such that the convex-form magnetic recording layers are formed while centerlines are defined at positions mutually offset by two track pitches of distance (2Tp) in the track width direction, and the third burst (VTR3) 94c and the fourth burst (VTR4) 94d are located such that the convex-form magnetic recording layers are formed while centerlines are defined at positions offset from the centerlines of the first burst (VTR1) 94a and the second burst (VTR2) 94b by one track pitch of distance (1Tp).

Construction of the Magnetic Recording Medium

For the purpose of application of the sector servo arrangement with a disk surface divided into sectors, such a servo area 90 as depicted in FIG. 2 was formed. Specifically, an ISG division 91, an SVAM division 92, a gray code division 93, a burst division 94 and a pad division 95 were formed according to the pattern for each servo signal.

Figure 5:
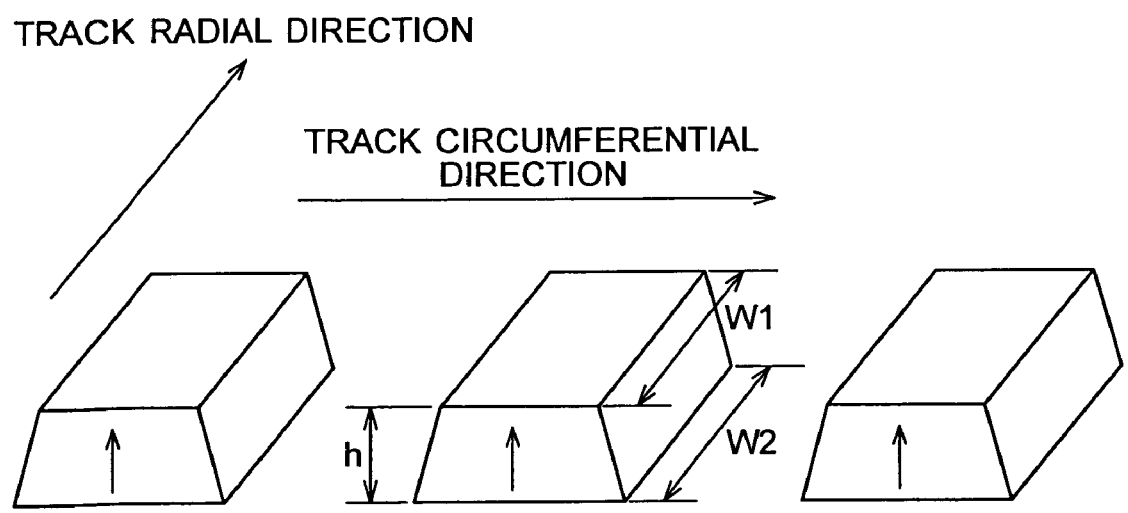
FIG. 5 is illustrative in schematic perspective of the structure of a trapezoidal perpendicular magnetic recording layer.

The convex-form magnetic recording layer (convex magnetic recording layer) at the burst division 94 for recording burst signals was configured as a trapezoidal perpendicular magnetic recording layer that is typically depicted in FIG. 5. Here, W1 is the dimension of the upper side of the trapezoid corresponding to the surface of the convex magnetic recording layer, W2 is the dimension of the lower side of the trapezoid corresponding to the bottom surface of the convex magnetic recording layer, and h is the height from the lower side W2 to the upper side W1. Note here that W2>W1.

Convex portions at other divisions, i.e., the ISG division 91, the SVAM division 92, the gray code division 93 and the pad division 95 were located at one bit spacing, each configured as a convex-form perpendicular magnetic recording layer in a trapezoidal belt form that was elongate in the disk radial direction, although not shown.

As can be seen from the sectional arrangement of the medium of FIG. 3, a 15 nm thick PtMn layer acting as an orientation layer 14 (underlay layer 14) was formed on a mirror-polished substrate 15. A 200 nm thick soft magnetic layer 11 comprising CoZrNb was formed on the orientation layer 14. An 8 nm thick intermediate layer 12 comprising a nonmagnetic alloy CoTi was formed on the soft magnetic layer 11. Then, a 15 nm thick perpendicular magnetic recording layer 10 was formed on the intermediate layer 12, followed by etching in given pattern for the preparation of a predetermined concave-convex configuration. Then, $SiO_2$ sputtering was implemented to fill the etched recess with $SiO_2$. Then, while the substrate filled with $SiO_2$ was rotated, oblique ion beam etching treatment was carried out to remove an excessively sputtered $SiO_2$ from on the perpendicular magnetic recording layer 10 to make the surface of the medium flat. A 1 nm thick protective film 13 in a carbon thin film form was formed on the surface of the medium by CVD techniques and a 1 nm thick Fomblin-based lubricant was coated on the protective film 13 to obtain a medium sample in complete form. Note here that in the material used for the perpendicular magnetic recording layer 10, CoPt ferromagnetic particles were contained in $SiO_2$ in a matrix form.

By measurement of magnetic properties on a vibrating sample magnetometer (VSM), the perpendicular magnetic recording layer was found to have a saturation magnetization Ms of 350 em/cc and a residual saturation magnetization Mr of 340 emu/cc. The thickness or height, h, of the perpendicular magnetic recording layer was set at 15 nm as already described.

Servo signal recording density was set at 130 K·FRPI (flux reversal per inch), and the track pitch Tp at the data area was set at 100 nm equivalent to 245 K·TPI (track per inch), The width of the track (data track (DTR)) at the data area was set at 70 nm.

Experimental bursts in such various configurations as referred to in Table 1, given below, were prepared while the lengths of the upper side W1 and the lower side W2 of the trapezoidal perpendicular magnetic recording layer corresponding to the burst pattern depicted in FIG. 5 were varied under varying etching conditions for concave-convex structure formation such that they departed largely from the reference value of the track pitch Tp of the data track. Throughout the experimental examples, the angle made between the slant and the base of the trapezoid was set at 50°. In another parlance, the trapezoidal configuration used here satisfied tan 50°=2h/(W2−W1).

The experimental bursts were all configured in such a way as to be M=2 and n=1, as already described (FIG. 7). The first burst track (VTR1) 94a, the second burst track (VTR2) 94b, the third burst track (VTR3) 94c and the fourth burst track (VTR4) 94d were located with respect to the pattern of the data track (DTR) 80, so that differential signal outputs from VTR1 and VTR2 and differential signal outputs from VTR3 and VTR4 with respect to the magnetic head position could be synthesized together to generate a lot more precise PES signals.

For the recording magnetic head, a thin-film inductive head with a magnetic write width of 80 nm was used, and for the reproducing magnetic head, a giant magnetoresistance effect (GMR) head was used. Note here that for the magnetic read width Wr of the reproducing magnetic head, varying widths were used in consideration of relations to other parameters (W1, W2, Tp), as shown in Table 1.

The perpendicular magnetic recording medium subjected to concave-convex processing for the above given servo area and data area was processed in such a way as to magnetize the convex-form perpendicular magnetic recording layer to generate a servo signal magnetic field. Specifically, the disk was located between the magnetic pole surfaces of an electromagnet with a generated DC magnetic field of 15 kOe such that its surfaces were parallel with the magnetic pole surfaces, after which the trapezoidal perpendicular magnetic recording layer at the servo area and the data area was collectively magnetized to record servo signals.

With the thus prepared magnetic recording medium for Experimental Example 1, tracking control experimentation was conducted in the following manner.

Specifically, at the discrete track disk and read magnetic head shown in Table 1 given below, W1, W2 and Wr were applied in combinations of values smaller and/or larger than the reference value of the track pitch Tp to find all position error signals PES. In consideration of fluctuations in adjacent track positions being more or less allowable, whether the linearity of PES as tracking characteristics is at an enable or disable level is determined.

In this conjunction, see the pertinent drawings referred to in Table 1 illustrative in schematic of the relations between W1, W2, Tp and Tr in the experimental example performed here. The EPS signals, too, are indicated in these drawings.

TABLE 1

(M = 2; n = 1)

Figure 9:
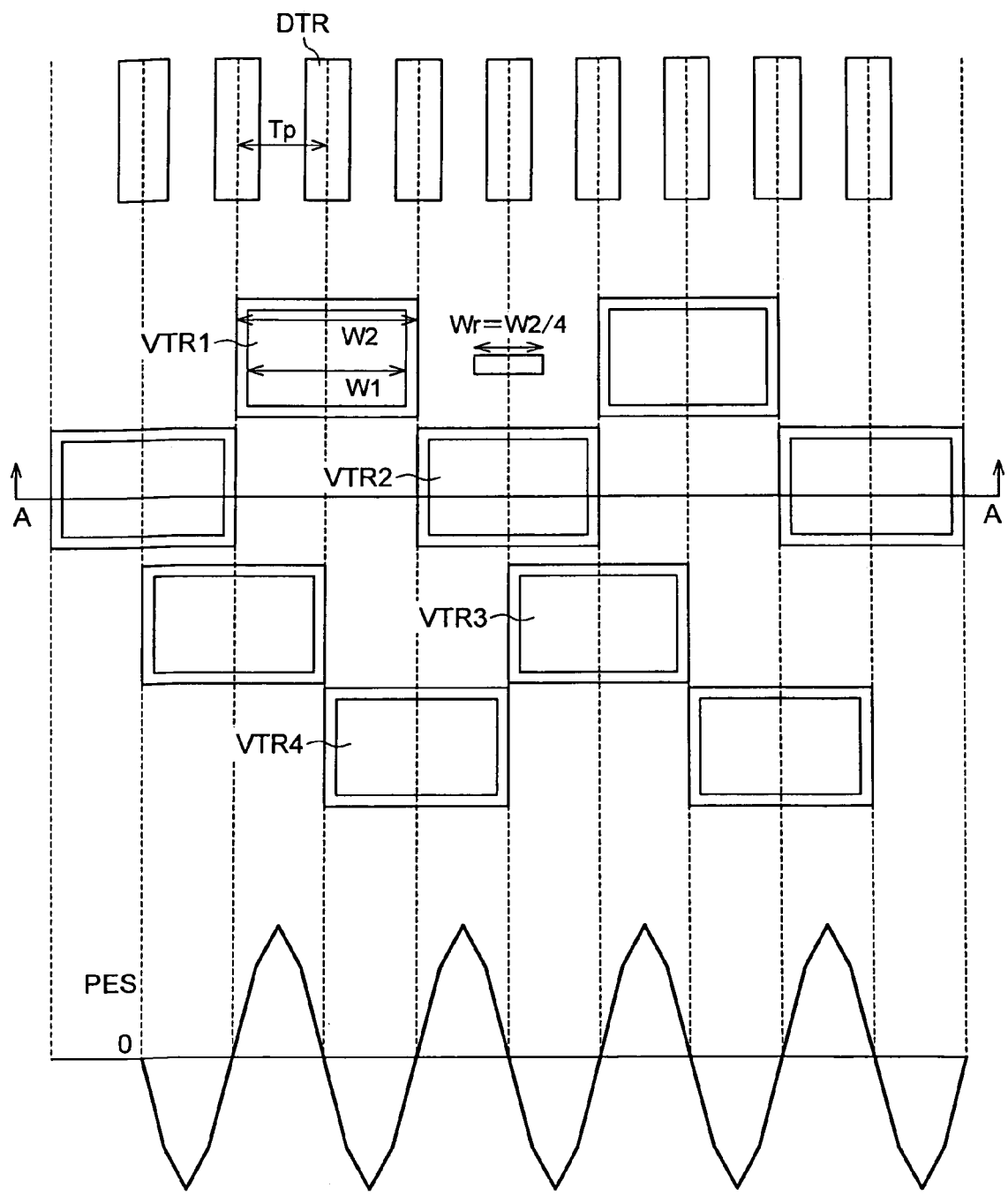
FIG. 9 is illustrative of one specific experimentation embodiment, wherein the relations of burst patterns W1, W2 and track pitch Tp to magnetic read width Wr are schematically illustrated together with position error signal PES.
Figure 10:
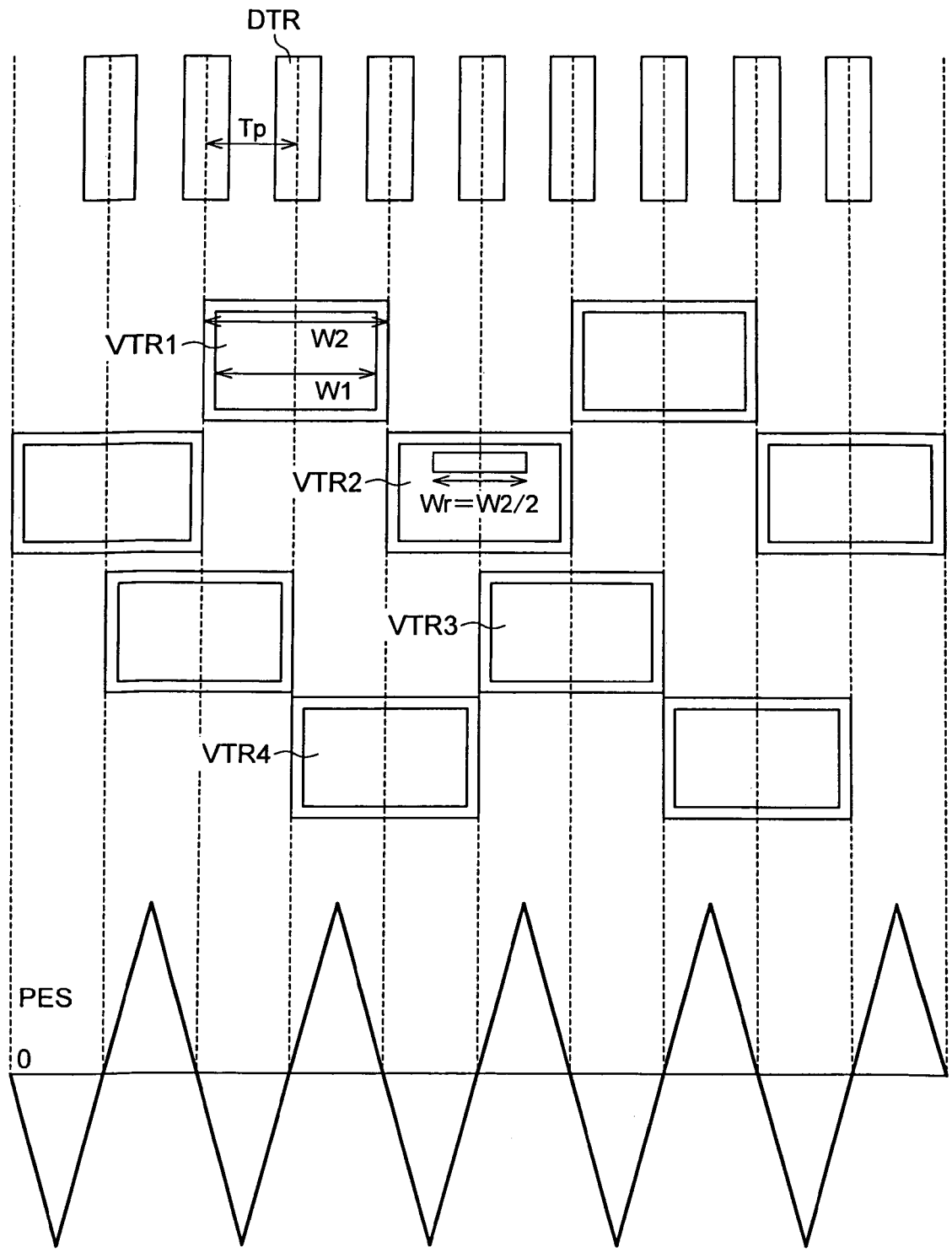
FIG. 10 is illustrative of another specific experimentation embodiment, wherein the relations of burst patterns W1, W2 and track pitch Tp to magnetic read width Wr are schematically illustrated together with position error signal PES.
Figure 11:
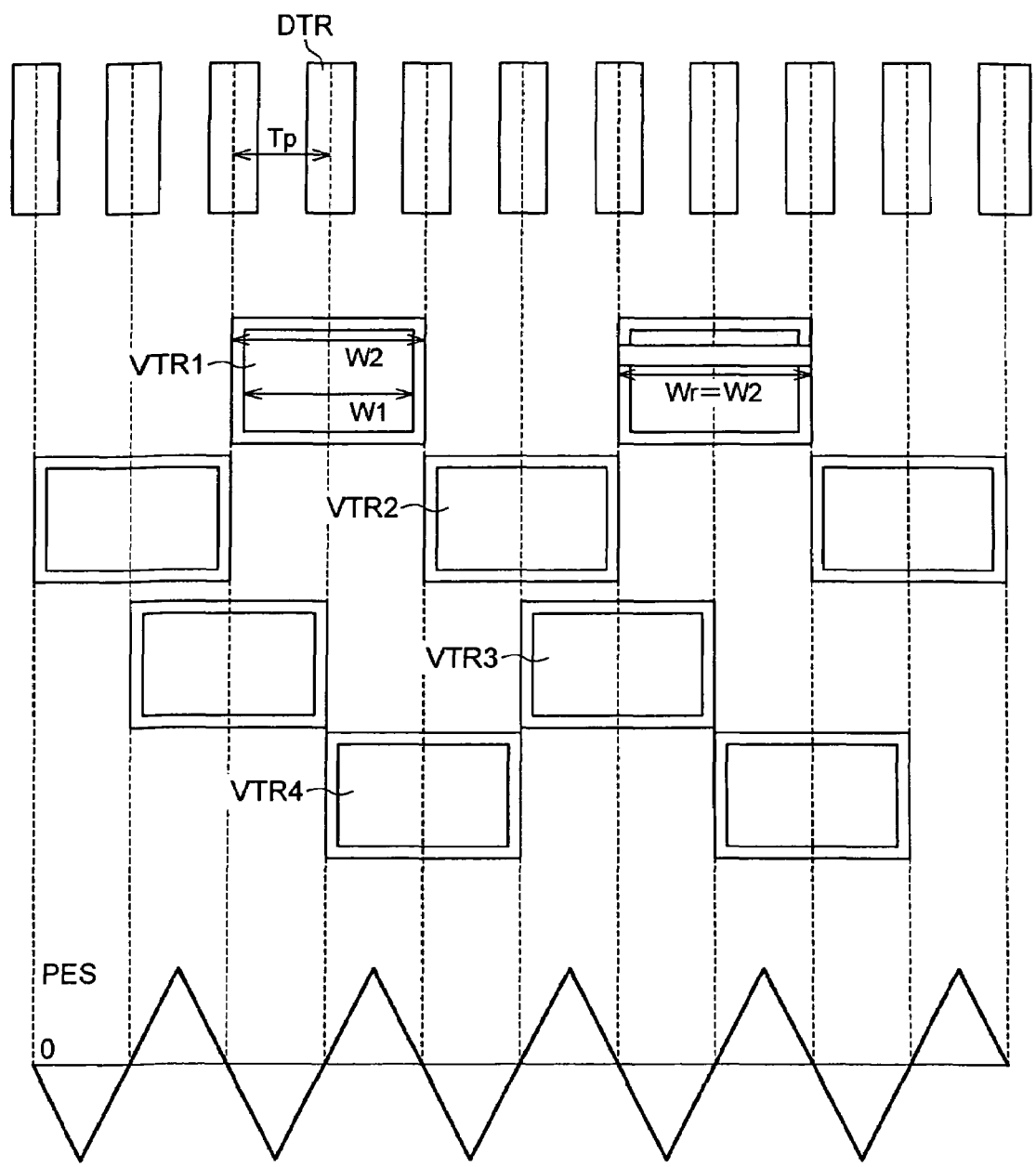
FIG. 11 is illustrative of yet another specific experimentation embodiment, wherein the relations of burst patterns W1, W2 and track pitch Tp to magnetic read width Wr are schematically illustrated together with position error signal PES.
Figure 12:
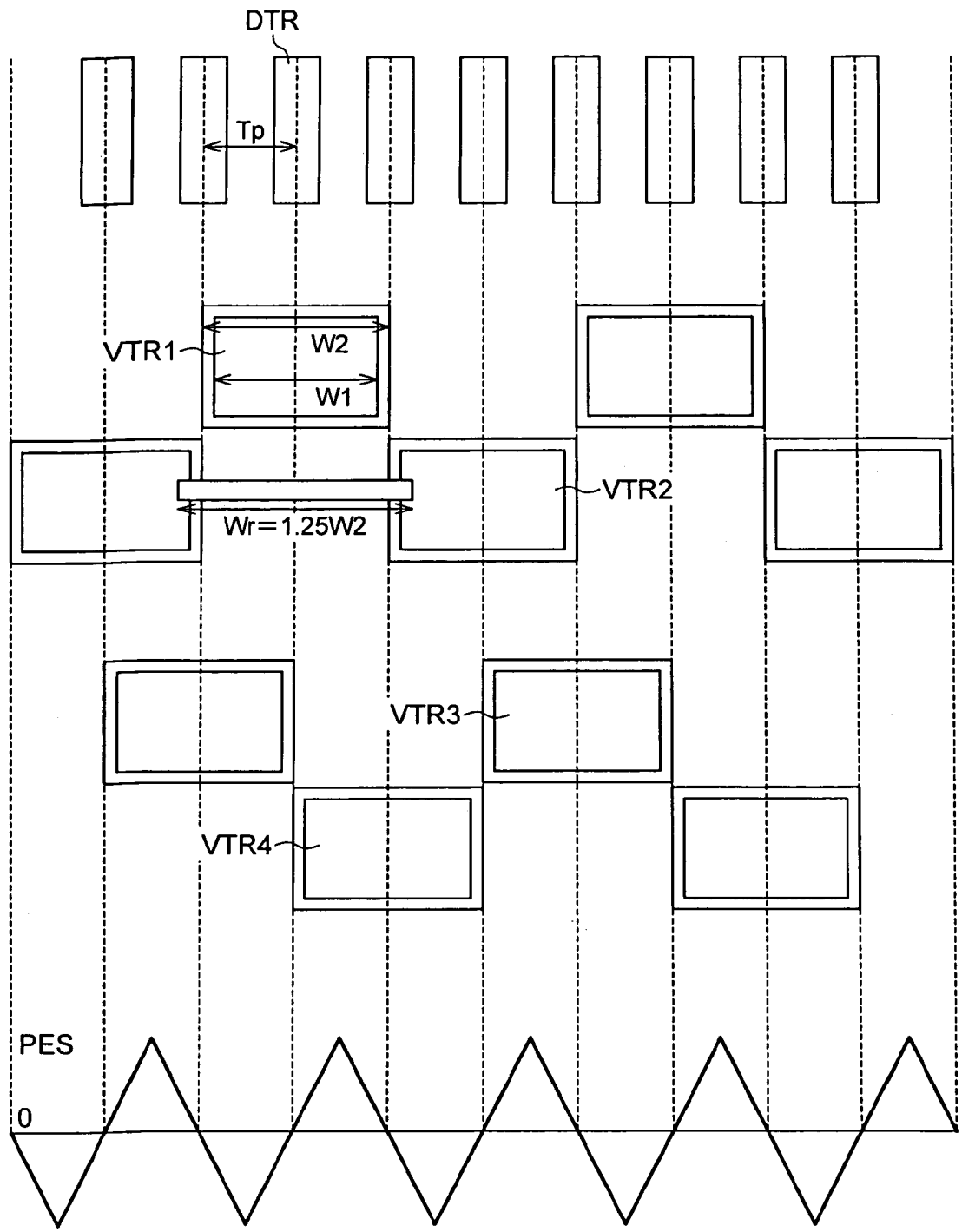
FIG. 12 is illustrative of a further specific experimentation embodiment, wherein the relations of burst patterns W1, W2 and track pitch Tp to magnetic read width Wr are schematically illustrated together with position error signal PES.
Figure 13:
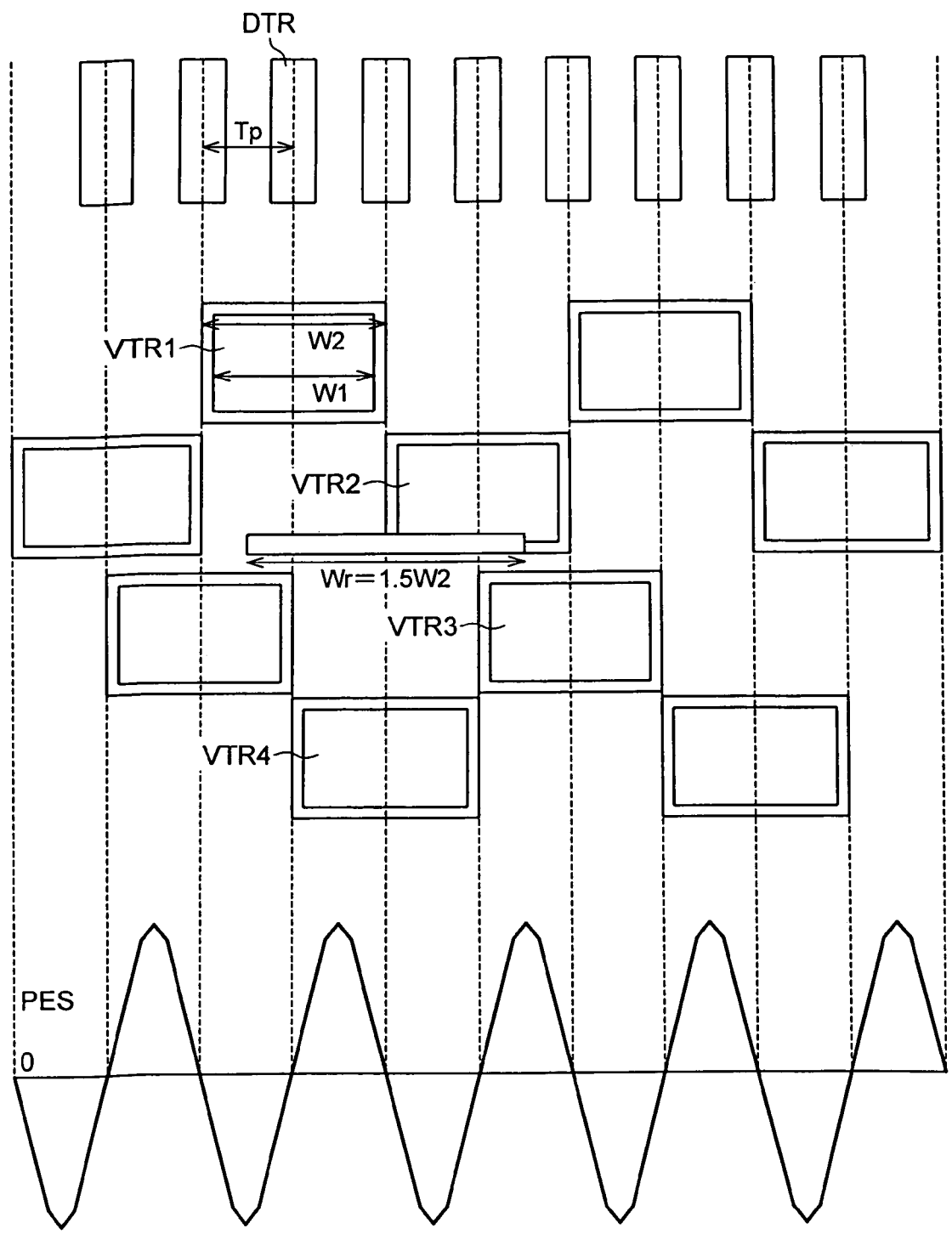
FIG. 13 is illustrative of a further specific experimentation embodiment, wherein the relations of burst patterns W1, W2 and track pitch Tp to magnetic read width Wr are schematically illustrated together with position error signal PES.

| Embodiment | Relation between Tp and W1 or W2 | Relation between Wr and W1, W2, or Tp | Level | Linearity of PES | Pertinent Drawing |
|---|---|---|---|---|---|
| I-1 | W1 > Tp | Wr = 0.25W2 | disable(X) | poor | FIG. 9 |
|  |  | Wr = 0.5W2 | enable(○) | good | FIG. 10 |
|  |  | Wr = W2 | enable(○) | good | FIG. 11 |
|  |  | Wr = 1.25W2 | enable(○) | good | FIG. 12 |
|  |  | Wr = 1.5W2 | disable(X) | poor | FIG. 13 |

The conditions for Embodiment I-1 shown in Table 1 were found as a result of making examinations of how the position error signals PES changed when, under the condition of W1>Tp, there were changes in the relations between the burst patterns W1, W2 and the track pitch Tp with respect to the magnetic read width Wr. The drawings pertinent to the respective cases correspond to FIGS. 9-13.

As can be seen from FIGS. 9-13, if the range of 1.25W2>Wr≧0.5W2 is satisfied under the condition of W1>Tp, the position error detection signals can then gain linearity, indicating that the position error signals are at an enable level.

Note here that in the structure where M=2 and n=1, it is only required to take the above case of W1>Tp into account, as shown in FIG. 7.

Figure 25:
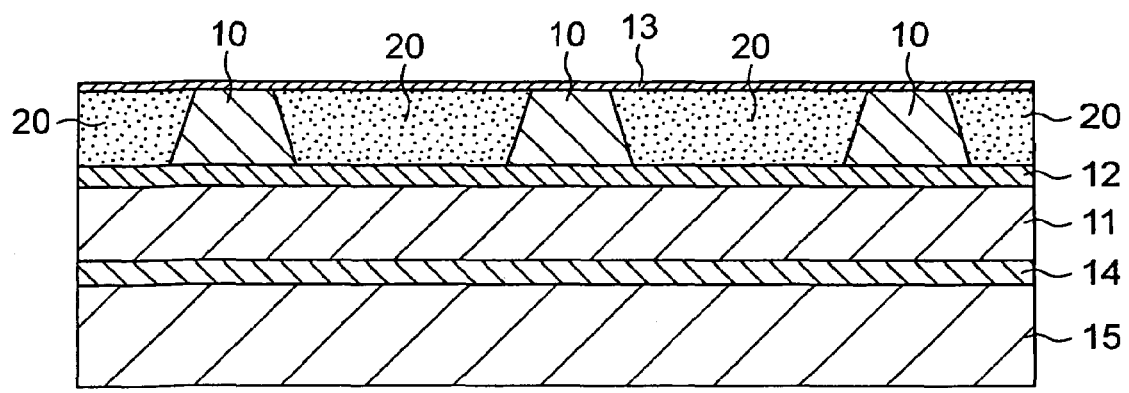
FIG. 25 is a schematic section taken on A-A' arrow line in FIG. 9

Also note that FIG. 25 is a schematic section taken on A-A arrows in FIG. 9. Like references in FIGS. 9 and 3 indicate like components.

[II] EXPERIMENTAL EXAMPLE 2 WHERE M=2 AND n=3

Figure 8:
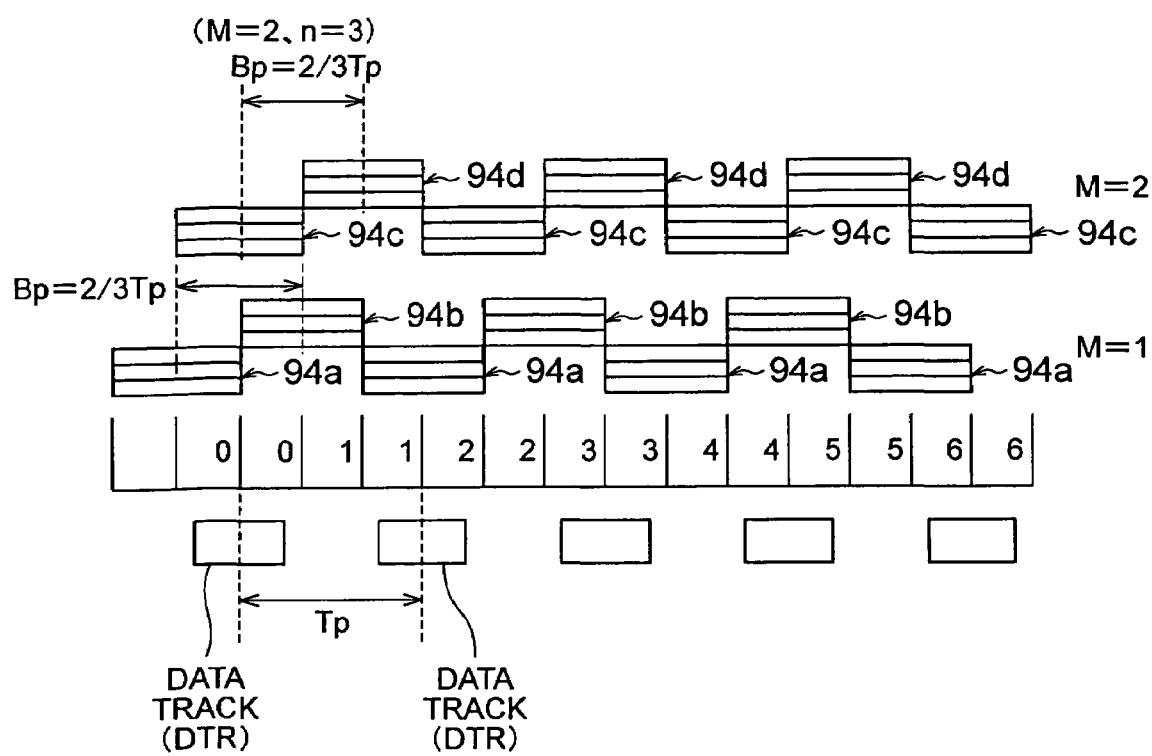
FIG. 8 is a schematic plan view illustrative of the structure of the burst portion in a typical case where M=2 and n=3, including its relation to the track pitch.

As shown in FIG. 8, this example is directed to the case where M=2 (where M is the number of pairs (sets) of burst patterns, and when the burst pattern pitch Bp vs. data track pitch Tp relation is represented by Bp=(2/n)Tp, n=3. In other words, Example 1 is directed to the case where in the burst division comprising two pairs (sets) of burst patterns, the burst pattern pitch Bp is 2/3 of the data track pitch Tp, say, Bp=(2/3)Tp.

In this case, the first burst (VTR1) 94a and the second burst (VTR2) 94b in pair form are located such that the convex-form magnetic recording layers are formed while centerlines are defined at positions mutually offset by (2/3) track pitches of distance ((2/3)Tp) in the track width direction, as shown in FIG. 8.

The third burst (VTR3) 94c and the fourth burst (VTR4) 94d in pair form are located such that the convex-form magnetic recording layers are formed while centerlines are defined at positions mutually offset by (2/3) track pitches of distance ((2/3)Tp) in the track width direction, and the third burst (VTR3) 94c and the fourth burst (VTR4) 94d are located such that the convex form of magnetic recording layers are formed while centerlines are defined at positions offset from the centerlines of the first burst (VTR1) 94a and the second burst (VTR2) 94b by (1/3) track pitch of distance ((1/3)Tp).

Construction of the Magnetic Recording Medium

The structure of the burst division of the magnetic recording medium in the above Experimental Example 1 was changed to that where M=2 and n=3 (FIG. 8). Otherwise, the magnetic recording medium used in Experimental Example 2 was prepared as in Experimental Example 1. Using such a magnetic recording medium, tracking control experimentation was performed as in the above Experimental Example 1.

Specifically, at the discrete track disk and read magnetic head shown in Table 2 given below, W1, W2 and Wr were applied in combinations of values smaller and/or larger than the reference value of the track pitch Tp to find all position error signals PES. Then, whether the linearity of PES as tracking characteristics was at an enable or disable level was determined.

In this conjunction, see the pertinent drawings referred to in Table 2 and illustrative in schematic of the relations between W1, W2, Tp and Tr in the experimental examples performed here. The EPS signals, too, are indicated in these drawings.

TABLE 2

(M = 2; n = 3)

| Embodiment | Relation between Tp and W1 or W2 | Relation between Wr and W1, W2 or Tp | Level |
|---|---|---|---|
| II-1 | W2 < Tp | Wr = 0.375W1 | disable(X) |
|  |  | Wr = 0.5W1 | enable(○) |
|  |  | Wr = W1 | enable(○) |
|  |  | Wr = W2 | enable(○) |
|  |  | Wr = 1.5W2 | enable(○) |
|  |  | Wr = 2W1 | disable(X) |

Figure 14:
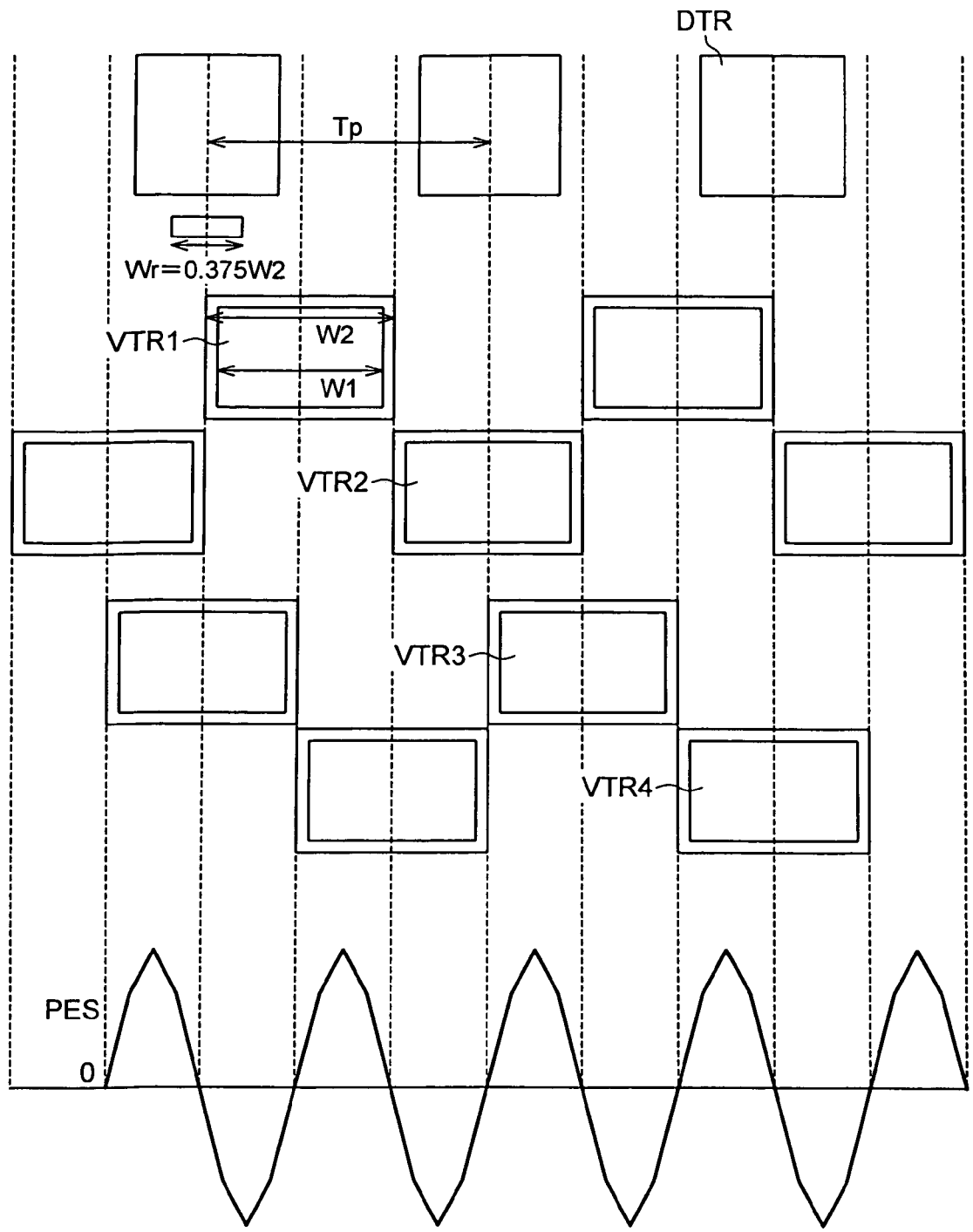
FIG. 14 is illustrative of a further specific experimentation embodiment, wherein the relations of burst patterns W1, W2 and track pitch Tp to magnetic read width Wr are schematically illustrated together with position error signal PES.
Figure 15:
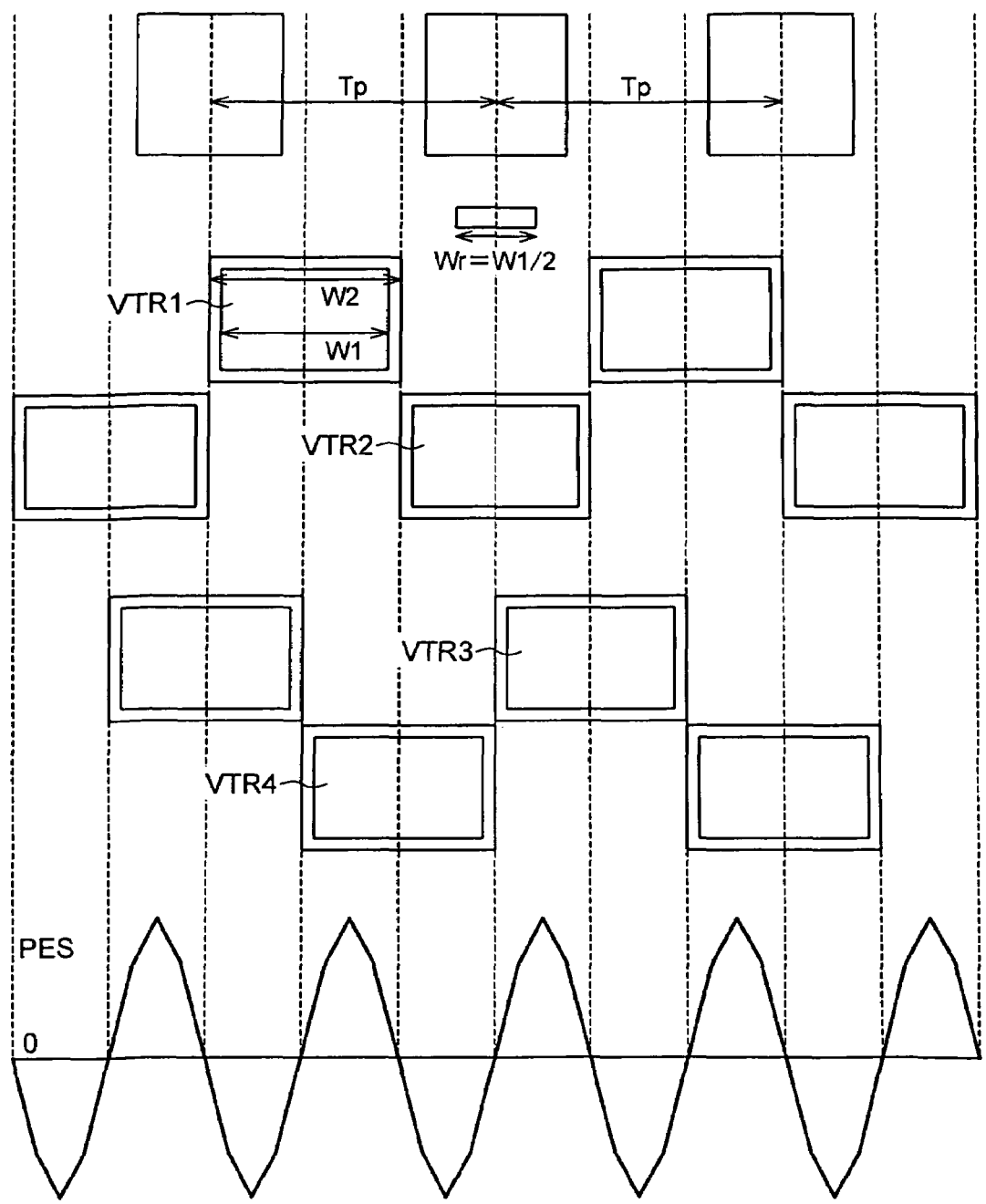
FIG. 15 is illustrative of a further specific experimentation embodiment, wherein the relations of burst patterns W1, W2 and track pitch Tp to magnetic read width Wr are schematically illustrated together with position error signal PES.
Figure 16:
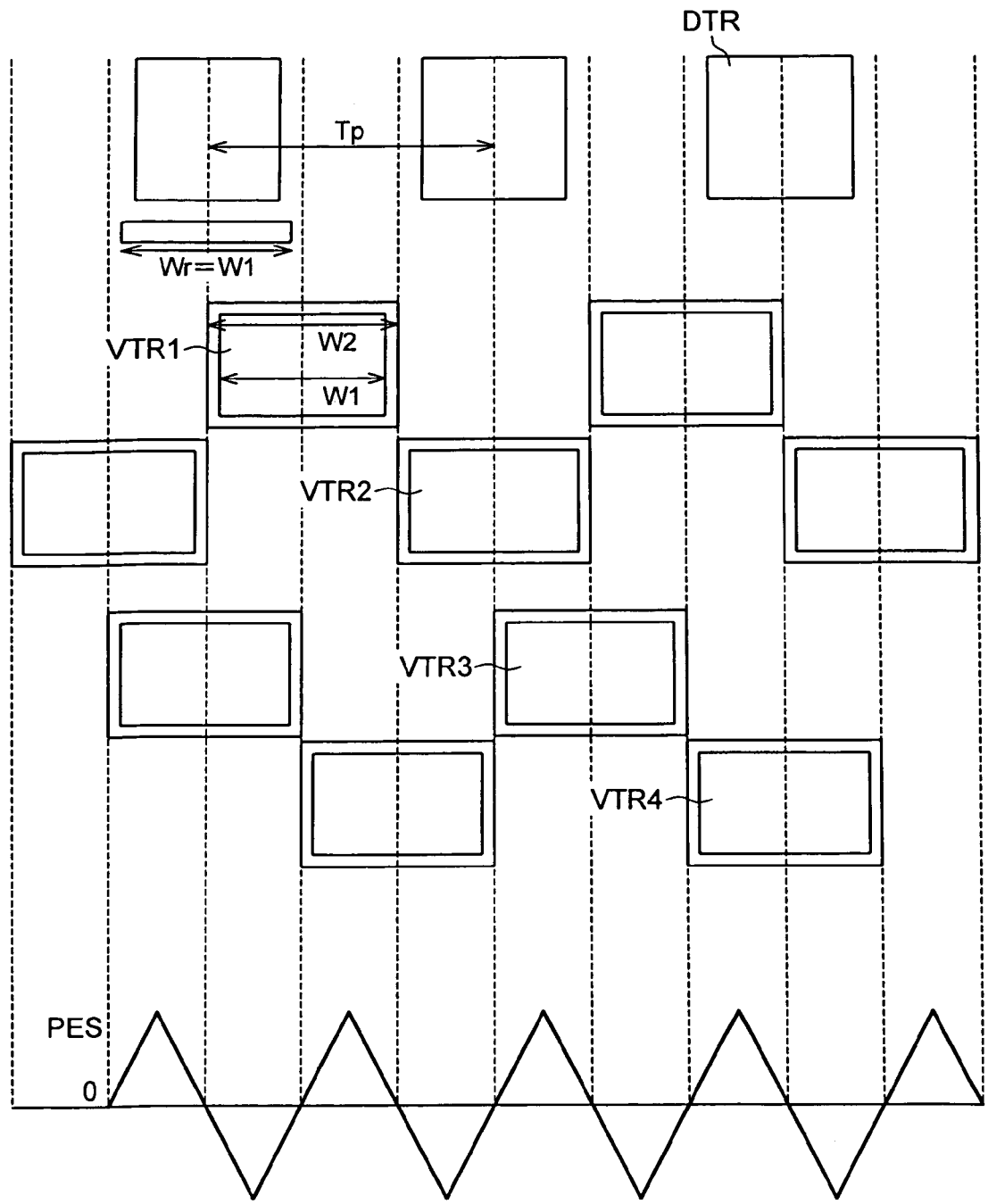
FIG. 16 is illustrative of a further specific experimentation embodiment, wherein the relations of burst patterns W1, W2 and track pitch Tp to magnetic read width Wr are schematically illustrated together with position error signal PES.
Figure 17:
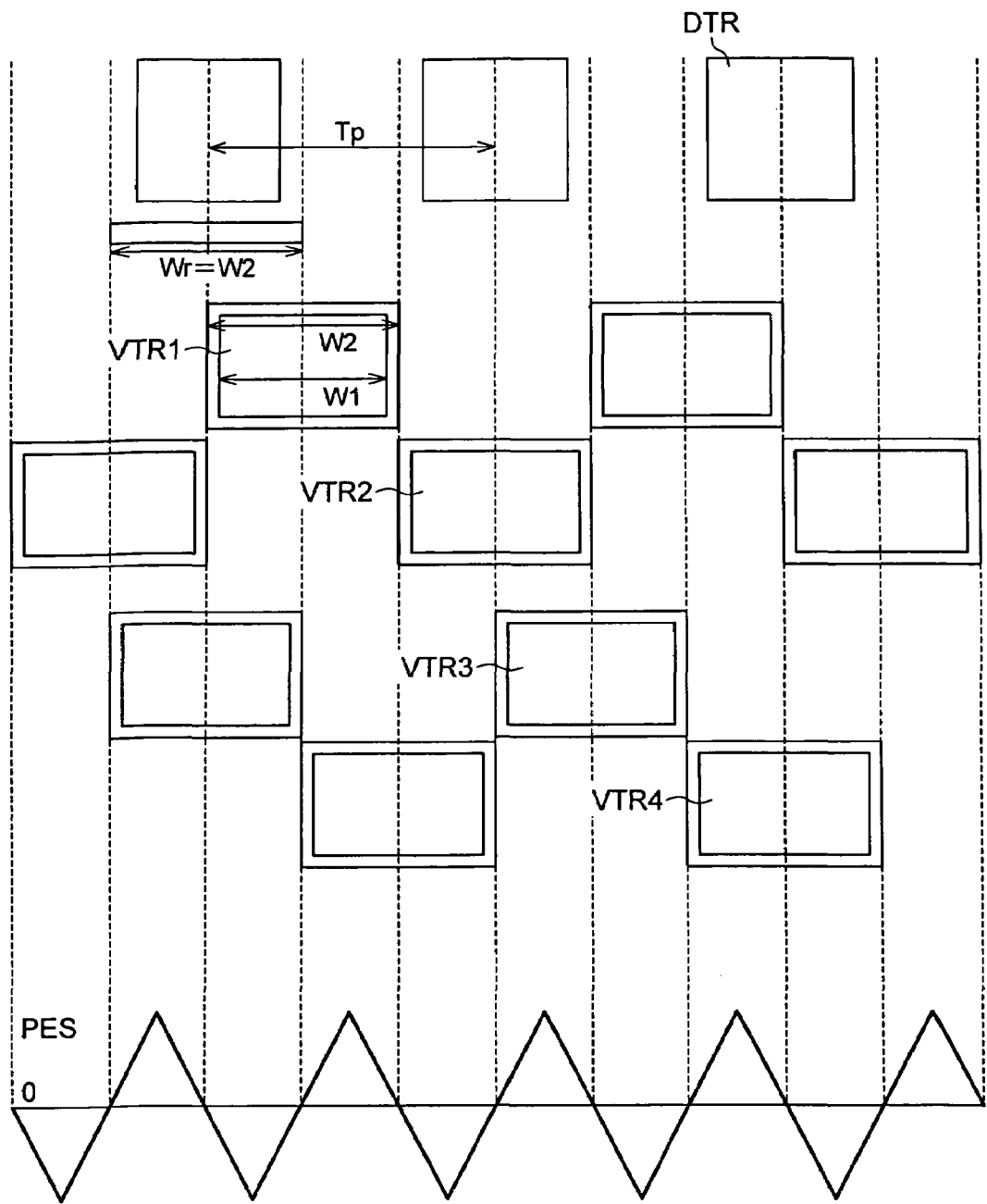
FIG. 17 is illustrative of a further specific experimentation embodiment, wherein the relations of burst patterns W1, W2 and track pitch Tp to magnetic read width Wr are schematically illustrated together with position error signal PES.
Figure 18:
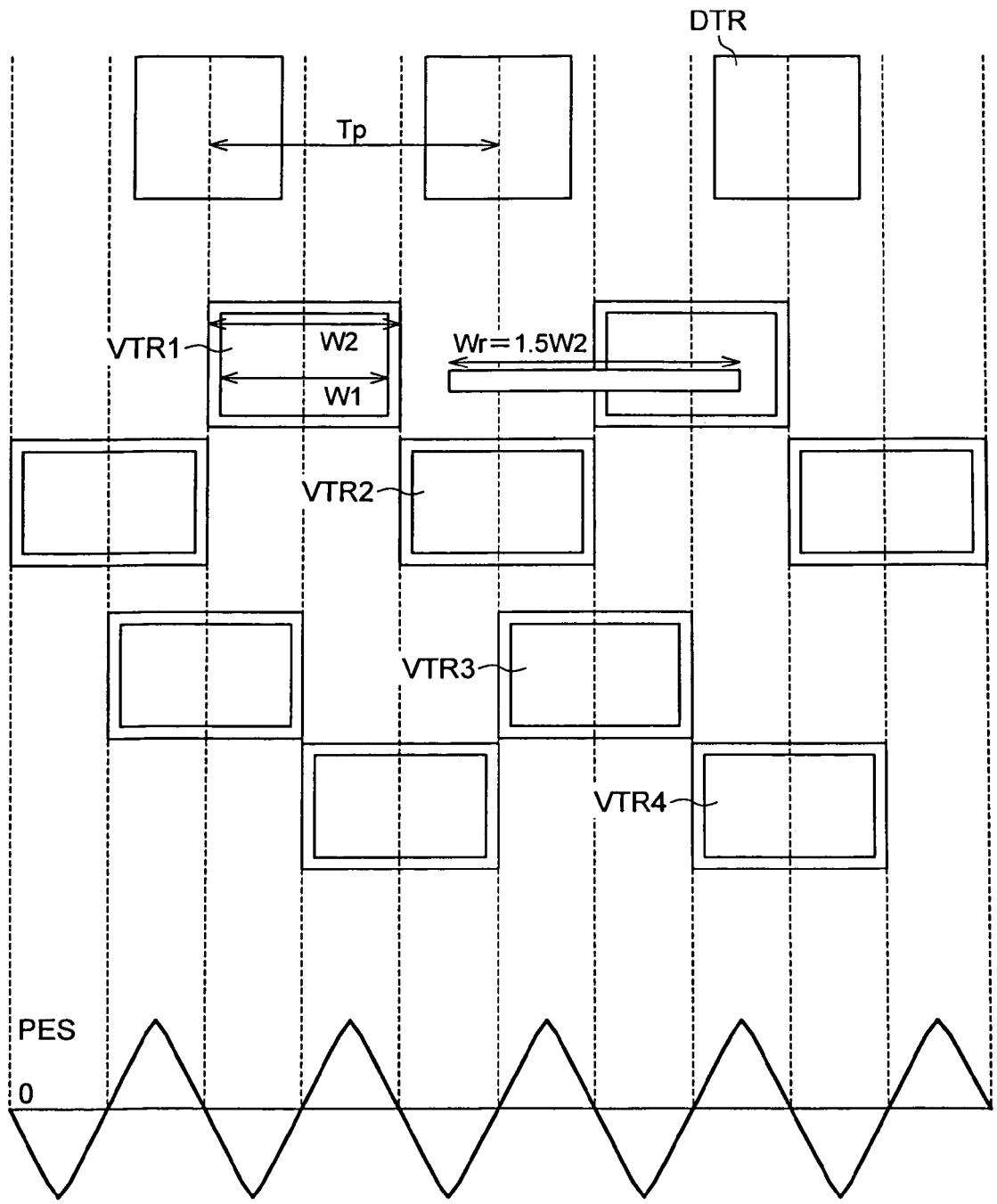
FIG. 18 is illustrative of a further specific experimentation embodiment, wherein the relations of burst patterns W1, W2 and track pitch Tp to magnetic read width Wr are schematically illustrated together with position error signal PES.
Figure 19:
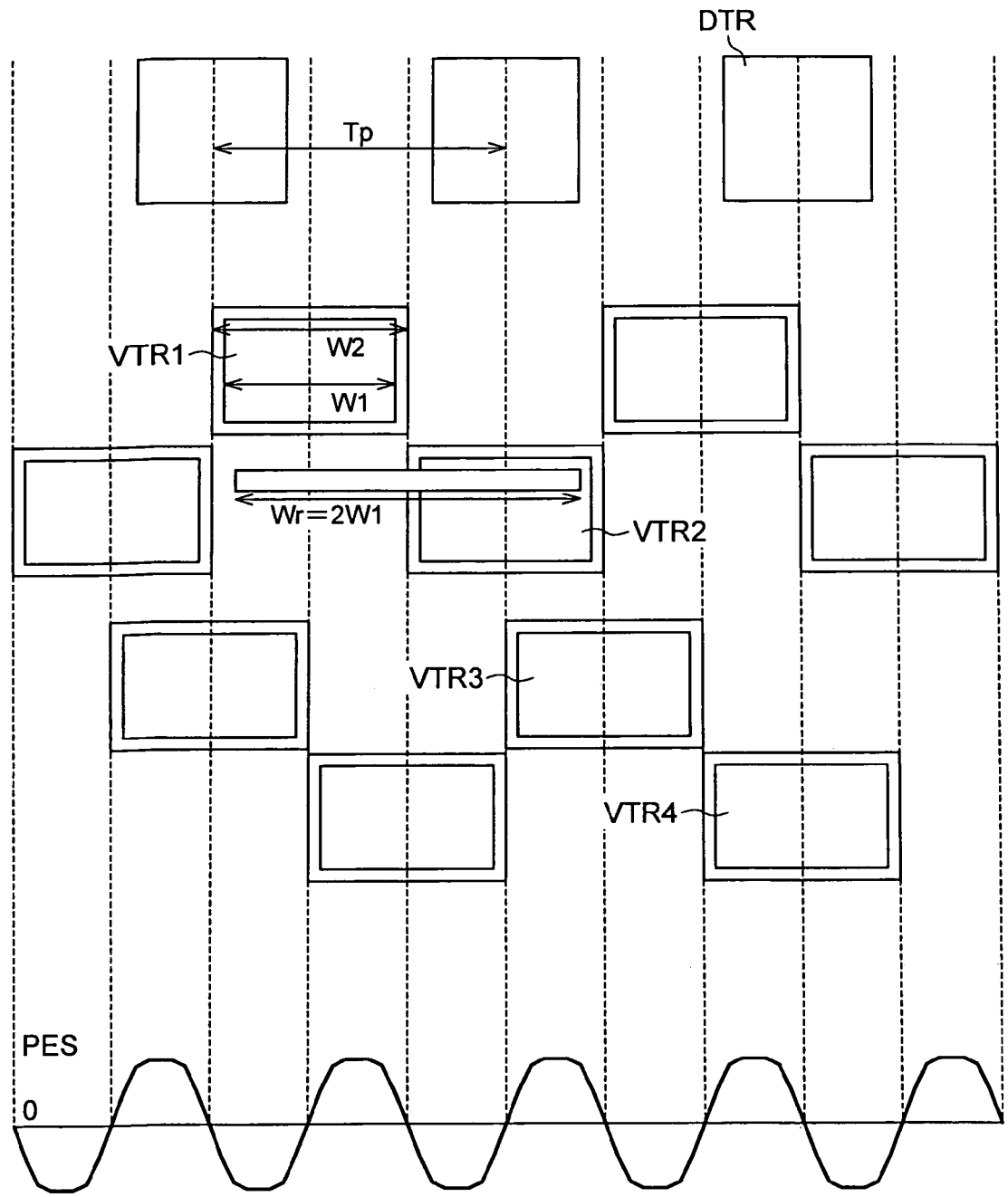
FIG. 19 is illustrative of a further specific experimentation embodiment, wherein the relations of burst patterns W1, W2 and track pitch Tp to magnetic read width Wr are schematically illustrated together with position error signal PES.

| Embodiment | Linearity of PES | Pertinent Drawing |
|---|---|---|
| II-2 | poor | FIG. 14 |
|  | good | FIG. 15 |
|  | good | FIG. 16 |
|  | good | FIG. 17 |
|  | good | FIG. 18 |
|  | poor | FIG. 19 |

The conditions for Embodiment II-1 shown in Table 2 were found as a result of making examinations of how the position error signals PES changed when, under the condition of Tp>W2, there were changes in the relations between the burst patterns W1, W2 and the track pitch Tp with respect to the magnetic read width Wr. The drawings pertinent to the respective cases correspond to FIGS. 14-19.

As can be seen from FIGS. 14-19, if the range of $1.5W2 \geq Wr \geq 0.5W1$ is satisfied under the condition of Tp>W2, the position error detection signals can then gain linearity, indicating that the position error signals are at an enable level.

Note here that in the structure where M=2 and n=3, it is only required to take the above case of Tp>W2 into account, as shown in FIG. 8.

[III] EXPERIMENTAL EXAMPLE 3

Experimentation was conducted of the dependency on angle of the slant of a trapezoidal shape. Specifically, the dependency on angle of slants of a trapezoidal pattern was examined with respect to the lower limit condition Wr=0.5W1 (FIG. 10) in Embodiment I-1 in the above Table 1.

Set out in Table 3 are the results of examination of the dependency on angle of the slant of the trapezoidal pattern, and in FIGS. 20-24 are the PESs when the angle θ of the slant of the trapezoidal pattern was set at 21°, 31°, 38.7°, 50°, and 85°, respectively. In Table 3, the "enable" and "disable (hard-to-use)" levels in view of linearity are indicated by ○ and X, respectively.

TABLE 3

Figure 20:
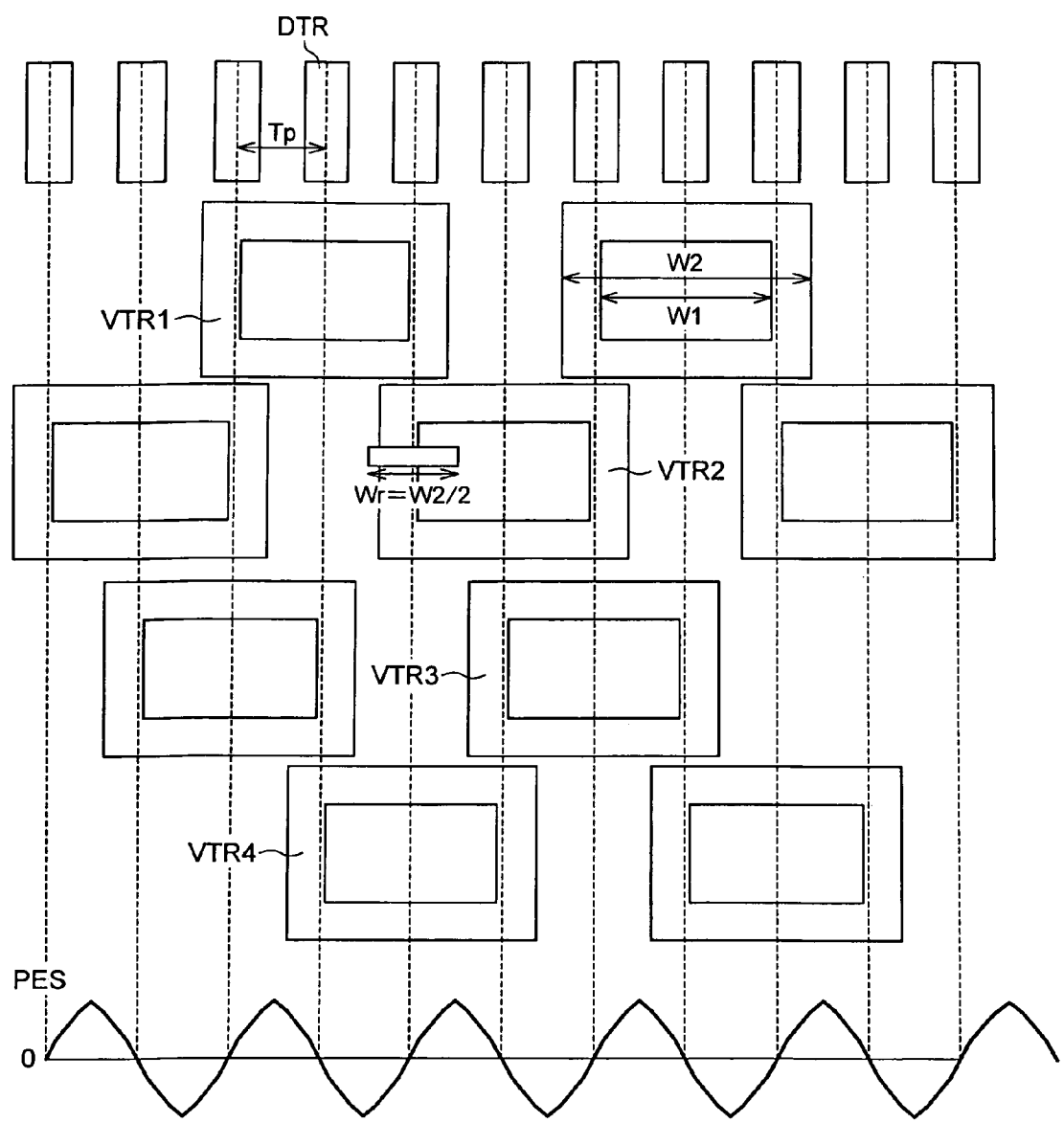
FIG. 20 is illustrative of one experimentation embodiment carried out for the examination of the dependency on angle of a trapezoidal slant of the trapezoidal pattern.
Figure 21:
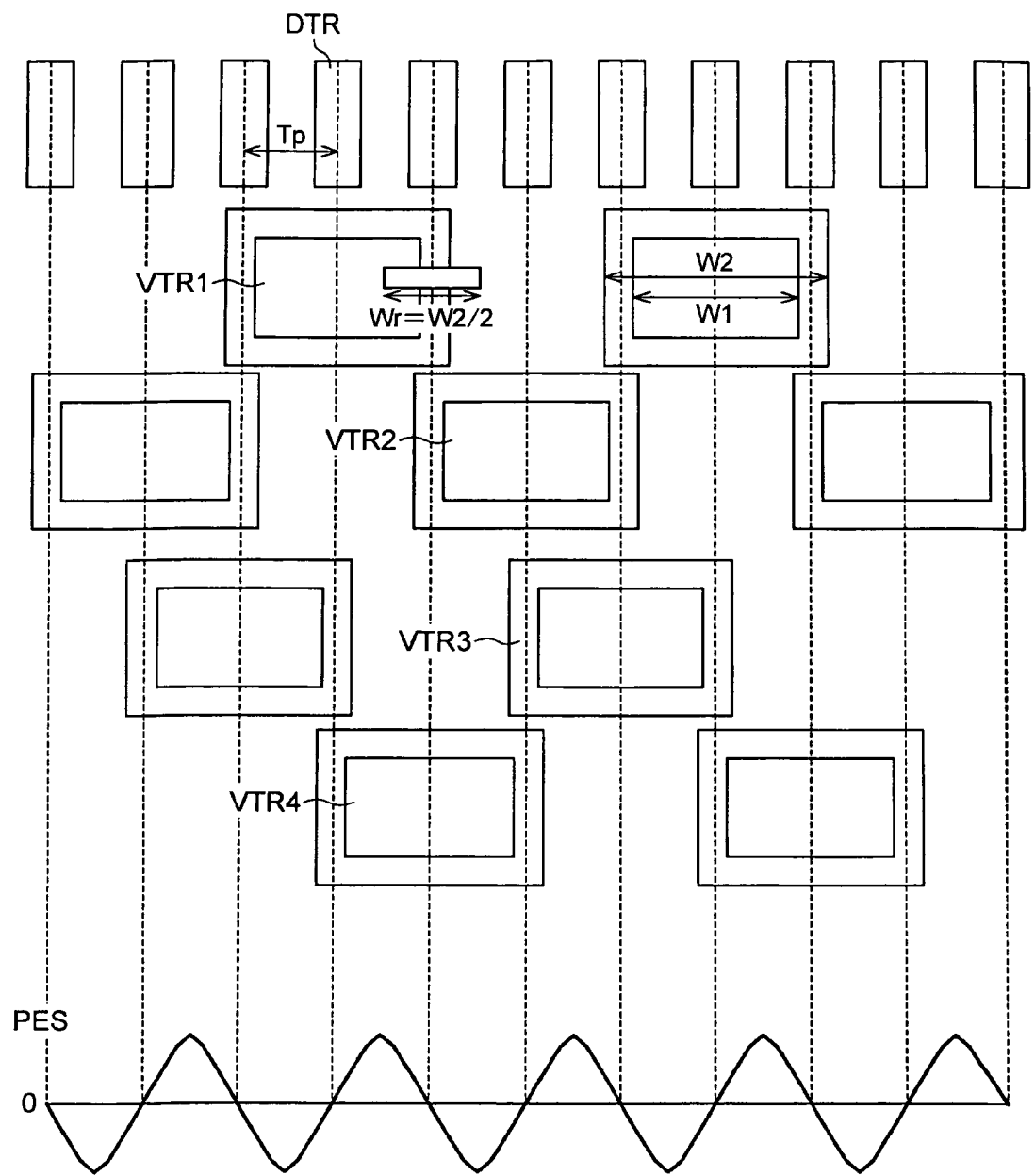
FIG. 21 is illustrative of another experimentation embodiment carried out for the examination of the dependency on angle of a trapezoidal slant of the trapezoidal pattern.
Figure 22:
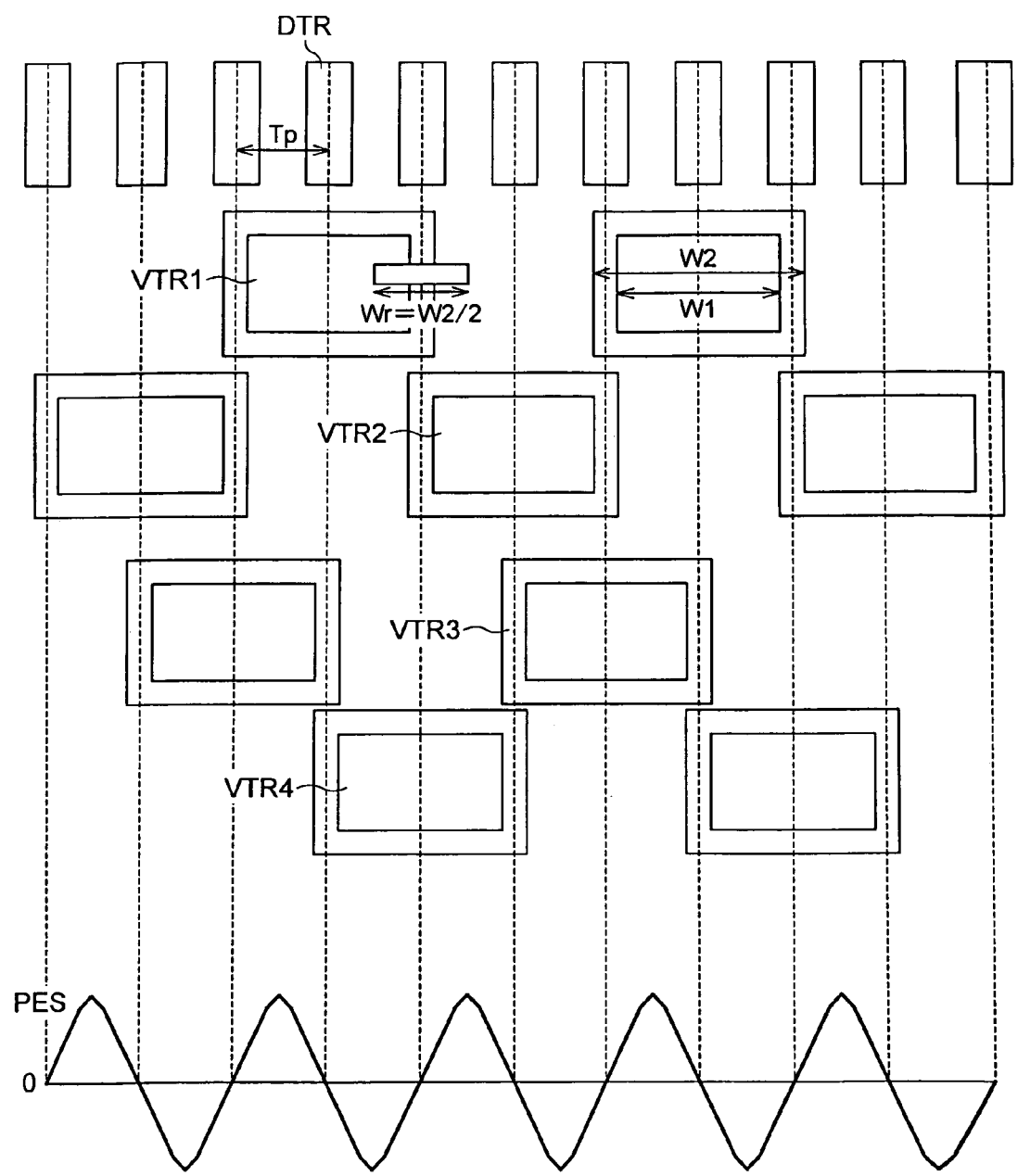
FIG. 22 is illustrative of yet another experimentation embodiment carried out for the examination of the dependency on angle of a trapezoidal slant of the trapezoidal pattern.
Figure 23:
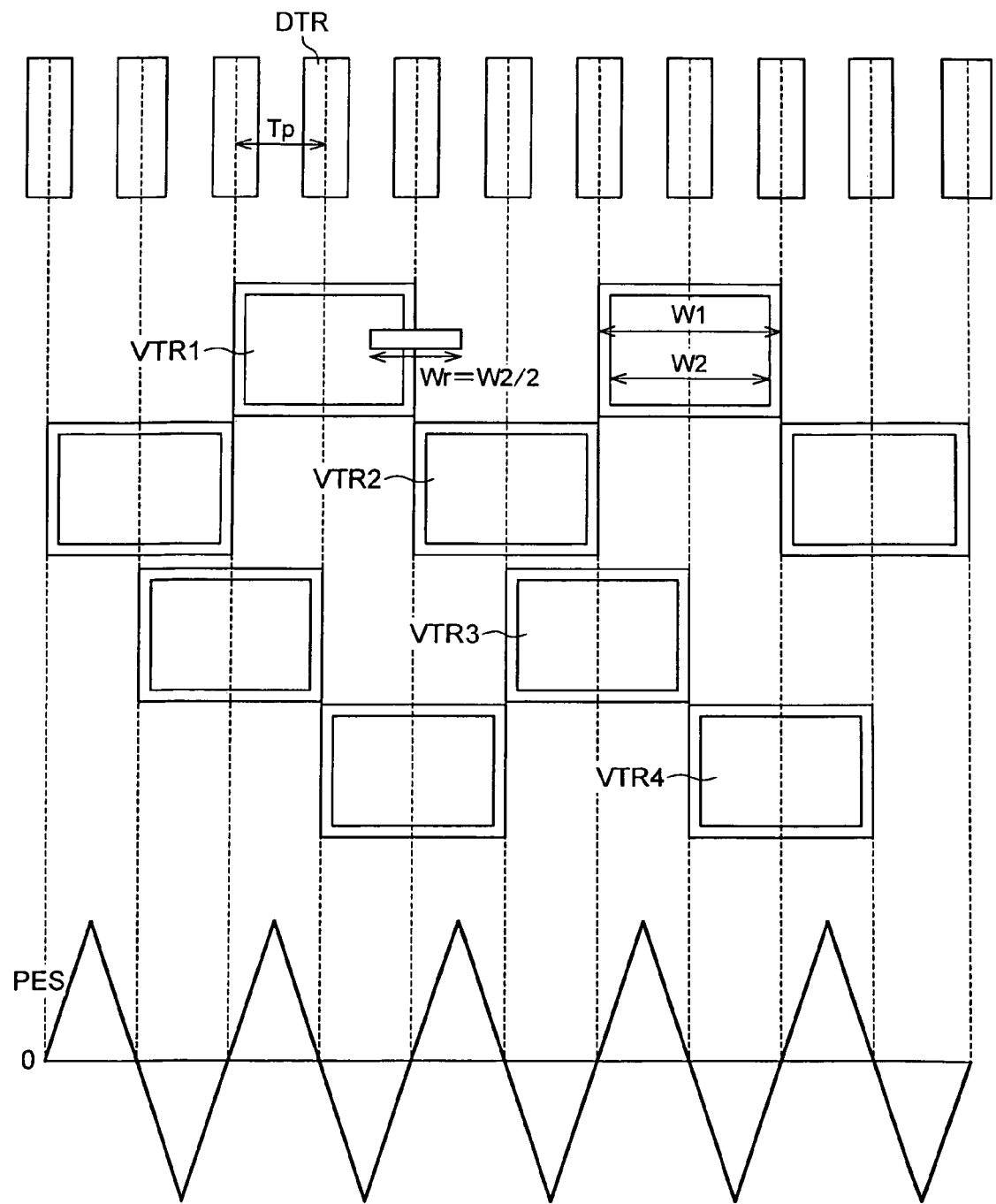
FIG. 23 is illustrative of a further experimentation embodiment carried out for the examination of the dependency on angle of a trapezoidal slant of the trapezoidal pattern.
Figure 24:
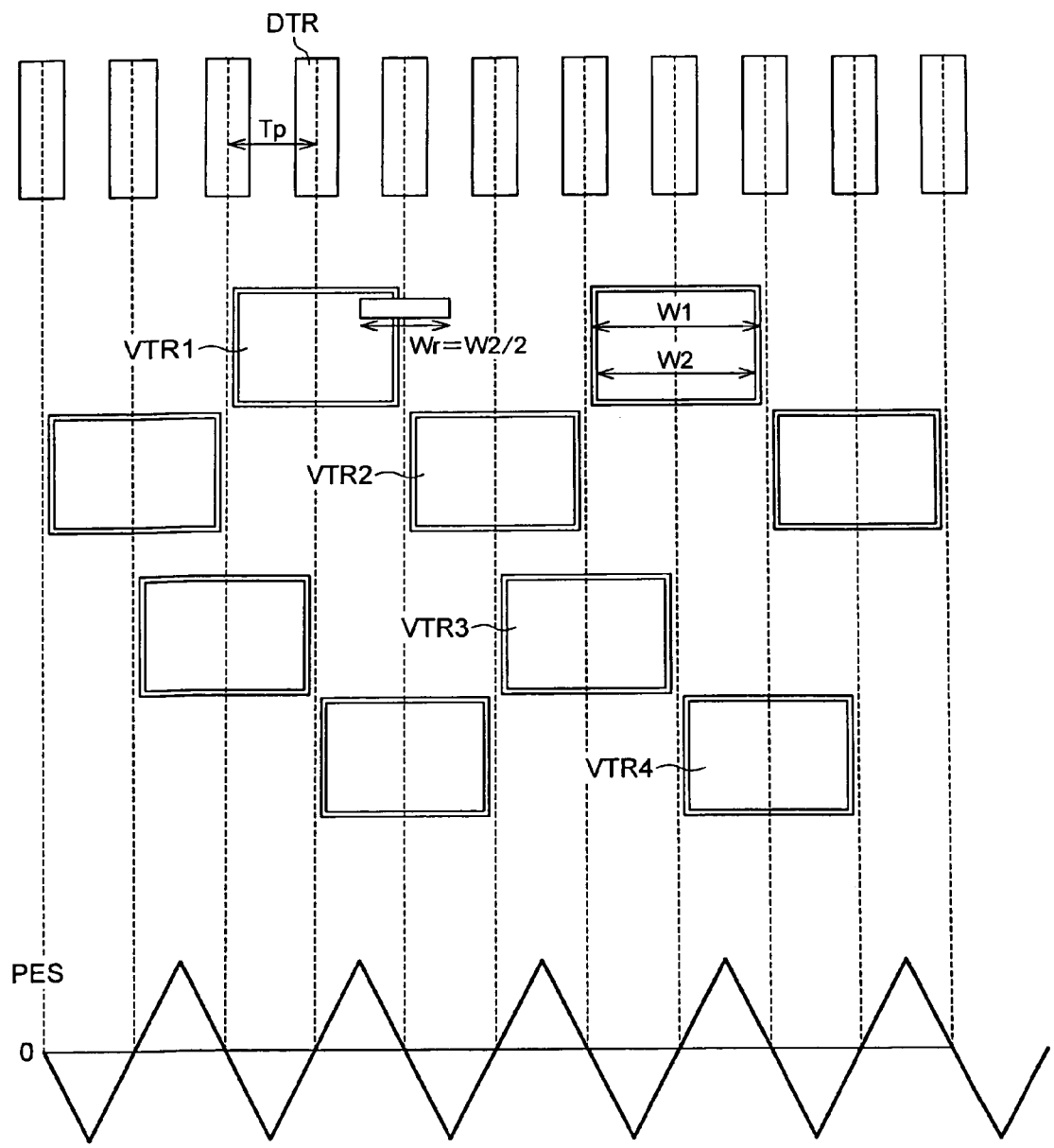
FIG. 24 is illustrative of a further experimentation embodiment carried out for the examination of the dependency on angle of a trapezoidal slant of the trapezoidal pattern.

| Slant Angle | 21° | 31° | 38.7° | 50° | 85° |
|---|---|---|---|---|---|
| Level | X | X | X | ○ | ○ |
| Pertinent Drawing | FIG. 20 | FIG. 21 | FIG. 22 | FIG. 23 | FIG. 24 |

From the results of Table 3, it is found that even when severe conditions are applied to the trapezoidal pattern, the angle between the slant and the base of the trapezoidal structure should preferably be at least 50° in the track width direction in particular, and the maximum slant angle should preferably be at most 85°.

That is, let h be the height from the lower side W2 to the upper side W1 of the convex magnetic recording layer. Then, $$\tan 85° \geq 2h/(W2-W1) \geq \tan 50°$$

Preferably, $$\tan 80° \geq 2h/(W2-W1) \geq \tan 70°$$

The advantages of, and the requirements for, the invention will become apparent from the above results. That is, the present invention provides a magnetic recording medium having a burst pattern configuration that can get hold of some dimensional accuracy margin upon medium fabrication processes to lessen loads on medium fabrication yet gain precise position error signals and a magnetic recording/reproducing system incorporating it, because the burst pattern in the discrete medium is configured in a substantially trapezoidal shape (truncated quadrangular pyramid shape) in both the track width direction and the track circumference direction, and in such a way as to satisfy the predetermined relations between W1, W2, Tp and Wr wherein W1 and W2 are the upper side and the lower side of the trapezoidal shape in the track width direction, which correspond to the surface and the bottom surface of the convex magnetic recording layer, respectively, Tp is the data track pitch at the data information recording portion, and Wr is the read width of the magnetic head.

The invention could also be applied even to an embodiment wherein a part of the magnetic layer is left behind as depicted in FIG. 4, because the remaining thin magnetic layer portion has no or little influence on the magnetic characteristics of the medium; the lower side of the trapezoidal shape corresponding to the bottom surface of the magnetic recording layer could be thought of as W2 without taking care of the remaining portion.

Note here that the above experimental example is given to determine the minimum requirement for getting hold of the linearity of position error signals (PES); that is, an additional condition for preventing the read head width Wr (magnetic read width Wr) from direct reproduction of data at the adjacent data tracks is provided to an actual system.

Specifically, there need be $$Wr < 2Tp - W$$

Figure 27:
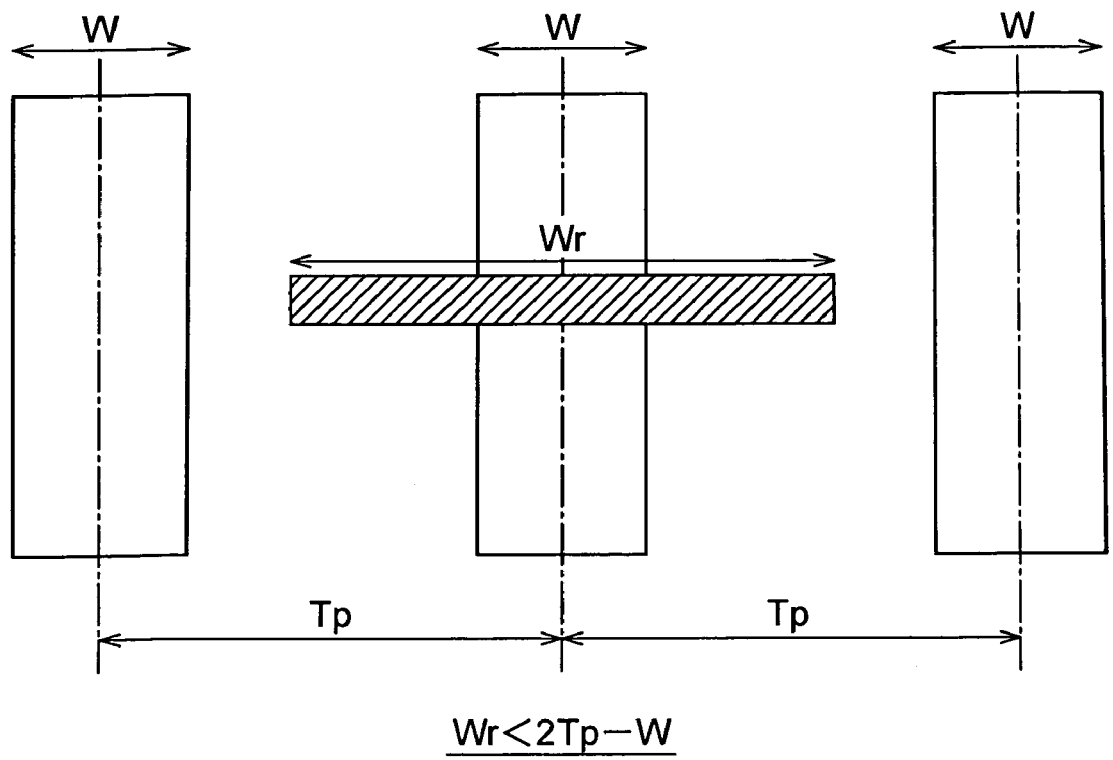
FIG. 27 is illustrative of the condition for the upper limit to the magnetic read width Wr.

Here W is the data track width, and Tp is the track pitch. It follows that there need be a condition for preventing the magnetic read width Wr from spreading across the adjoining two data, as depicted in FIG. 27.

As mentioned above, the invention according to the first group provides a magnetic recording medium having a burst pattern configuration that can get hold of some dimensional accuracy margin upon medium fabrication processes to lessen loads on medium fabrication yet gain precise position error signals and a magnetic recording/reproducing system incorporating it, because the arrangement of two pairs of burst patterns in the discrete medium is configured in a substantially trapezoidal shape (truncated quadrangular pyramid shape) in both the track width direction and the track circumference direction, and in such a way as to satisfy the predetermined relations between W1, W2, Tp and Wr wherein W1 and W2 are the upper side and the lower side of the trapezoidal shape in the track width direction, which correspond to the surface and the bottom surface of the convex magnetic recording layer, respectively, Tp is the data track pitch at the data information recording portion, and Wr is the read width of the magnetic head.

Next, the invention according to the second group in this application is explained at great length.

(2) Invention of the Second Group in this Application

The magnetic recording/reproducing system of the invention is built up of a magnetic recording medium, comprising a data information recording portion and a servo information portion for tracking, and a magnetic head operable to detect servo information on the servo information portion and to record and reproduce data information on and from the data information recording portion.

To make those skilled in the art have an understanding of the whole structure of the system, one exemplary structure of the magnetic recording/reproducing system is now explained with reference to FIG. 33

Figure 33:
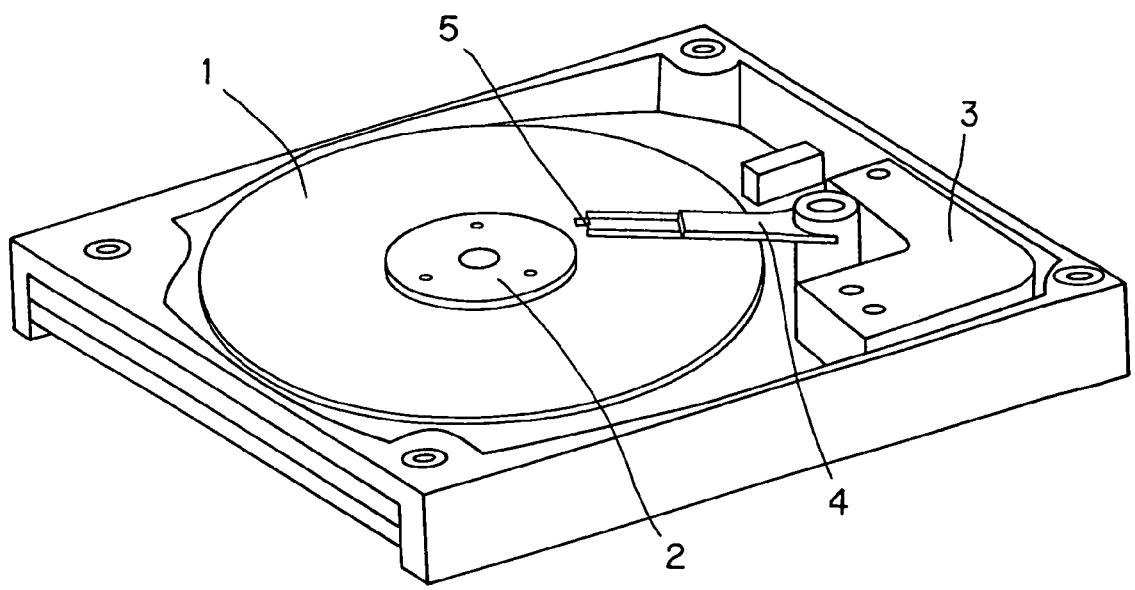
FIG. 33 is illustrative in schematic perspective of a magnetic recording/reproducing system.

Explanation of One Exemplary Structure of the Magnetic Recording/Reproducing System FIG. 33 is illustrative in schematic perspective of the magnetic recording/reproducing system that is one embodiment of the invention. In FIG. 33, reference numeral 1 stands for a magnetic recording medium for which a disk-shaped perpendicular magnetic recording medium (discrete medium) is used. This medium is rotationally driven by a spindle motor 2.

In order to read and write data from and to the magnetic recording medium, a recording/reproducing magnetic head 5 is attached to the free end of a rotating arm 4 that extends from the outer periphery to the center of the medium. The rotating arm 4 is rotated by a voice coil motor 3 so that the magnetic head 5 can be positioned at a given track, for instance, in response to servo signals detected by the recording/reproducing magnetic head 5.

The recording/reproducing magnetic head 5 comprises a recording device and a reproducing device. For instance, a single pole head of the main pole excitation type is used as the recording device, and a GMR (giant magneto-resistance effect) head is used as the reproducing device. Instead of the GMR head, a TMR (tunneling magneto-resistance effect) head or the like could be used.

While one example of the magnetic recording medium used herein is explained with reference to a perpendicular magnetic recording medium, it is understood that the invention could be applied to a so-called longitudinal recording medium.

Explanation of the Magnetic Recording Medium

The construction of the magnetic recording medium is now explained.

Figure 28:
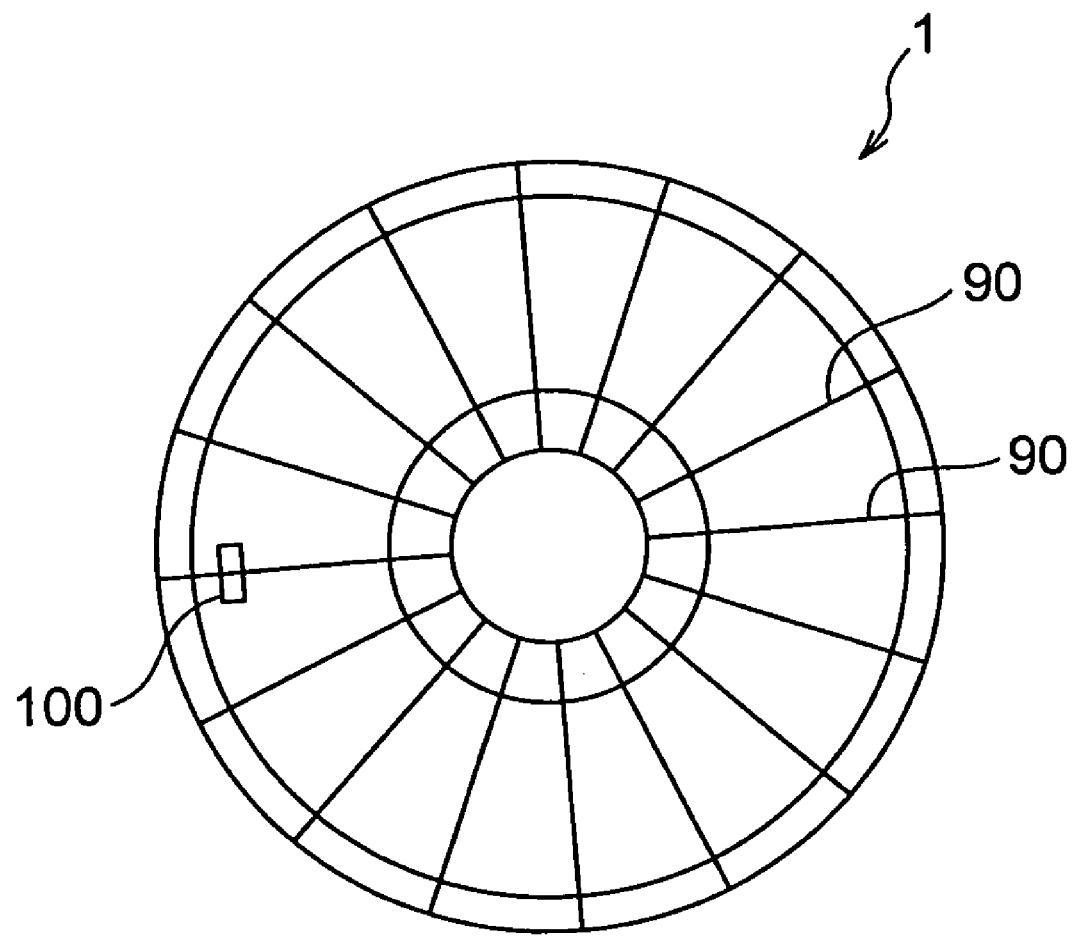
FIG. 28 is illustrative in schematic plan of the whole shape of another disk-shaped magnetic recording medium according to the invention.
Figure 29:
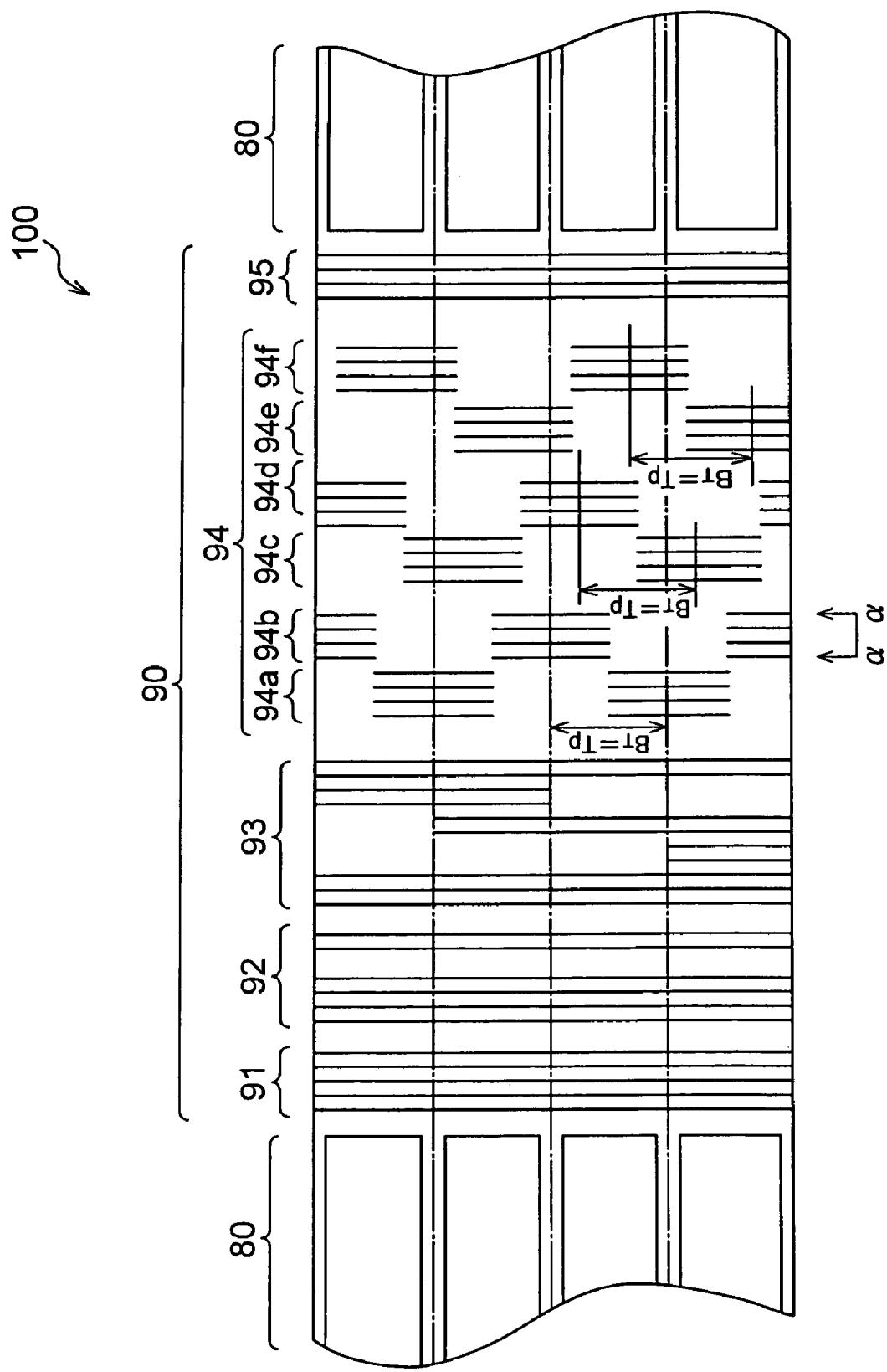
FIG. 29 is an enlarged schematic view of the small area surrounded by a rectangle in FIG. 28.

FIG. 28 is illustrative in schematic plan of the whole configuration of a disk-shaped magnetic recording medium 1 used herein, and FIG. 29 is an enlarged schematic view of a small area 100 surrounded by a rectangle in FIG. 28. In FIG. 29, a serve information portion 90 that is an area with servo signals recorded and a data information recording portion 80 that is a group of data tracks for recording and reproducing purposes are illustrated in conception.

Figure 30:
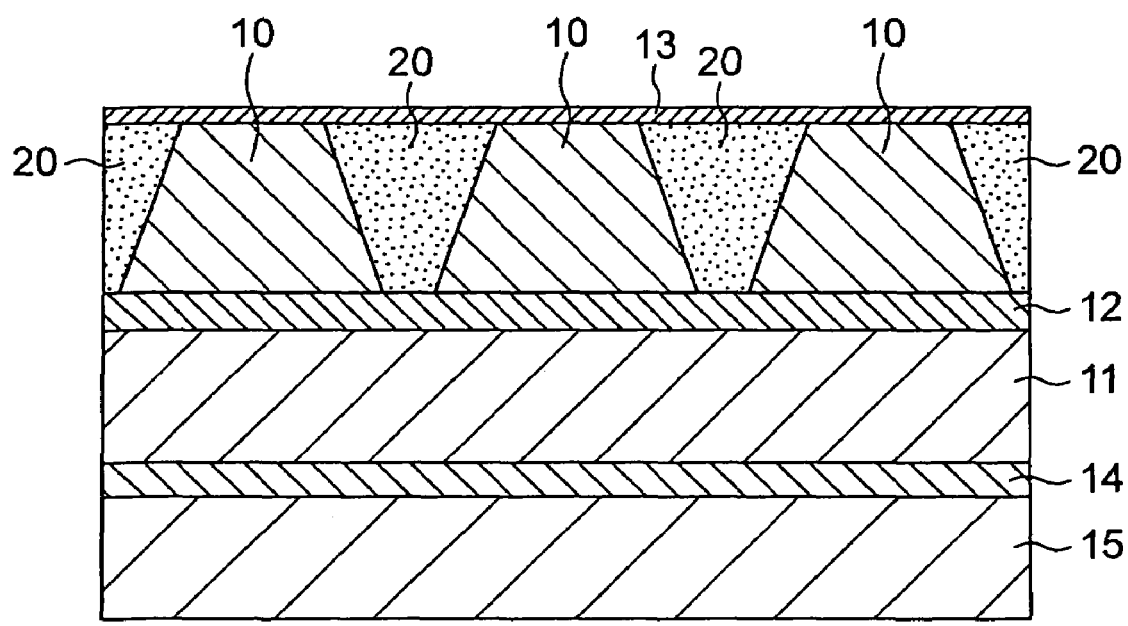
FIG. 30 is a sectional view illustrative in section of one preferred embodiment of the magnetic recording medium of the invention.

FIG. 30 is illustrative in section of a preferred embodiment of the magnetic recording medium according to the invention. In other words, FIG. 30 is substantially tantamount to a sectional view taken on α-α arrows in FIG. 29.

Although not shown in FIG. 28, a plurality of data track groups for recording and reproducing purposes are concentrically located and formed on a disk substrate.

A servo signal area (a servo information portion 90 indicated by a radial line) is formed outwardly from the center of the disk. To put it another way, the so-called sector servo arrangement wherein the disk surface is divided into sectors is applied. Servo information is then recorded on the servo information portion 90 of the magnetic recording medium by means of a servo tracking writer.

Referring in detail to the structure of the servo information portion 90, the servo information portion 90 (the so-called servo area) comprises an ISG division 91, an SVAM division 92, a gray code portion division, a burst portion division, and a pad division 95, as shown in FIG. 29, as depicted in FIG. 2.

The ISG (initial signal gain) division 91 is in the form of a continuous pattern provided for eliminating variations in the magnetic properties of a magnetic film (magnetic layer) in the magnetic recording medium, and the amount of levitation of the magnetic head. That division 91 is continuously formed in the track radial direction. While such ISG division 91 is subjected to reproducing operation by the magnetic head, the gain of a servo demodulation circuit is determined by an automatic gain control (AGC) to implement correction of output variations due to the magnetic recording medium or the magnetic head. The automatic gain control (AGC) that implements such operation is turned off upon detection of the SVAM (servo address mark) division 92 in the servo area, enabling the reproduction amplitude in the next bust division 94 to be standardized at the amplitude of the ISG division 91.

The gray code division 93 has information on each track number and each sector number recorded in it.

The burst division 94 is a pattern for obtaining precise position information that precisely tracks the magnetic head at a track position. As depicted in FIG. 29 as an example, the pattern comprises a set of a first burst 94a and a second burst 94b (in pair form), each equally stepping over the centerline for limiting adjacent track pitches, a set of a third burst 94c and a fourth burst 94b (in pair form) found at a position offset from the first set by a (1/3) track pitch, and a set of a fifth burst 94e and a sixth burst 94f (in pair form) found at a position offset from the first set by a (2/3) track pitch.

In other words, the first burst 94a and the second burst 94b are located such that, as can be seen from one embodiment of FIG. 29, the convex-form magnetic recording layers are formed while centerlines defined at positions mutually offset by one track pitch in the track width direction (burst pattern pitch Bp=track pitch Tp). Likewise, the third burst 94c and the fourth burst 94d are located such that the convex-form magnetic recording layers are formed with centerlines defined at positions offset from the center lines of the first burst 94a and the second burst 94b by a (1/3) track pitch (i.e., Bp=Tp), and the fifth burst 94e and the sixth burst 94f are located such that the convex-form magnetic recording layers are formed with centerlines defined at positions offset from the centerlines of the first burst 94a and the second burst 94b by a (2/3) track pitch (i.e., Bp=Tp).

As shown, the first burst 94a to the sixth burst 94f are patterned sequentially toward the downstream side.

In the present disclosure, the first burst track (VTR1) to the sixth burst track (VTR6) will sometimes be used as an alternative term to the first burst 94a to the sixth burst 94f.

In the burst division comprising three pairs (sets) of burst patterns in the invention, it is not always required that the pitch Bp of the burst patterns in pair form as mentioned above be in coincidence with the track pitch Tp; they could be different in some embodiments. Details of all the embodiments will be given later.

The pat division 95 is a pattern provided for taking up a delay in the demodulation circuit system in such a way as to maintain clock generation while the servo area is subjected to reproducing operation by the servo demodulation circuit.

The ISG division 91, the SVAM division 92 and the pad division 95 are recorded continuously in the disk radial direction. The gray code division 93, too, is recorded over at least a few or more tracks in the radial direction.

One preferable, exemplary sectional arrangement of the magnetic recording medium is now explained with reference to FIG. 30. FIG. 30, for instance, could be thought of as a sectional view taken on α-α arrows in FIG. 29.

As depicted from FIG. 30, the magnetic recording medium comprises a substrate 15, an orientation layer 14 formed on the substrate 15, a soft magnetic layer 11 formed on the orientation layer 14, an intermediate layer 12 formed on the soft magnetic layer 11, a perpendicular magnetic layer 10 and a nonmagnetic layer 20 both formed on the intermediate layer 12, wherein the magnetic layer 10 corresponds to a convex portion of the concave-convex arrangement and the nonmagnetic layer 20 corresponds to a concave portion thereof, and a protective layer 13 formed on the layers 10 and 20.

For the substrate 15, a glass substrate, an NiP-coated aluminum alloy substrate, an Si substrate, etc. is preferably used. The orientation layer 14, for instance, may be formed of an antiferromagnetic material such as PtMn, which applies an anisotropic magnetic field to the soft magnetic layer 11 in the track width direction. Alternatively, a nonmagnetic alloy for orientation control could be used. Furthermore, a multilayer structure with a nonmagnetic layer sandwiched between soft magnetic layers could be used.

The soft magnetic layer 11 may be formed of a CoZrNb alloy, a Co-based amorphous alloy, a soft magnetic/non-magnetic multilayer film, soft magnetic ferrite or the like.

The intermediate layer 12 is provided to control the perpendicular magnetic anisotropy and crystal grain size of the perpendicular magnetic recording layer formed on that intermediate layer. For instance, CoTi nonmagnetic alloys could be used or, alternatively, nonmagnetic metals, alloys or alloys of low permeability having similar functions could be used.

The convex form of perpendicular magnetic recording layer 10 is preferably made of a medium obtained by incorporating ferromagnetic particles such as CoPt particles in an oxide material such as $SiO_2$ in a matrix form, CoCr-based alloys, FePt alloys, Co/Pd-based artificial lattice multilayer alloys or the like. The recording layer 10 having a function of generating servo signals in the invention is configured in a trapezoidal shape, as described later.

For the material of the concave form of nonmagnetic layer 20, nonmagnetic oxides such as $SiO_2$, $Al_2O_3$, $TiO_2$ and ferrites, nitrides such as AlN, and carbides such as SiC are used.

Usually, the protective layer 13 such as a carbon thin film is formed on the surface of the convex form of perpendicular magnetic recording layer 10 or the concave form of nonmagnetic layer 20 by means of CVD techniques or the like.

The perpendicular magnetic recording layer 10 and nonmagnetic layer 20 according to the concave-convex pattern (the so-called discrete type medium), for instance, may be formed by etching the perpendicular magnetic recording layer 10 formed with a constant thickness to a predetermined concave-convex configuration, and then sputtering $SiO_2$ corresponding to a etching depth to fill the thus etched recess with it. After that, while the medium is rotated, an excessively deposited $SiO_2$ on the perpendicular magnetic recording layer 10 is removed by oblique ion-beam etching techniques or the like, thereby flattening the whole surface of the medium.

As shown in FIG. 30, it is noted that the etching treatment, by which the perpendicular magnetic recording layer 10 and nonmagnetic layer 20 according to the concave-convex pattern (the so-called discrete type medium) are formed, is stopped at the bottom of the recording layer. However, the etching treatment could be carried out to the degree that the etching depth reaches the area of the soft magnetic layer 11, thereby preparing a concave-convex pattern.

Figure 31:
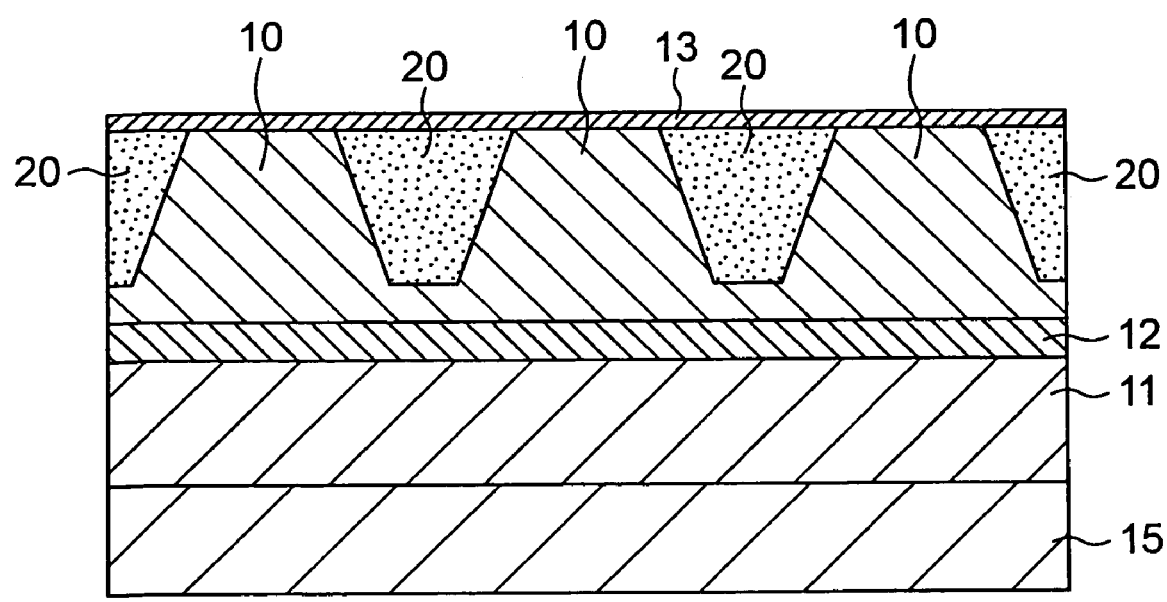
FIG. 31 is a sectional view illustrative in section of another preferred embodiment of the magnetic recording medium of the invention.

FIG. 31 shows a modification to FIG. 30. The embodiment of FIG. 31 differs from that of FIG. 30 in that when the perpendicular magnetic recording layer 10 formed with a constant thickness is etched to the predetermined concave-convex configuration, a thin magnetic layer is allowed to remain at the concave portion position without detrimental to the magnetic properties of the magnetic medium. Both the embodiments of FIGS. 31 and 30 are those of the invention, and like references in FIGS. 31 and 30 refer to like components.

Determination of the Specifications for the Servo Area

Servo Information Portion

The subject matter of the invention is (1) to get hold of some dimensional accuracy margin in medium fabrication processes, thereby lessening medium fabrication loads on accuracy, (2) to obtain precise position error signals for tracking purposes, and (3) to enlarge the practical range capable of obtaining precise position error signals, thereby increasing the degree of flexibility in system designs. Three such requirements can be satisfied by configuring the burst pattern of the burst portion in the servo area of the discrete medium in the form of three pairs (sets) of burst patterns, wherein each burst pattern is in a substantially trapezoidal shape (truncated quadrangular pyramid shape) in both the track width direction and the track circumference direction, and by determining the arrangement of the medium in such a way as to satisfy given relations between W1, W2, Tp and Wr, where W1 is the upper side of the trapezoidal shape in the track width direction, which corresponds to the surface of the convex form of magnetic recording layer, W2 is the lower side of that trapezoidal shape which corresponds to the bottom surface of the convex form of magnetic recording layer, Tp is a data track pitch at the data information recording portion, and Wr is the read width of the magnetic head. Note here that a trapezoidal perpendicular magnetic recording layer with the upper side having no delimited angles is acceptable, too.

In this connection, it is to be understood that the read width Wr of the magnetic head according to the invention (the reproduction track width of the magnetic head) is defined as follows, unlike a so-called optical width dimension actually measured by SEMs or the like.

Figure 84:
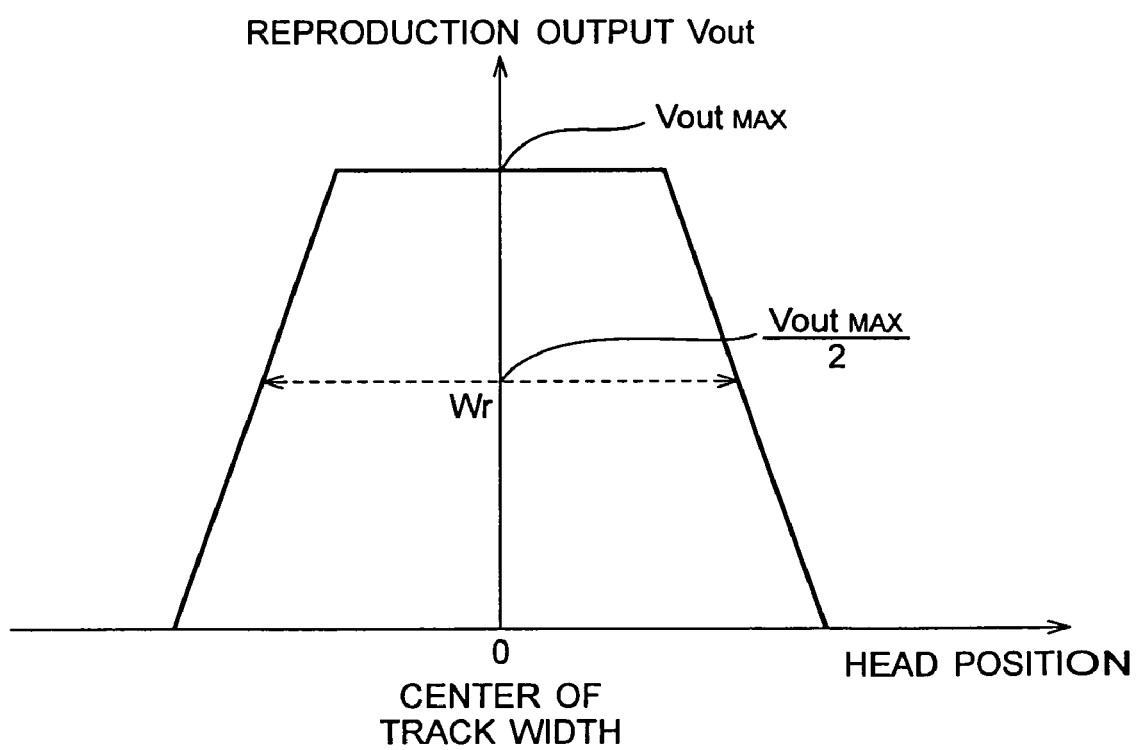
FIG. 84 is illustrative of giving an account of the definition of "read width Wr".

That is, a microtrack far much smaller than a write track width is formed. The magnetic head is moved successively in the track width direction to measure the off-track profile of reproduction outputs $V_{out}$ of the magnetic head, and the width (the so-called full width at half maximum) at an output value ($V_{out Max}/2$) that is half the maximum value ($V_{out MAX}$) of $V_{out}$ is defined as the "read width Wr". FIG. 84 is a state diagram for the definition of the "read width Wr".

In three pairs (sets) of burst patterns at the burst division of the invention, each pair (set) of burst patterns are at the same pitch Bp, and the centerlines of each pair (set) that determine the burst pattern pitch Bp are located in such a way as to shift successively by (1/3)Bp. The burst pattern pitch Bp is also determined in such a way as to have diverse values with respect to the data track pitch Tp at the data information recording portion. In the present disclosure, four cases of Bp=Tp, Bp=(3/4)Tp, Bp=(3/2)Tp and Bp=3Tp are separately considered, as described later.

The subject matter of the invention is that, in four such cases, each burst pattern is configured in a substantially trapezoidal shape (truncated quadrangular pyramid shape) in both the track width direction and the track circumference direction, wherein the arrangement of the medium is determined in such a way as to satisfy given relations between W1, W2, Tp and Wr, where W1 is the upper side of the trapezoidal shape in the track width direction, which corresponds to the surface of the convex form of magnetic recording layer, W2 is the lower side of that trapezoidal shape which corresponds to the bottom surface of the convex form of magnetic recording layer, Tp is the data track pitch at the data information recording portion, and Wr is the read width at the magnetic head.

It appears that those skilled in the art could have a better understanding of the determination of the specifications for the burst patterns, etc. by reference to, and consideration of, the results of experimentation in specific examples. Thus, the invention is now explained with reference to various experiments including inventive and comparative examples.

[I] EXPERIMENTAL EXAMPLE 2-1 WHERE M=3, AND n=3

Figure 34:
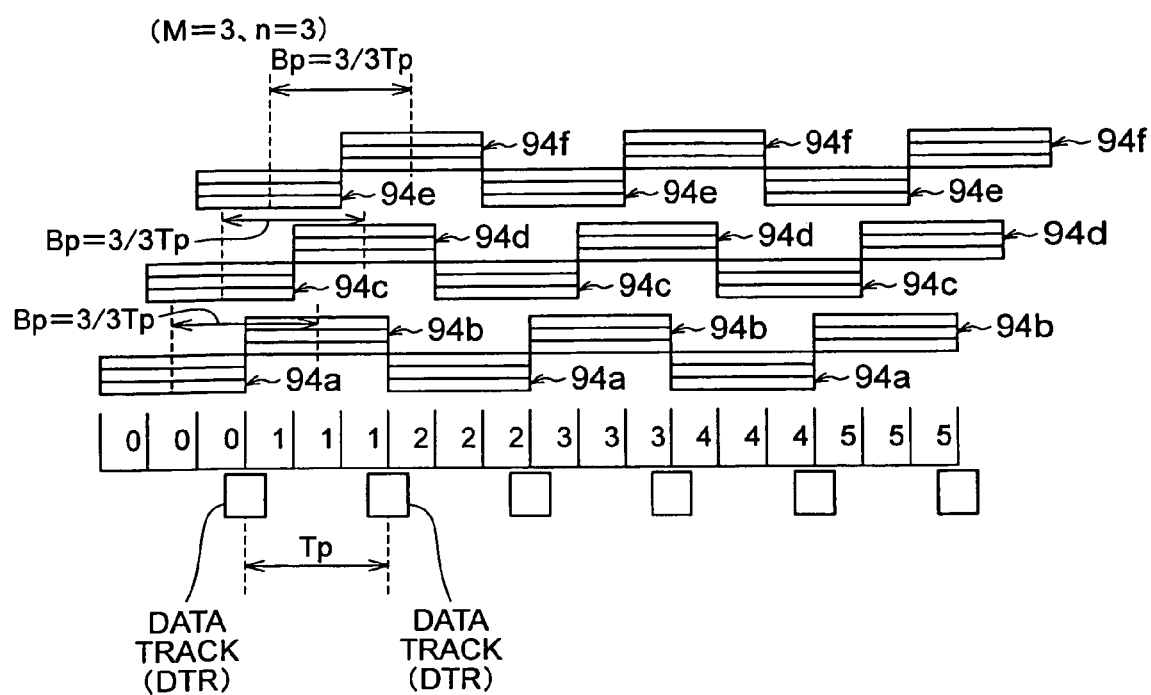
FIG. 34 is illustrative of what relation burst pattern pitch Bp has to data track pitch Tp at a burst portion comprising three pairs (sets) of burst patterns especially in the case where M=3 where M is the number of pairs (sets) of burst patterns and n in the burst pattern pitch Bp vs. data track pitch Tp relation Bp=(3/n)Tp is n=3.

As shown in FIGS. 29 and 34, this example is directed to the case where M=3 (where M is the number of pairs (sets) of burst patterns, and when the burst pattern pitch Bp vs. data track pitch Tp relation is represented by Bp=(3/n)Tp, n=3. In other words, Example 2-1 is directed to the case where in the burst division comprising three pairs (sets) of burst patterns, the burst pattern pitch Bp is the same as the data track pitch Tp (Bp=Tp).

In this case, the first burst (VTR1) 94a and the second burst (VTR2) 94b in pair form are located such that the convex-form magnetic recording layers are formed while centerlines are defined at positions mutually offset by one track pitche of distance (1Tp) in the track width direction.

The third burst (VTR3) 94c and the fourth burst (VTR4) 94d in pair form are located such that the convex-form magnetic recording layers are formed while centerlines are defined at positions mutually offset by one track pitch of distance (1Tp) in the track width direction, and the third burst (VTR3) 94c and the fourth burst (VTR4) 94d are located such that the convex-form magnetic recording layers are formed while centerlines are defined at positions offset from the centerlines of the first burst (VTR1) 94a and the second burst (VTR2) 94b by a (1/3) track pitch of distance ((1/3)Tp).

The fifth burst (VTR5) 94e and the sixth burst (VTR6) 94f in pair form are located such that the convex-form magnetic recording layers are formed while centerlines are defined at positions mutually shifted by one track pitch of distance (1Tp) in the track width direction, and the fifth burst (VTR5) 94e and the sixth burst (VTR6) 94f are located such that the convex-form magnetic recording layers are formed while centerlines are defined at positions offset from the center lines of the first burst (VTR1) 94a and the second burst (VTR2) 94b by a (2/3) track pitch of distance ((2/3)Tp).

Construction of the Magnetic Recording Medium

For the purpose of application of the sector servo arrangement with a disk surface divided into sectors as shown in FIG. 28, such a servo area 90 as depicted in FIG. 29 was formed. Specifically, an ISG division 91, an SVAM division 92, a gray code division 93, a burst division 94 and a pad division 95 were formed according to the pattern for each servo signal.

Figure 32:
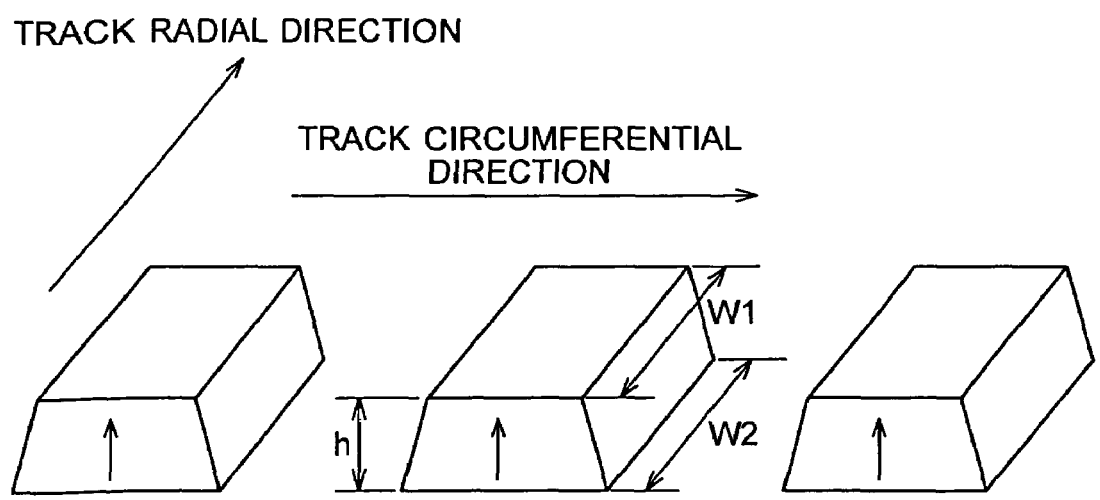
FIG. 32 is illustrative in schematic perspective of the structure of a trapezoidal perpendicular magnetic recording layer.

The convex-form magnetic recording layer (convex magnetic recording layer) at the burst division 94 for recording burst signals was configured as a trapezoidal perpendicular magnetic recording layer that is typically depicted in FIG. 32. Here, W1 is the dimension of the upper side of the trapezoid corresponding to the surface of the convex magnetic recording layer, W2 is the dimension of the lower side of the trapezoid corresponding to the bottom surface of the convex magnetic recording layer, and h is the height from the lower side W2 to the upper side W1. Note here that W2>W1.

Convex portions at other divisions, i.e., the ISG division 91, the SVAM division 92, the gray code division 93 and the pad division 95 were located at one bit spacing, each configured as a convex-form perpendicular magnetic recording layer in a trapezoidal belt form that was elongate in the disk radial direction, although not shown.

As can be seen from the sectional arrangement of the medium of FIG. 30, a 15 nm thick PtMn layer acting as an orientation layer 14 (underlay layer 14) was formed on a mirror-polished substrate 15. A 200 nm thick soft magnetic layer 11 comprising CoZrNb was formed on the orientation layer 14. An 8 nm thick intermediate layer 12 comprising a nonmagnetic alloy CoTi was formed on the soft magnetic layer 11. Then, a 15 nm thick perpendicular magnetic recording layer 10 was formed on the intermediate layer 12, followed by etching in given pattern for the preparation of a predetermined concave-convex configuration. Then, $SiO_2$ sputtering was implemented to fill the etched recess with $SiO_2$. Then, while the substrate filled with $SiO_2$ was rotated, oblique ion beam etching treatment was carried out to remove an excessively sputtered $SiO_2$ from on the perpendicular magnetic recording layer 10 to make the surface of the medium flat. A 1 nm thick protective film 13 in a carbon thin film form was formed on the surface of the medium by CVD technique, and a 1 nm thick Fomblin-based lubricant was coated on the protective film 13 to obtain a medium sample in complete form. Note here that in the material used for the perpendicular magnetic recording layer 10, CoPt ferromagnetic particles were contained in $SiO_2$ in a matrix form.

By measurement of magnetic properties on a vibrating sample magnetometer (VSM), the perpendicular magnetic recording layer was found to have a saturation magnetization Ms of 350 em/cc and a residual saturation magnetization Mr of 340 emu/cc. The thickness or height, h, of the perpendicular magnetic recording layer was set at 15 nm as already described.

Servo signal recording density was set at 130 K·FRPI (flux reversal per inch), and the track pitch Tp at the data area was set at 100 nm equivalent to 245 K·TPI (track per inch). The width of the track (data track (DTR)) at the data area was set at 70 nm.

Experimental bursts in such various configurations as referred to in Table 2-1, given below, were prepared while the lengths of the upper side W1 and the lower side W2 of the trapezoidal perpendicular magnetic recording layer corresponding to the burst pattern depicted in FIG. 32 were varied under varied etching conditions for concave-convex structure formation such that they departed largely from the reference value of the track pitch Tp of the data track. Throughout the experimental examples, the angle made between the slant and the base of the trapezoid was set at 50°. In another parlance, the trapezoidal configuration used here satisfied tan 50°=2 h/(W2−W1).

The experimental bursts were all configured in such a way as to be M=3 and n=3, as already described (FIG. 34). The first burst track (VTR1) 94a, the second burst track (VTR2) 94b, the third burst track (VTR3) 94c, the fourth burst track (VTR4) 94d, the fifth burst track (VTR5) 94e and the sixth burst track (VTR6) 94f were located with respect to the pattern of the data track (DTR) 80, so that differential signal outputs from VTR1 and VTR2, differential signal outputs from VTR3 and VTR4 and differential signal outputs VTR5 and VTR6 with respect to the magnetic head position could be synthesized together to generate a lot more precise PES signals.

For the recording magnetic head, a thin-film inductive head with a magnetic write width of 80 nm was used, and for the reproducing magnetic head, a giant magnetoresistance effect (GMR) head was used. Note here that for the magnetic read width Wr of the reproducing magnetic head, various widths were used in consideration of relations to other parameters (W1, W2, Tp), as shown in Table 2-1.

The perpendicular magnetic recording medium subjected to concave-convex processing for the above given servo area and data area was processed in such a way as to magnetize the convex form of perpendicular magnetic recording layer to generate a servo signal magnetic field. Specifically, the disk was located between the magnetic pole surfaces of an electromagnet with a generated DC magnetic field of 15 kOe such that its surfaces were parallel with the magnetic pole surfaces, after which the trapezoidal perpendicular magnetic recording layer at the servo area and the data area was collectively magnetized to record servo signals.

With the thus prepared magnetic recording medium for Experimental Example 2-1, tracking control experimentation was conducted in the following manner.

Specifically, at the discrete track disk and read magnetic head shown in Table 2-1 given below, W1, W2 and Wr were applied in combinations of values smaller and/or larger than the reference value of the track pitch Tp to find all position error signals PES. In consideration of fluctuations in adjacent track positions being more or less allowable, whether the linearity of PES as tracking characteristics is at an enable or disable level is determined.

In this conjunction, see the pertinent drawings referred to in Table 2-1 illustrative in schematic of the relations between W1, W2, Tp and Tr in the experimental example performed here. The EPS signals, too, are indicated in these drawings.

TABLE 2-1

(M = 3; n = 3)

Figure 38:
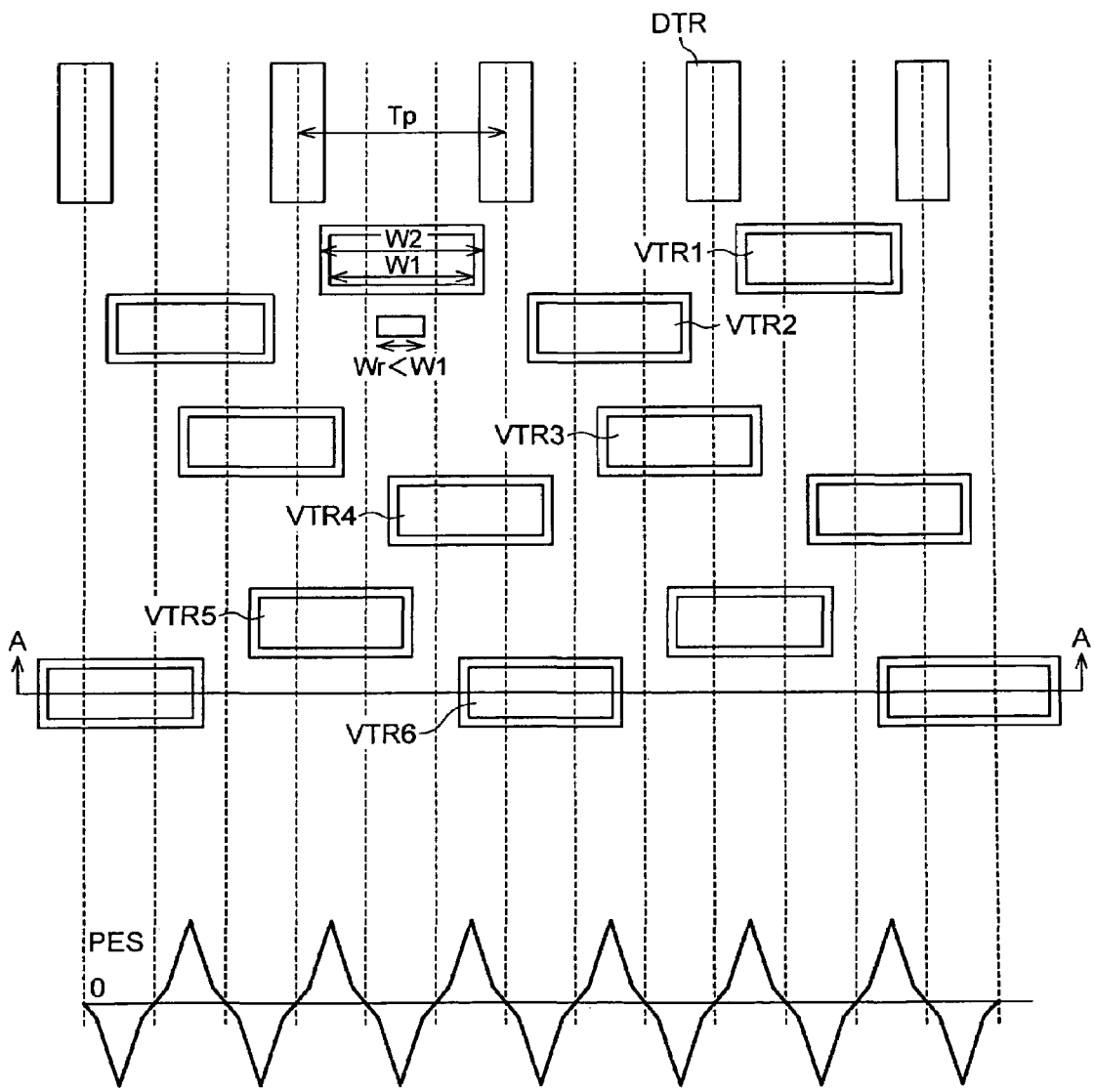
FIG. 38 is illustrative of a further specific experimentation embodiment, wherein the relations of burst patterns W1, W2 and track pitch Tp to magnetic read width Wr are schematically illustrated together with position error signal PES.
Figure 39:
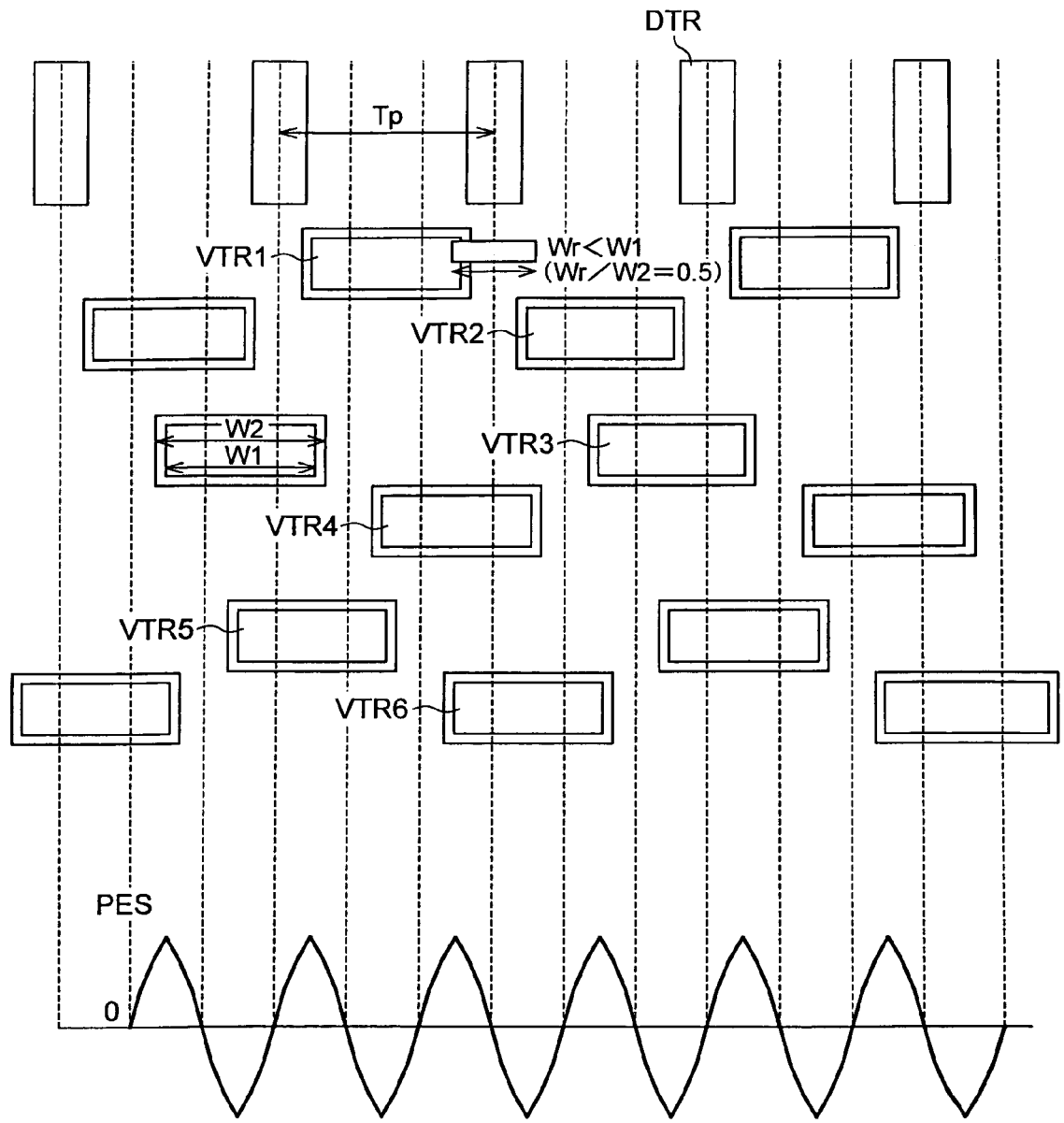
FIG. 39 is illustrative of a further specific experimentation embodiment, wherein the relations of burst patterns W1, W2 and track pitch Tp to magnetic read width Wr are schematically illustrated together with position error signal PES.
Figure 40:
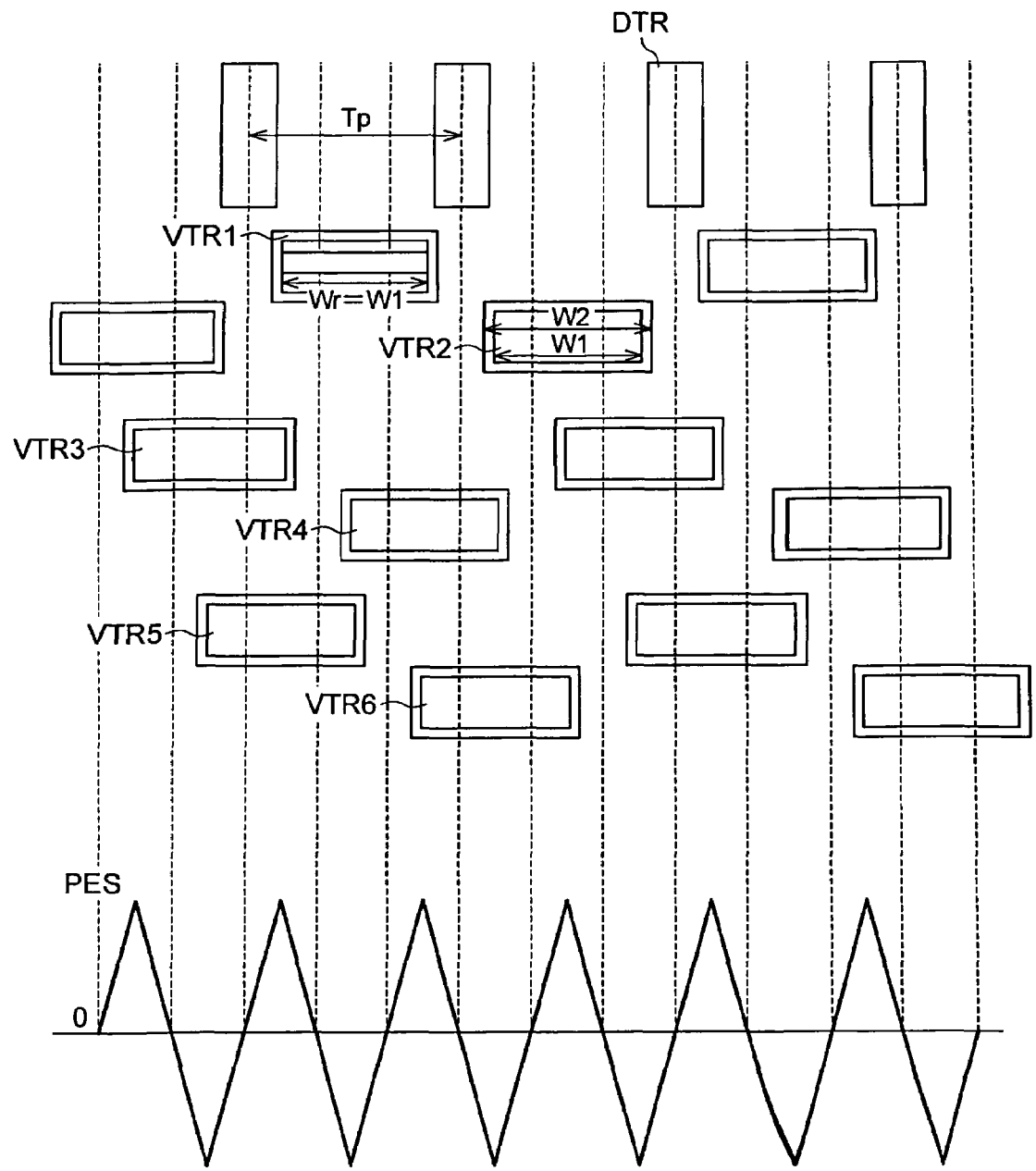
FIG. 40 is illustrative of a further specific experimentation embodiment, wherein the relations of burst patterns W1, W2 and track pitch Tp to magnetic read width Wr are schematically illustrated together with position error signal PES.
Figure 41:
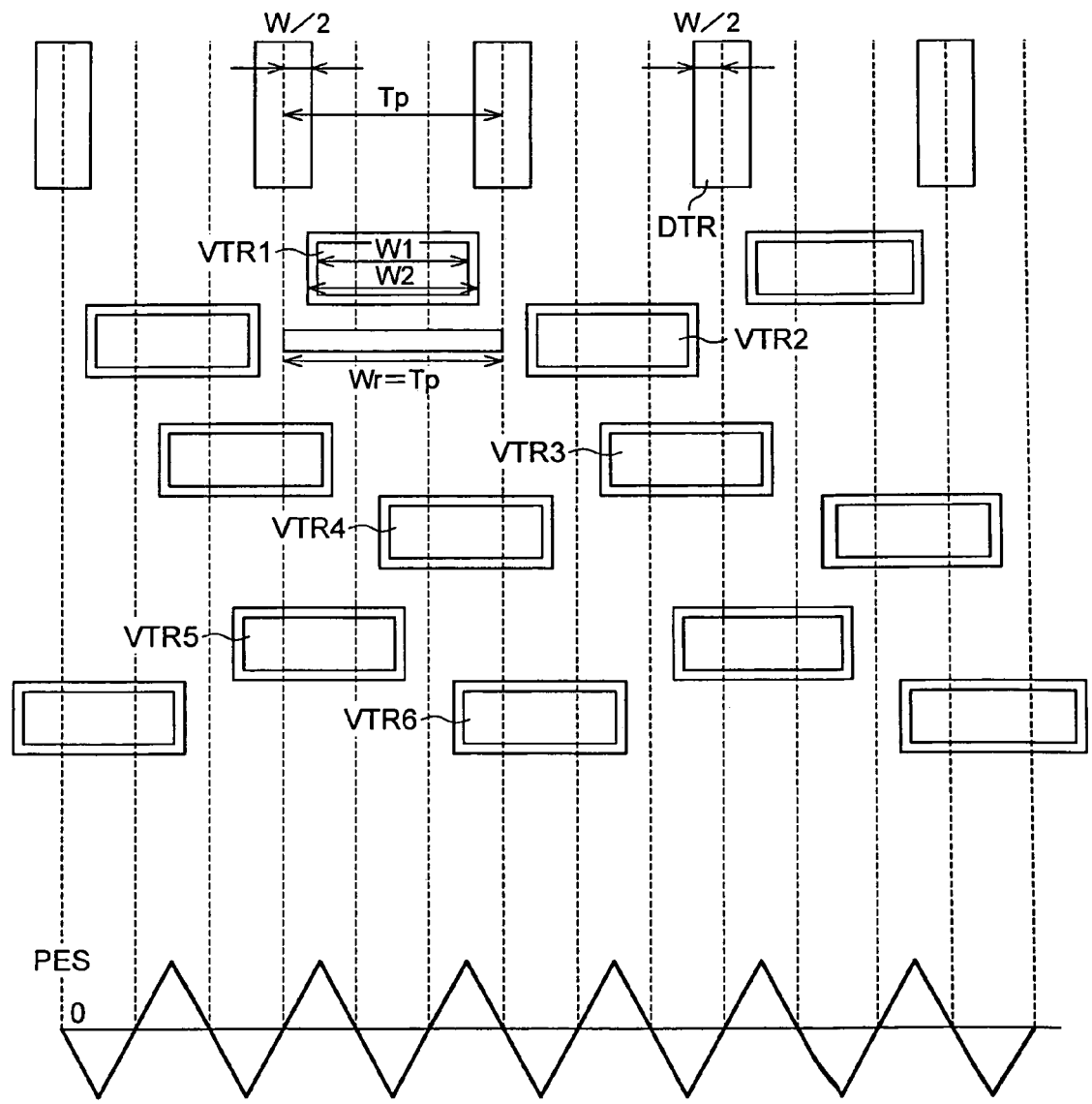
FIG. 41 is illustrative of a further specific experimentation embodiment, wherein the relations of burst patterns W1, W2 and track pitch Tp to magnetic read width Wr are schematically illustrated together with position error signal PES.
Figure 42:
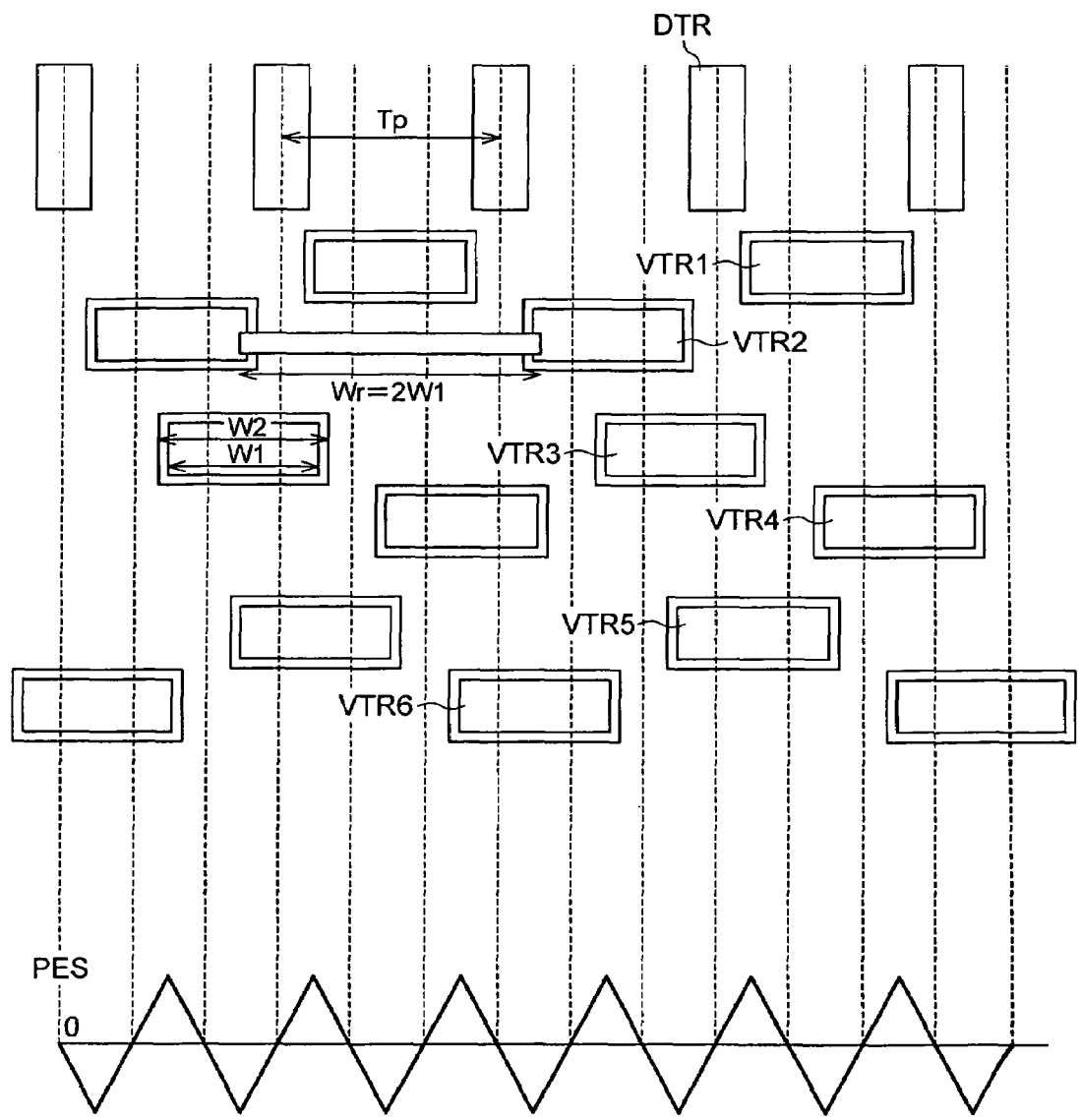
FIG. 42 is illustrative of a further specific experimentation embodiment, wherein the relations of burst patterns W1, W2 and track pitch Tp to magnetic read width Wr are schematically illustrated together with position error signal PES.
Figure 43:
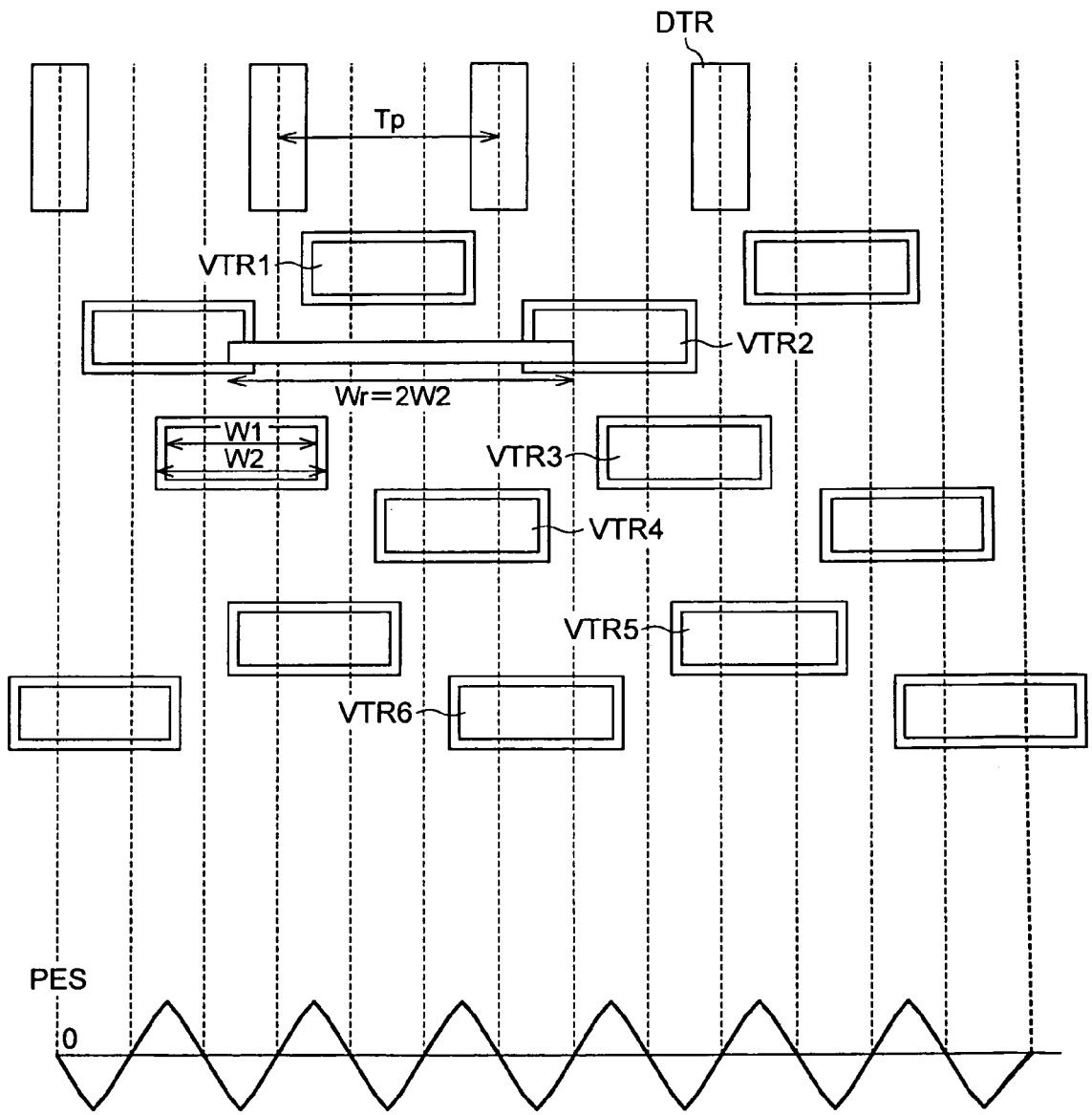
FIG. 43 is illustrative of a further specific experimentation embodiment, wherein the relations of burst patterns W1, W2 and track pitch Tp to magnetic read width Wr are schematically illustrated together with position error signal PES.
Figure 44:
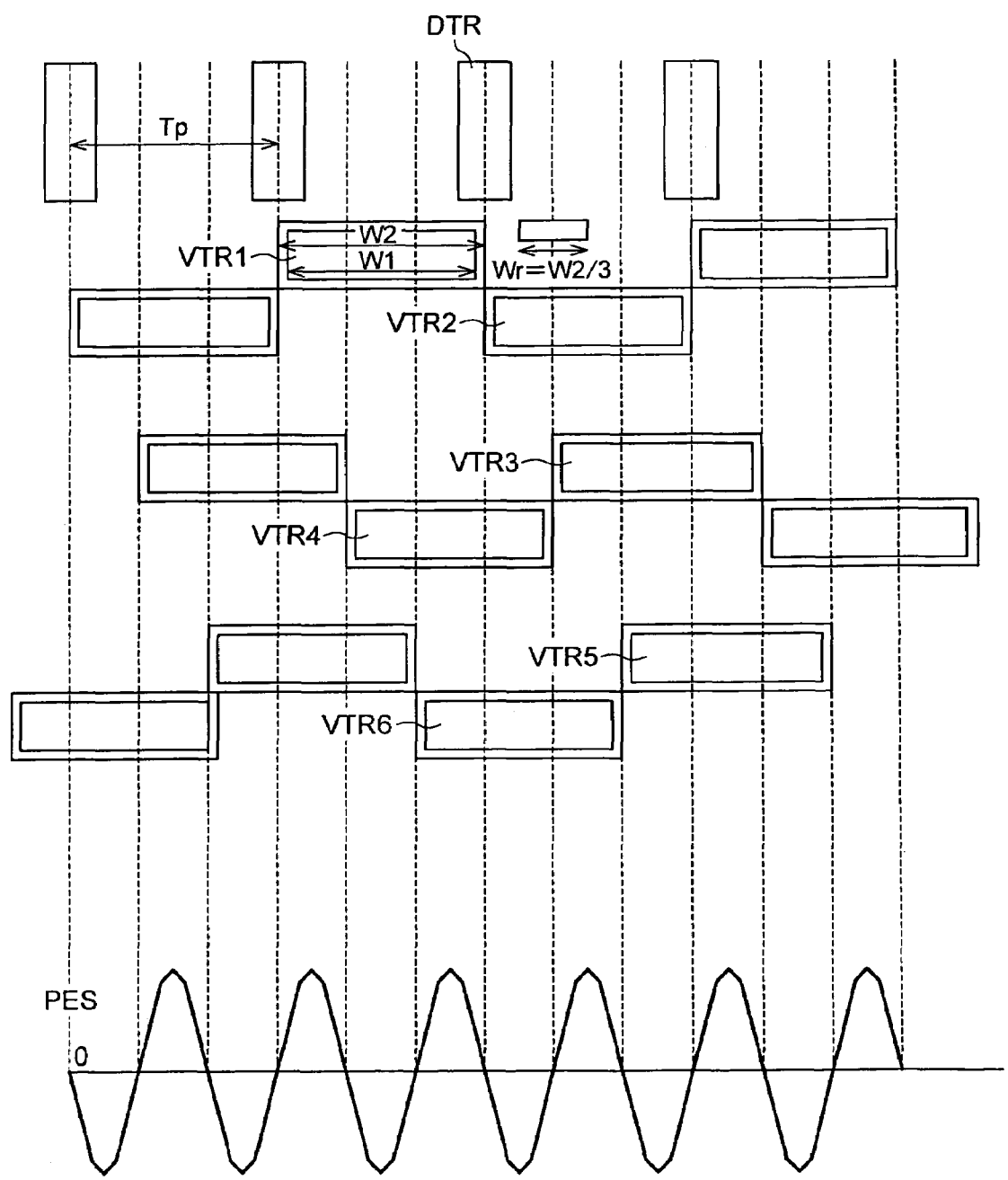
FIG. 44 is illustrative of a further specific experimentation embodiment, wherein the relations of burst patterns W1, W2 and track pitch Tp to magnetic read width Wr are schematically illustrated together with position error signal PES.
Figure 45:
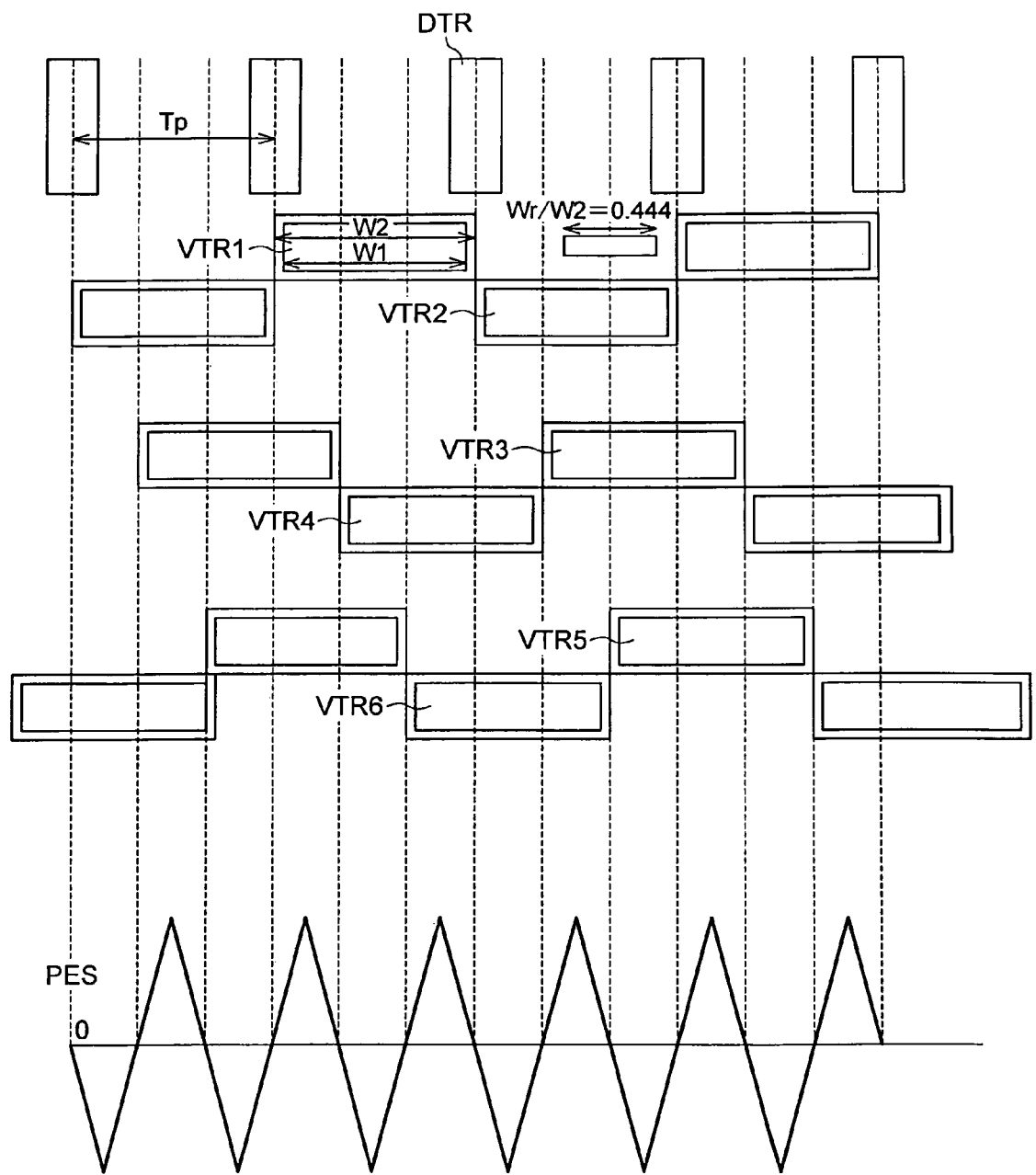
FIG. 45 is illustrative of a further specific experimentation embodiment, wherein the relations of burst patterns W1, W2 and track pitch Tp to magnetic read width Wr are schematically illustrated together with position error signal PES.
Figure 46:
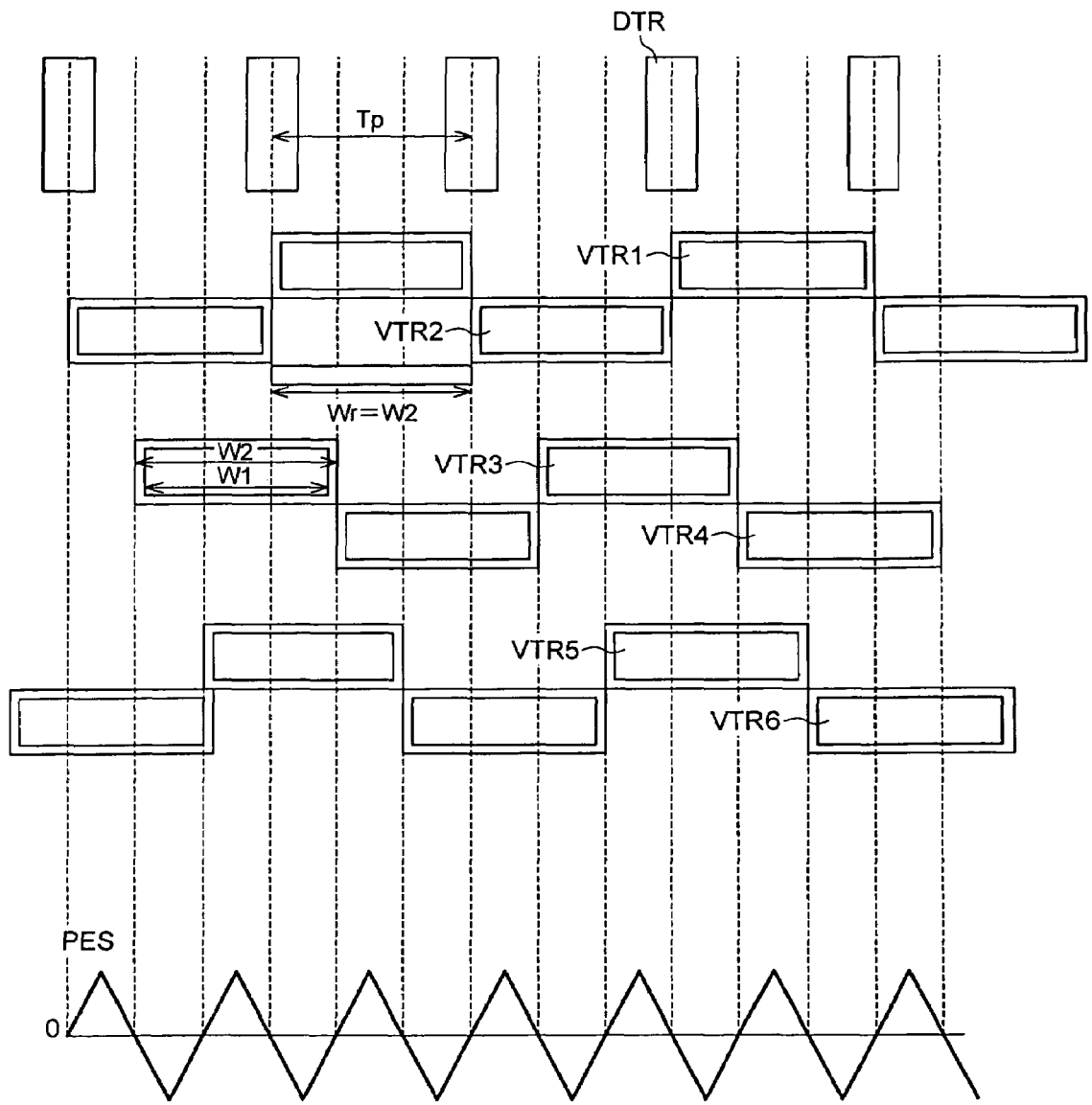
FIG. 46 is illustrative of a further specific experimentation embodiment, wherein the relations of burst patterns W1, W2 and track pitch Tp to magnetic read width Wr are schematically illustrated together with position error signal PES.
Figure 47:
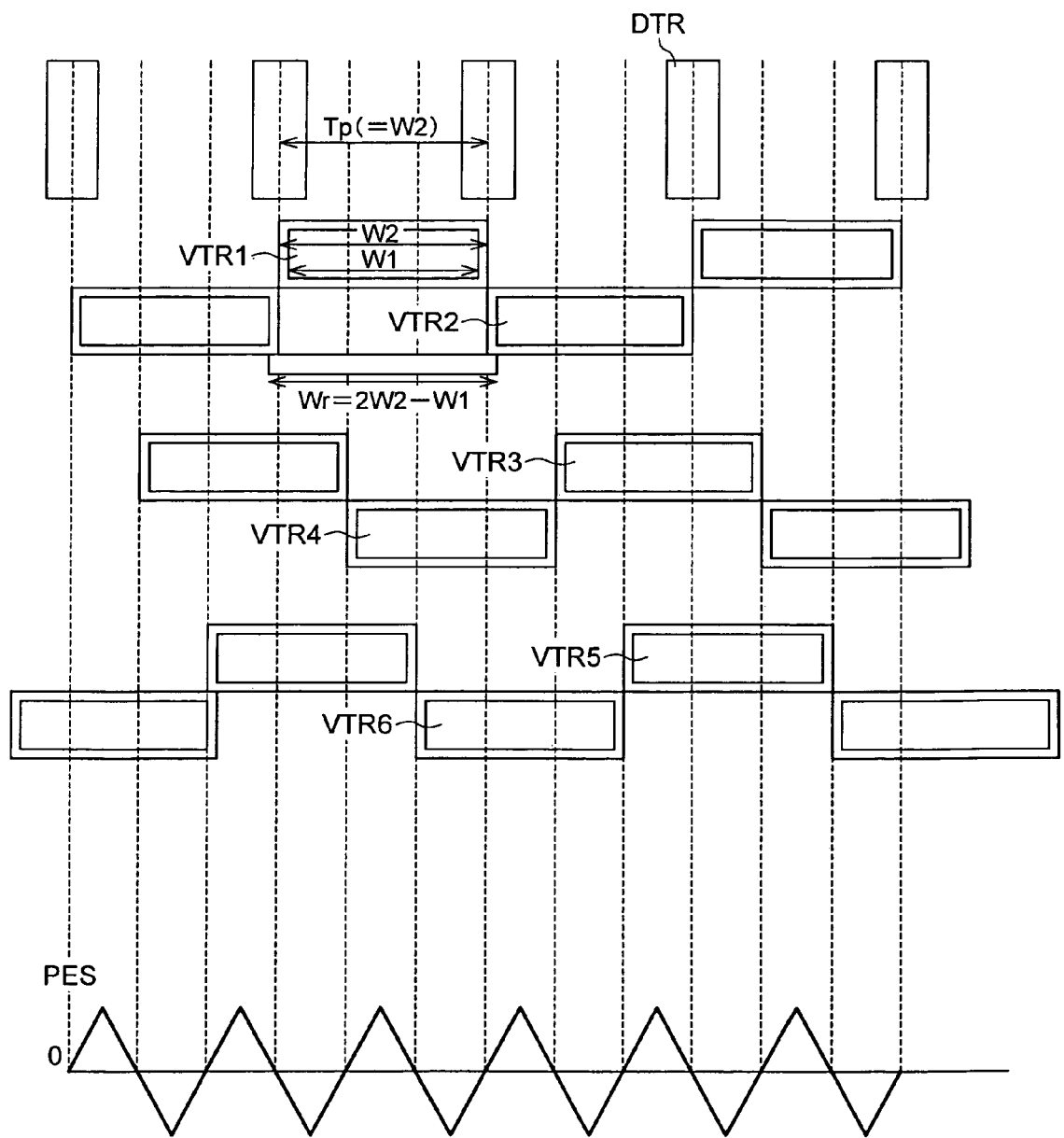
FIG. 47 is illustrative of a further specific experimentation embodiment, wherein the relations of burst patterns W1, W2 and track pitch Tp to magnetic read width Wr are schematically illustrated together with position error signal PES.
Figure 48:
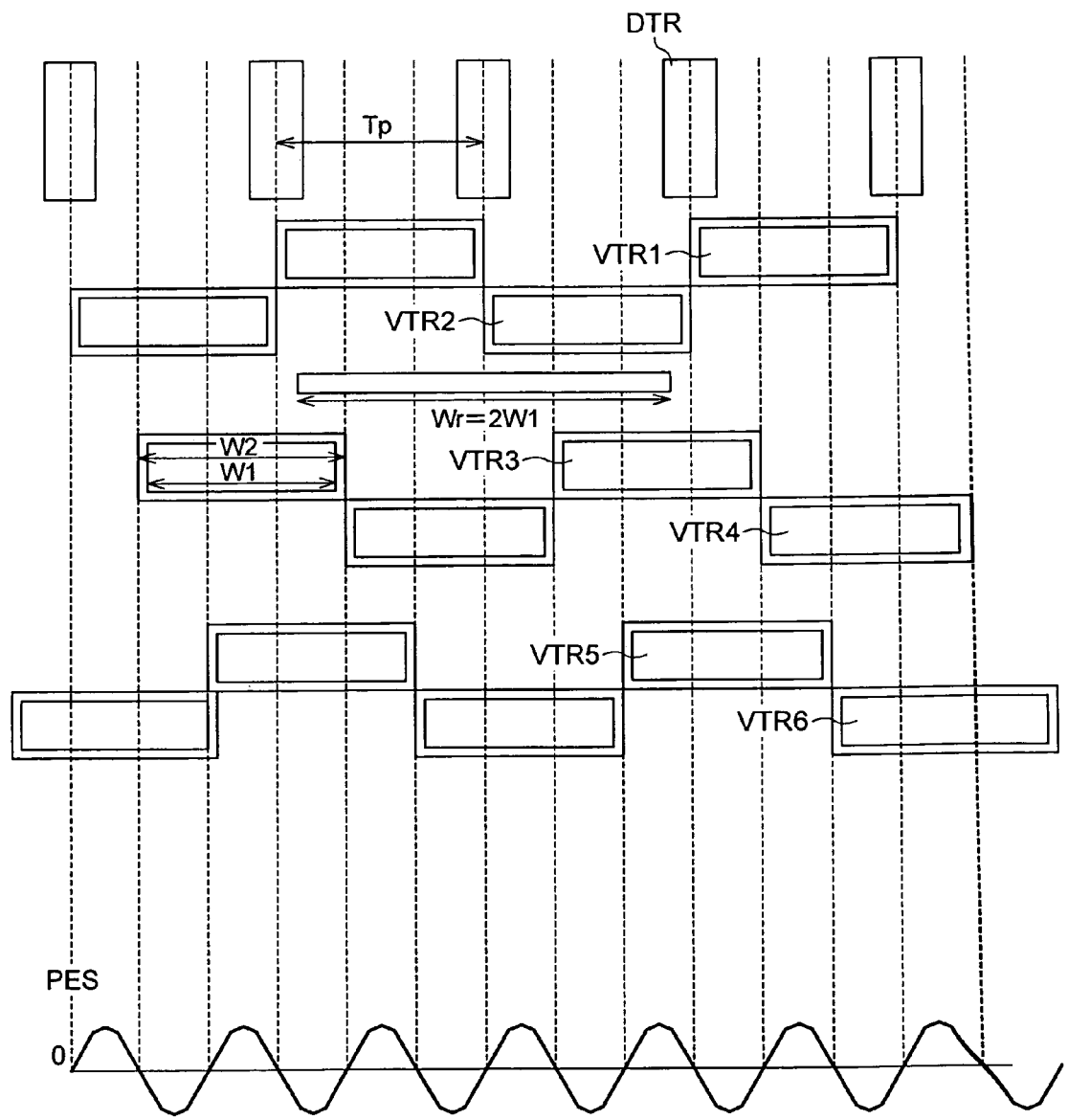
FIG. 48 is illustrative of a further specific experimentation embodiment, wherein the relations of burst patterns W1, W2 and track pitch Tp to magnetic read width Wr are schematically illustrated together with position error signal PES.
Figure 49:
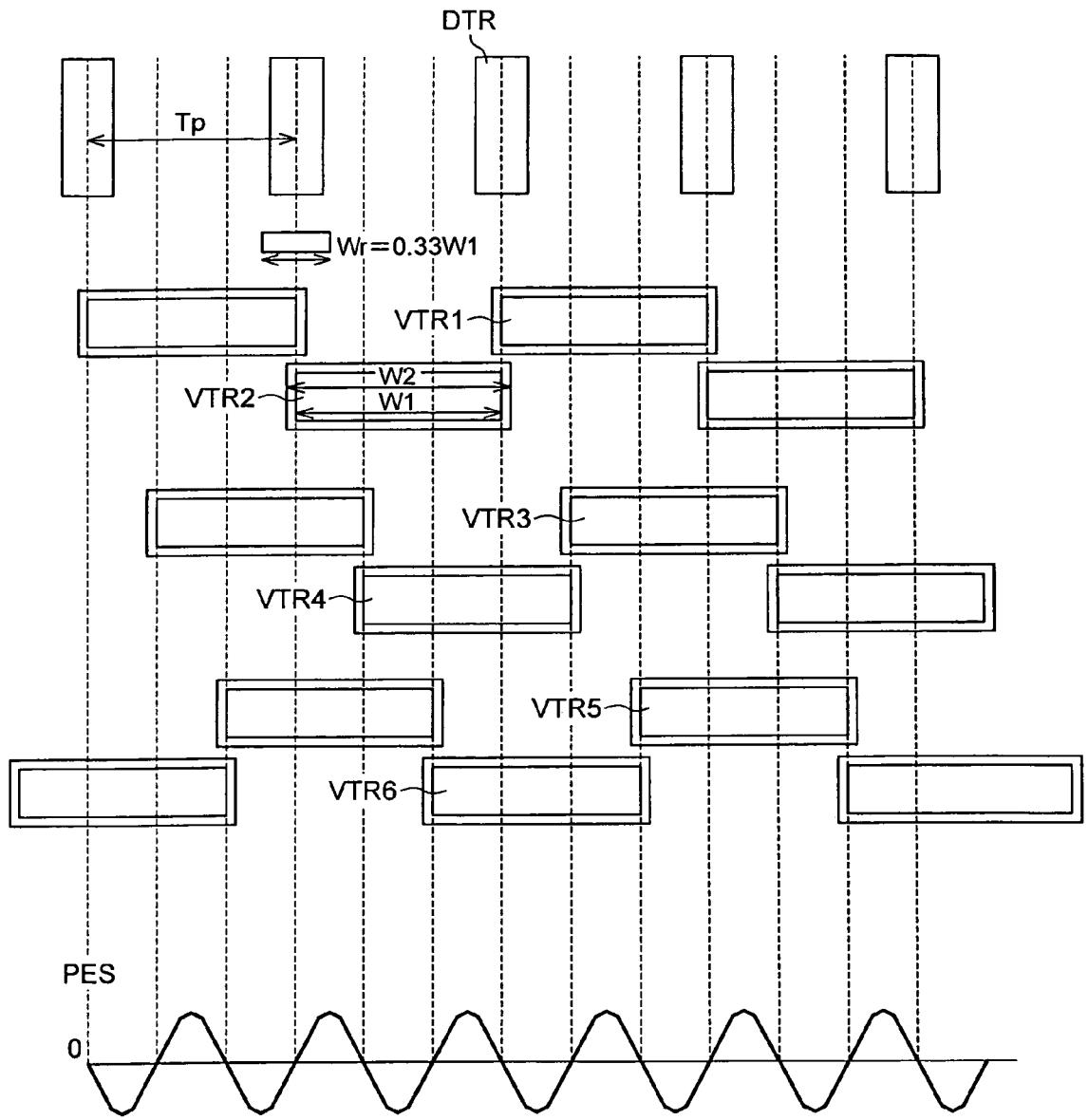
FIG. 49 is illustrative of a further specific experimentation embodiment, wherein the relations of burst patterns W1, W2 and track pitch Tp to magnetic read width Wr are schematically illustrated together with position error signal PES.
Figure 50:
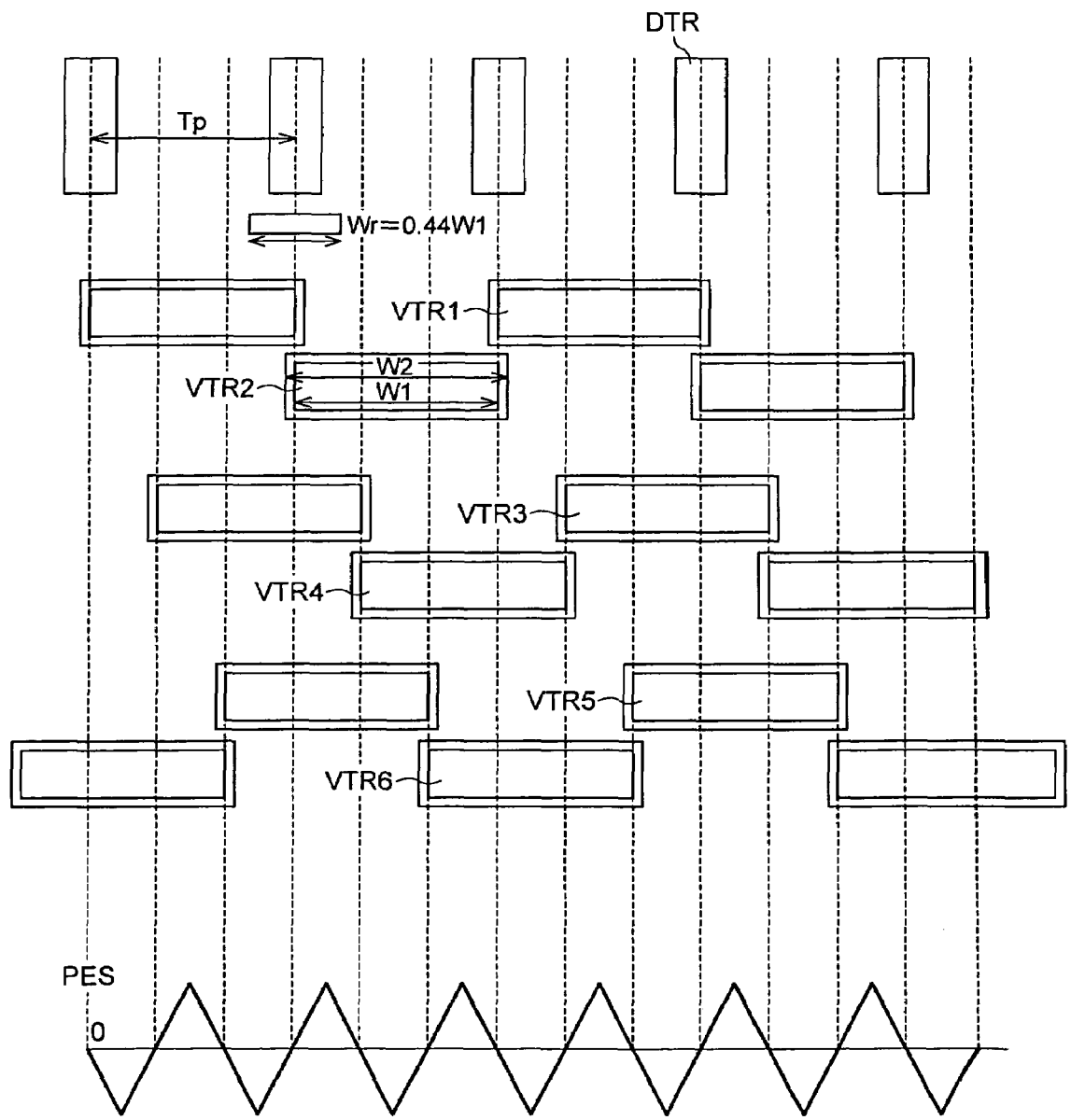
FIG. 50 is illustrative of a further specific experimentation embodiment, wherein the relations of burst patterns W1, W2 and track pitch Tp to magnetic read width Wr are schematically illustrated together with position error signal PES.
Figure 51:
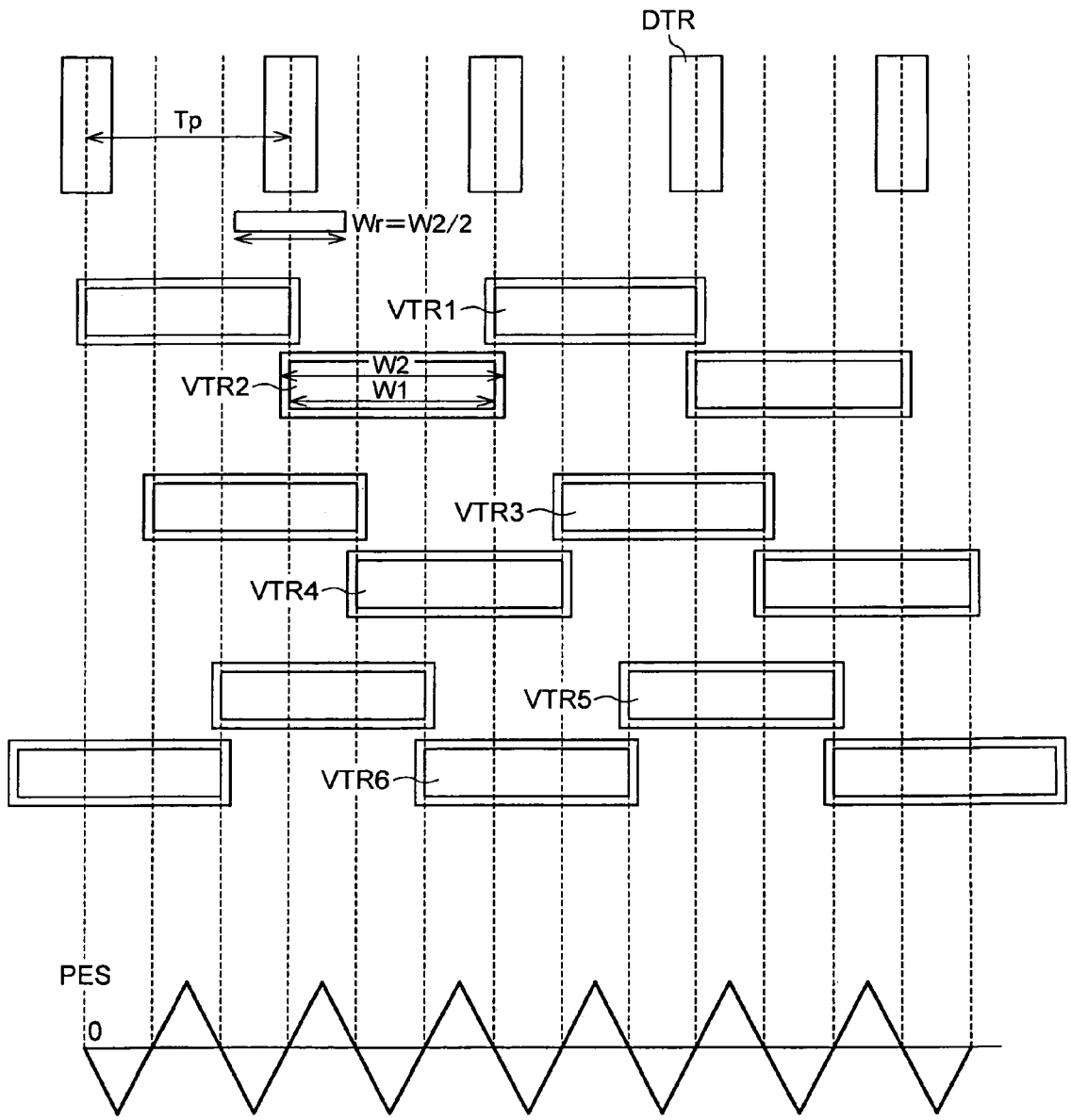
FIG. 51 is illustrative of a further specific experimentation embodiment, wherein the relations of burst patterns W1, W2 and track pitch Tp to magnetic read width Wr are schematically illustrated together with position error signal PES.
Figure 52:
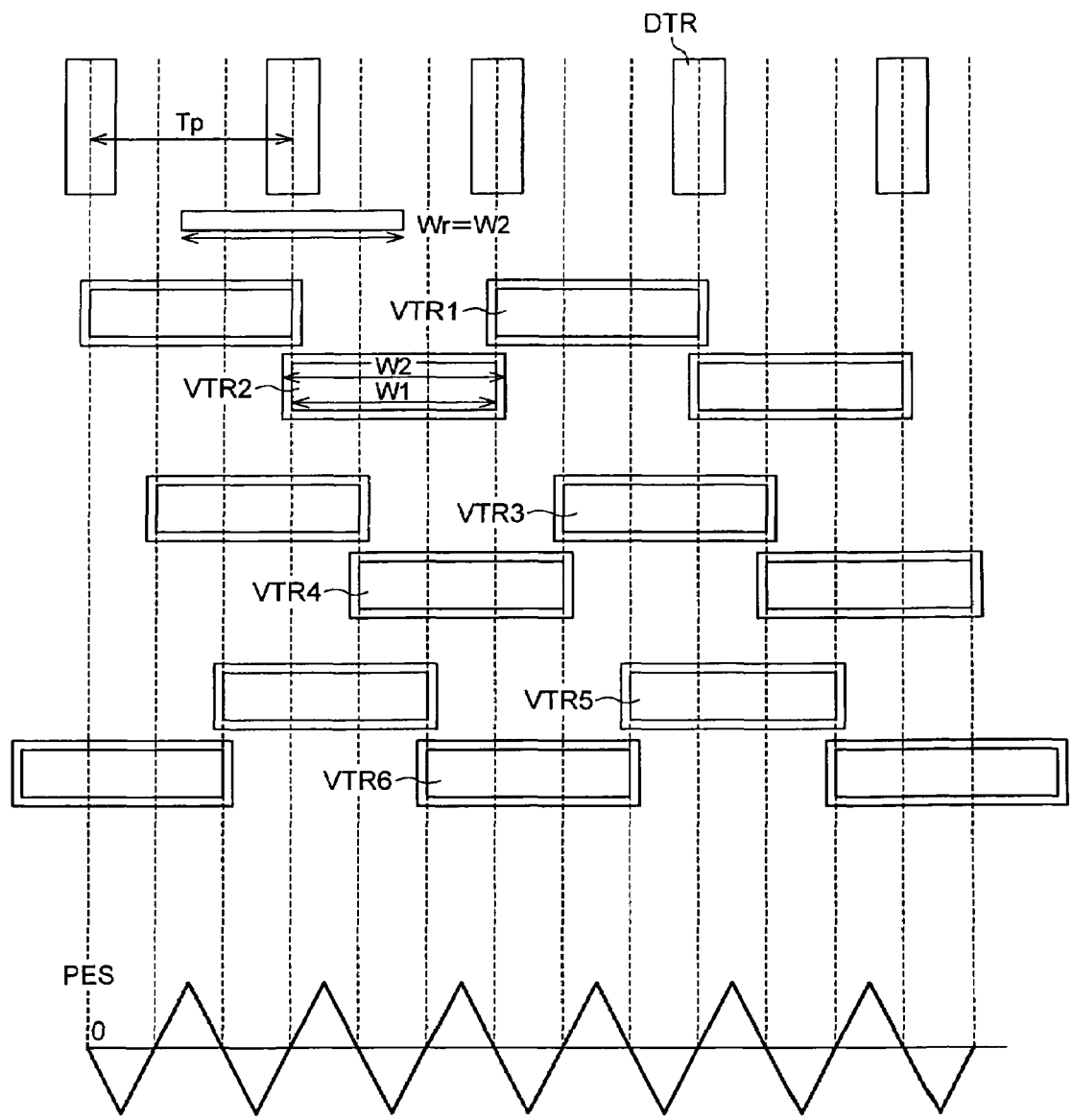
FIG. 52 is illustrative of a further specific experimentation embodiment, wherein the relations of burst patterns W1, W2 and track pitch Tp to magnetic read width Wr are schematically illustrated together with position error signal PES.
Figure 53:
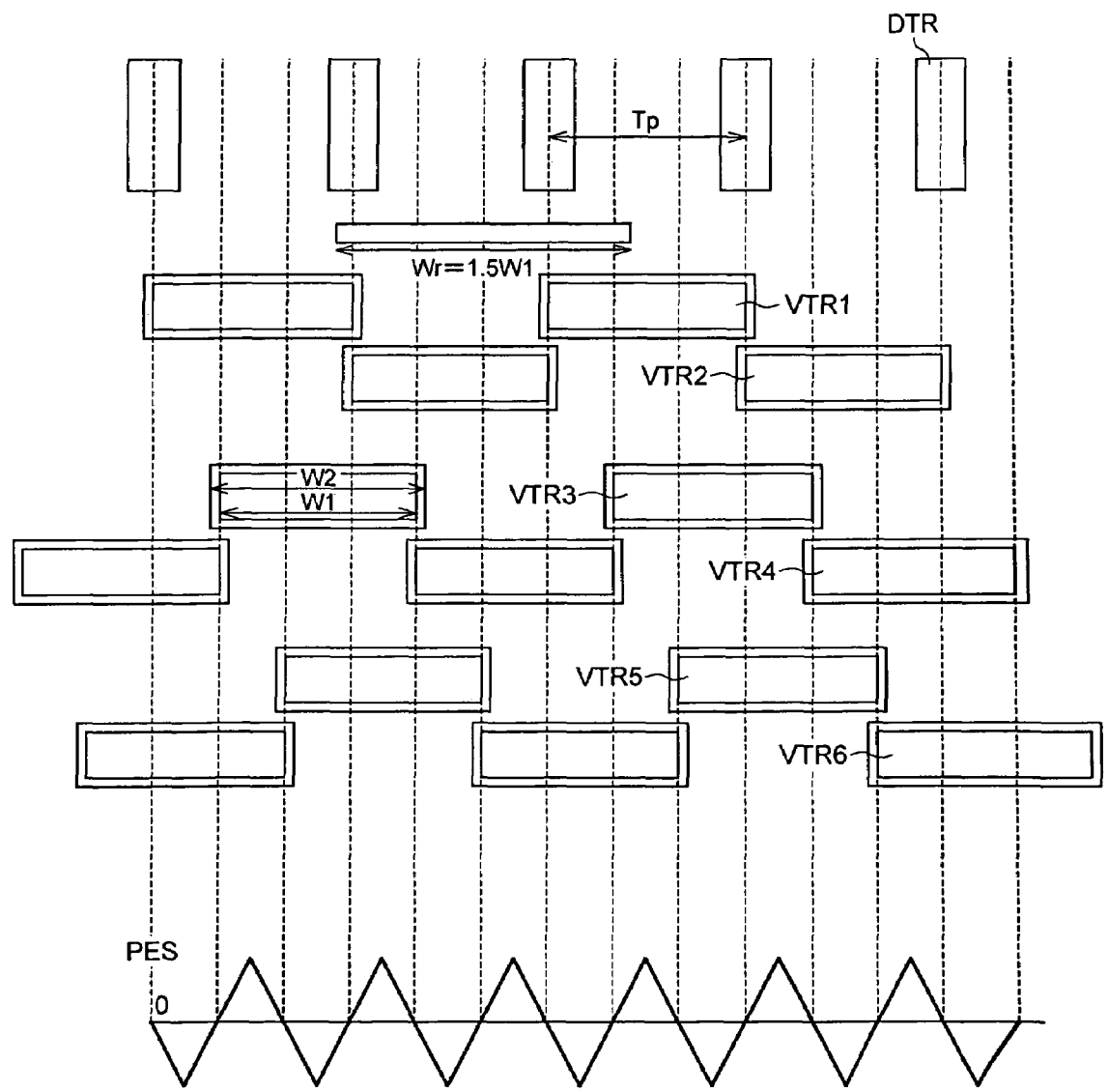
FIG. 53 is illustrative of a further specific experimentation embodiment, wherein the relations of burst patterns W1, W2 and track pitch Tp to magnetic read width Wr are schematically illustrated together with position error signal PES.
Figure 54:
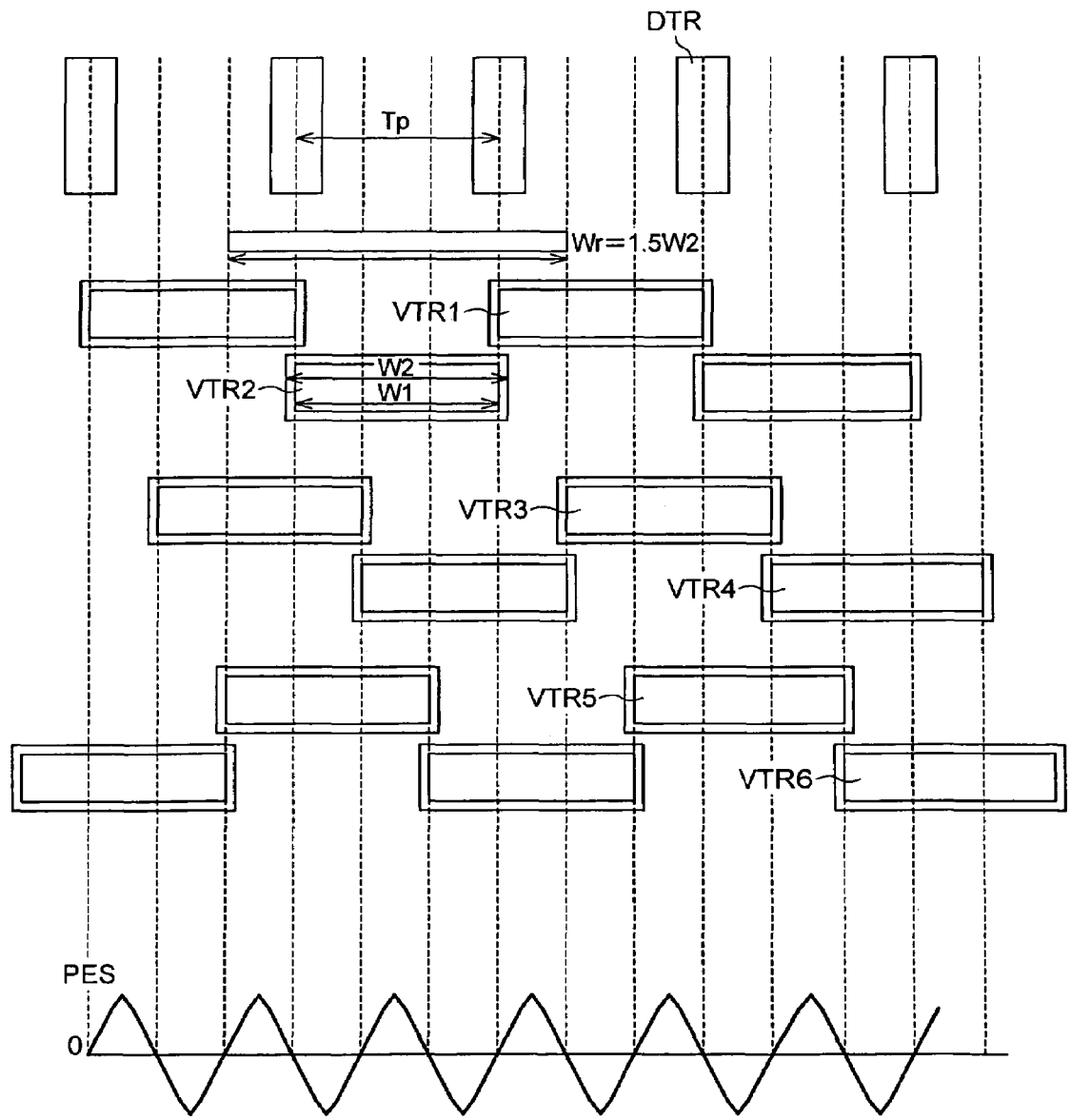
FIG. 54 is illustrative of a further specific experimentation embodiment, wherein the relations of burst patterns W1, W2 and track pitch Tp to magnetic read width Wr are schematically illustrated together with position error signal PES.
Figure 55:
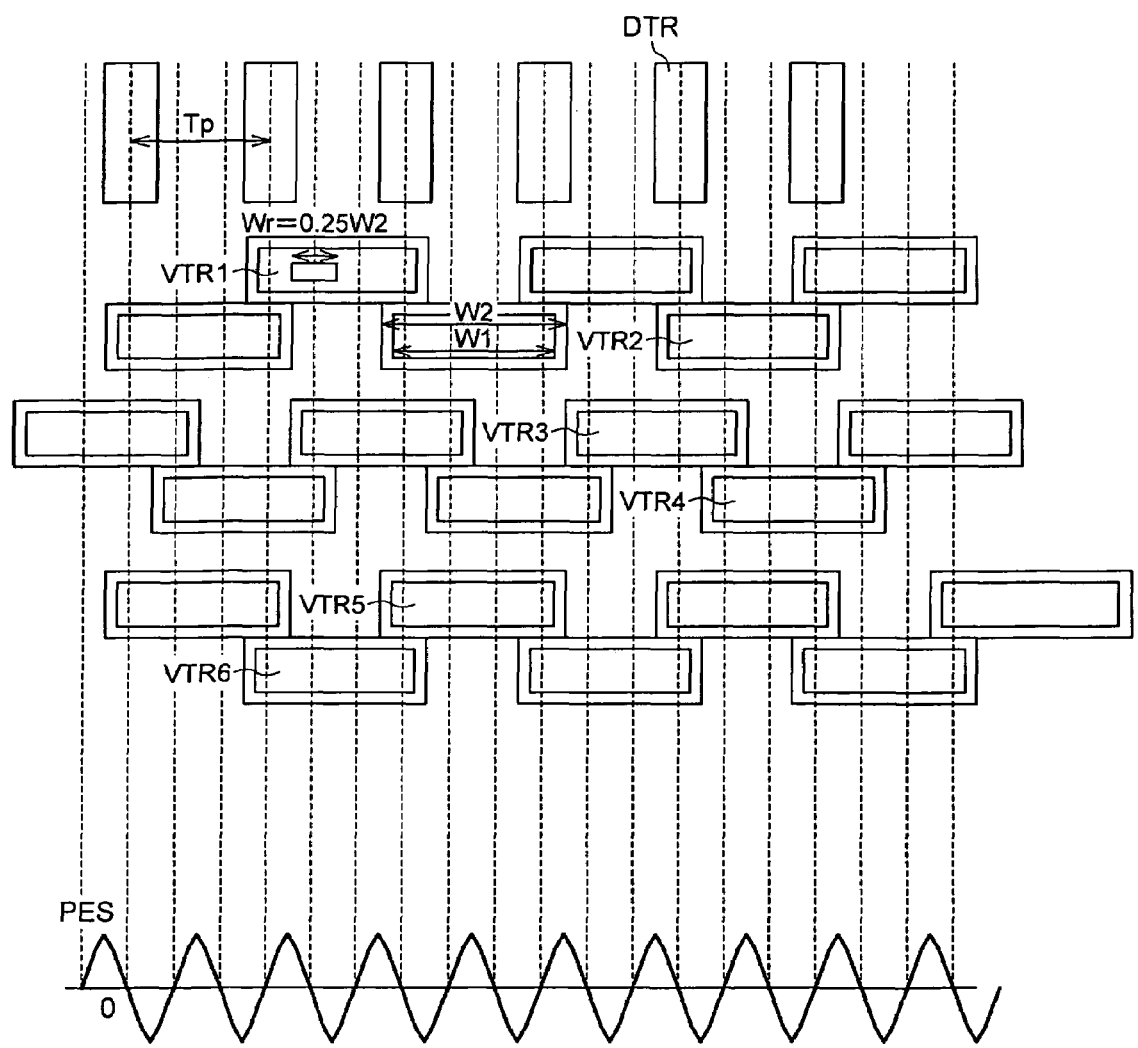
FIG. 55 is illustrative of a further specific experimentation embodiment, wherein the relations of burst patterns W1, W2 and track pitch Tp to magnetic read width Wr are schematically illustrated together with position error signal PES.
Figure 56:
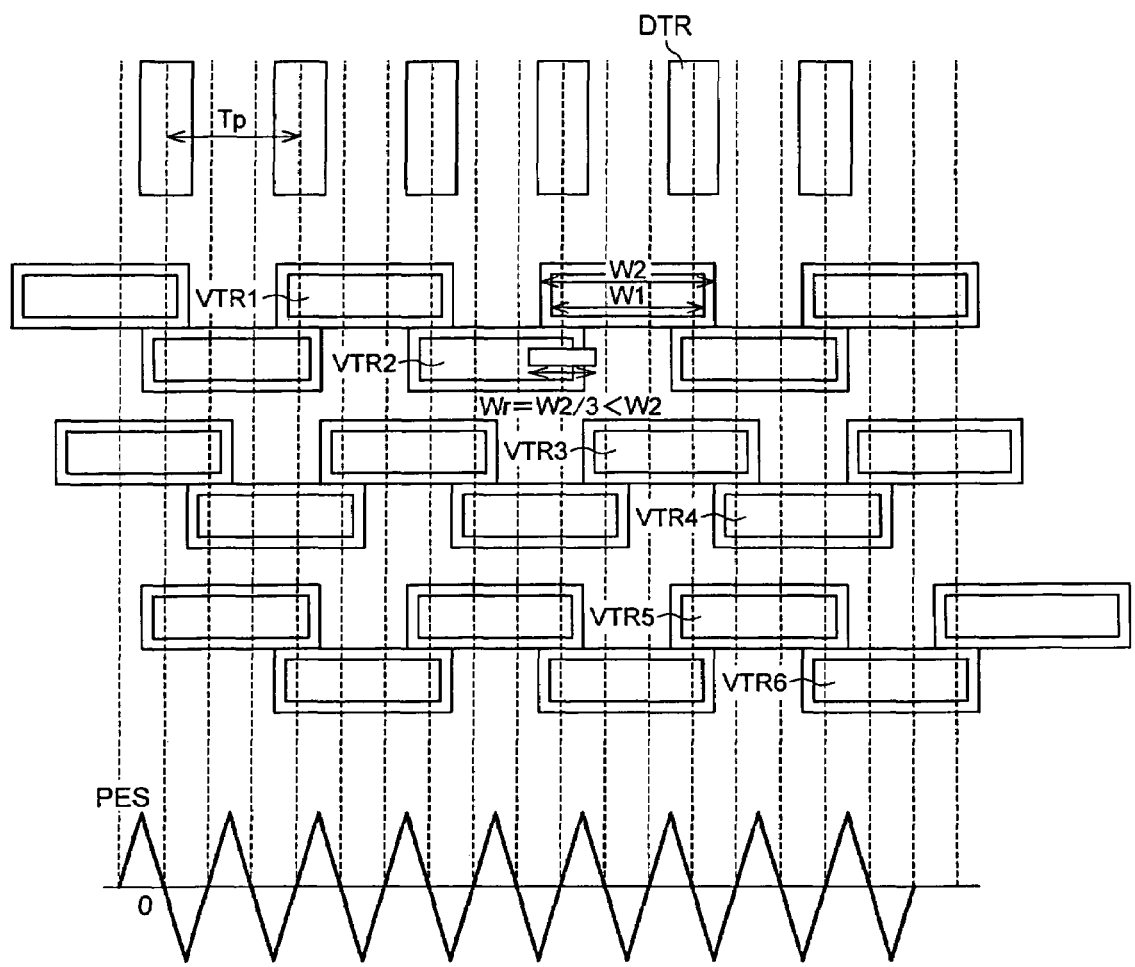
FIG. 56 is illustrative of a further specific experimentation embodiment, wherein the relations of burst patterns W1, W2 and track pitch Tp to magnetic read width Wr are schematically illustrated together with position error signal PES.
Figure 57:
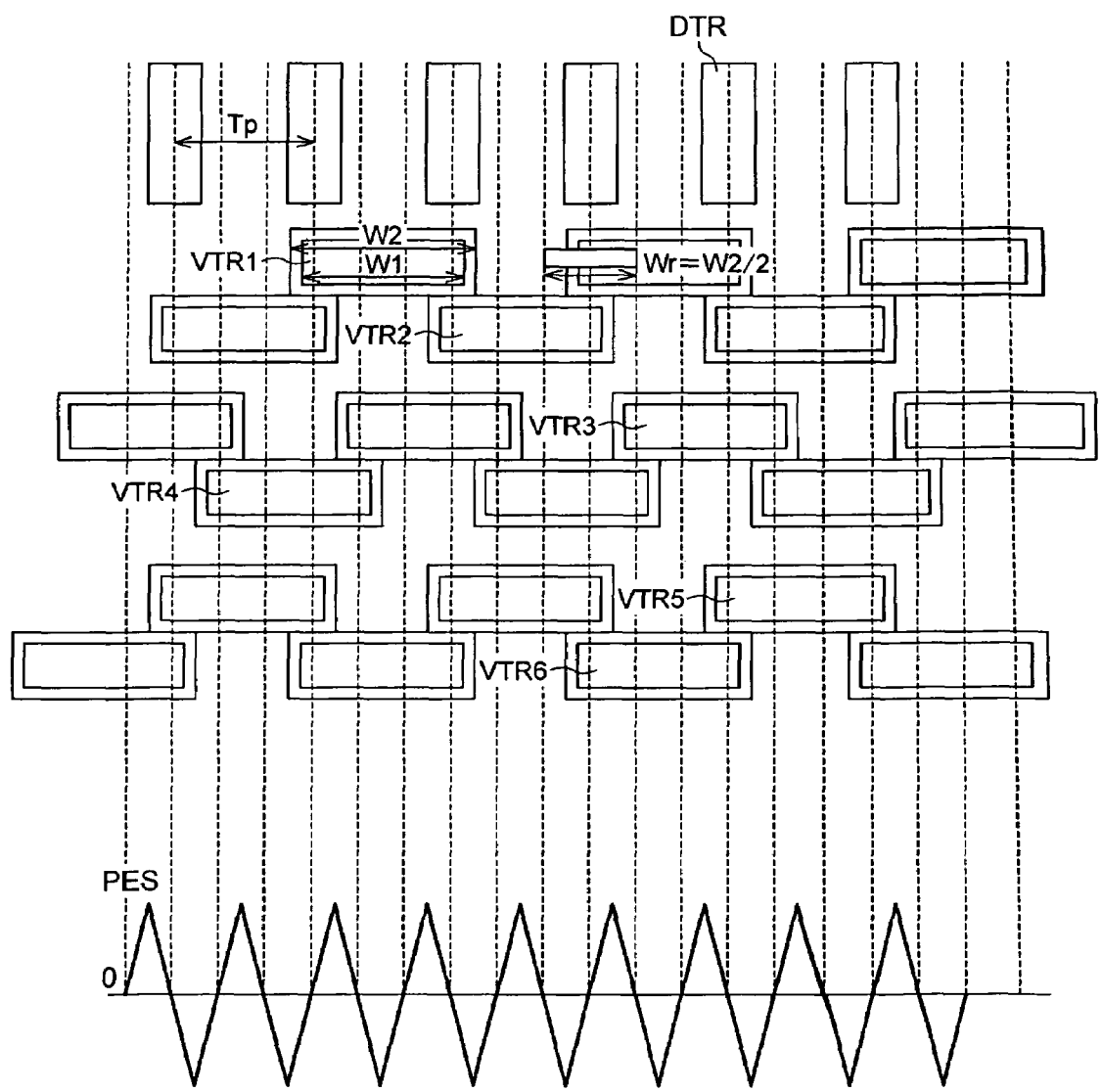
FIG. 57 is illustrative of a further specific experimentation embodiment, wherein the relations of burst patterns W1, W2 and track pitch Tp to magnetic read width Wr are schematically illustrated together with position error signal PES.
Figure 58:
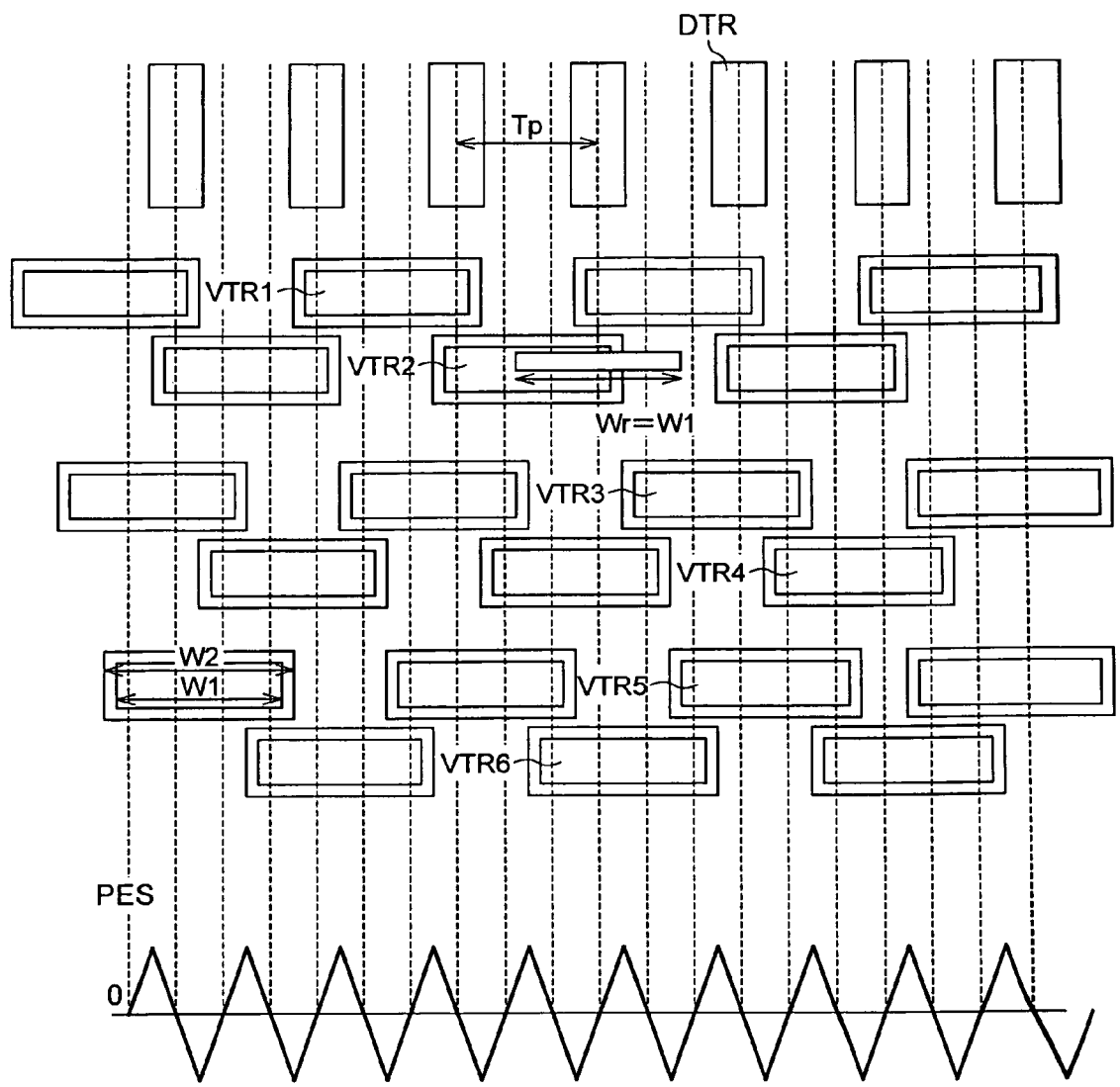
FIG. 58 is illustrative of a further specific experimentation embodiment, wherein the relations of burst patterns W1, W2 and track pitch Tp to magnetic read width Wr are schematically illustrated together with position error signal PES.
Figure 59:
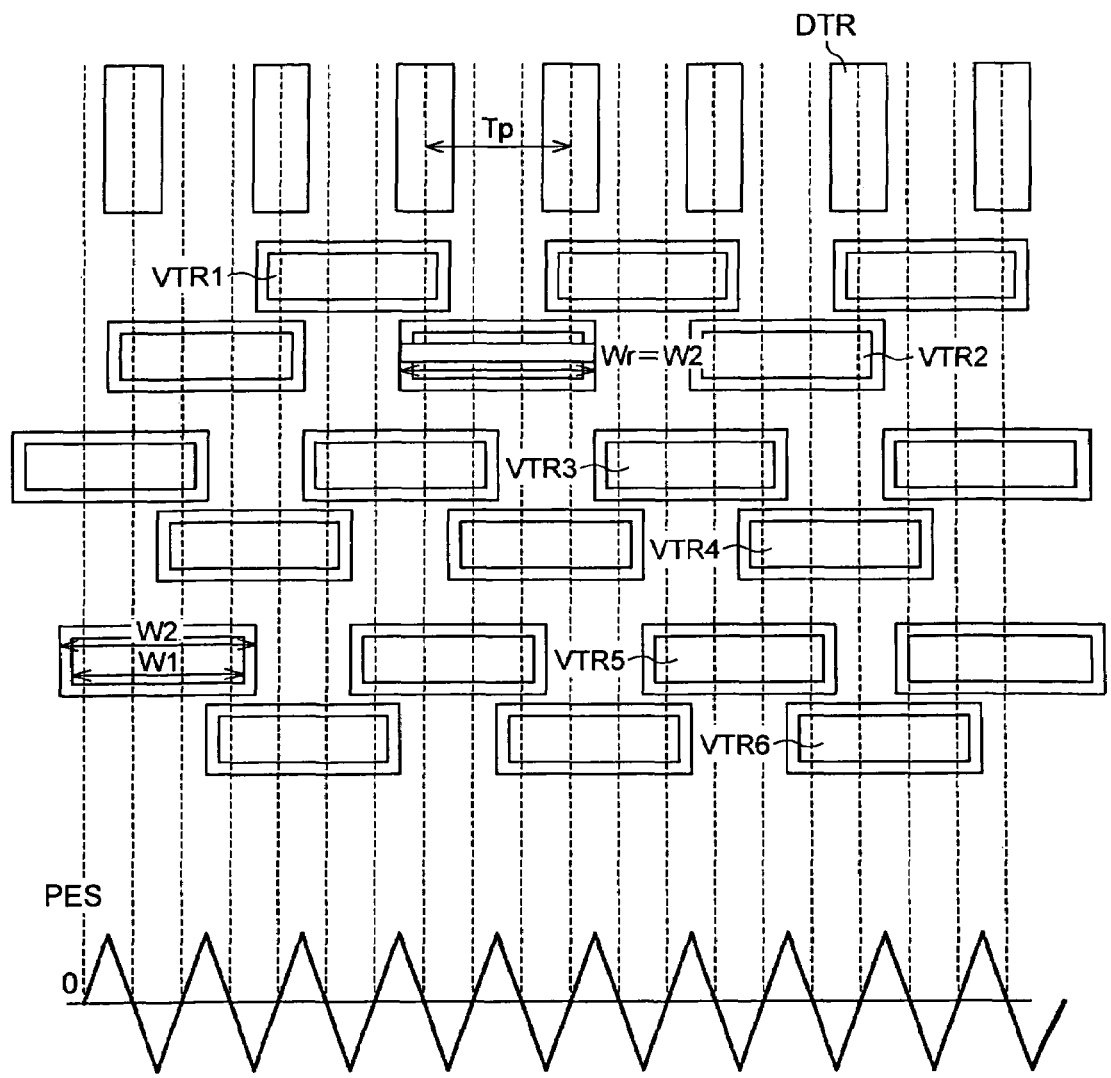
FIG. 59 is illustrative of a further specific experimentation embodiment, wherein the relations of burst patterns W1, W2 and track pitch Tp to magnetic read width Wr are schematically illustrated together with position error signal PES.
Figure 60:
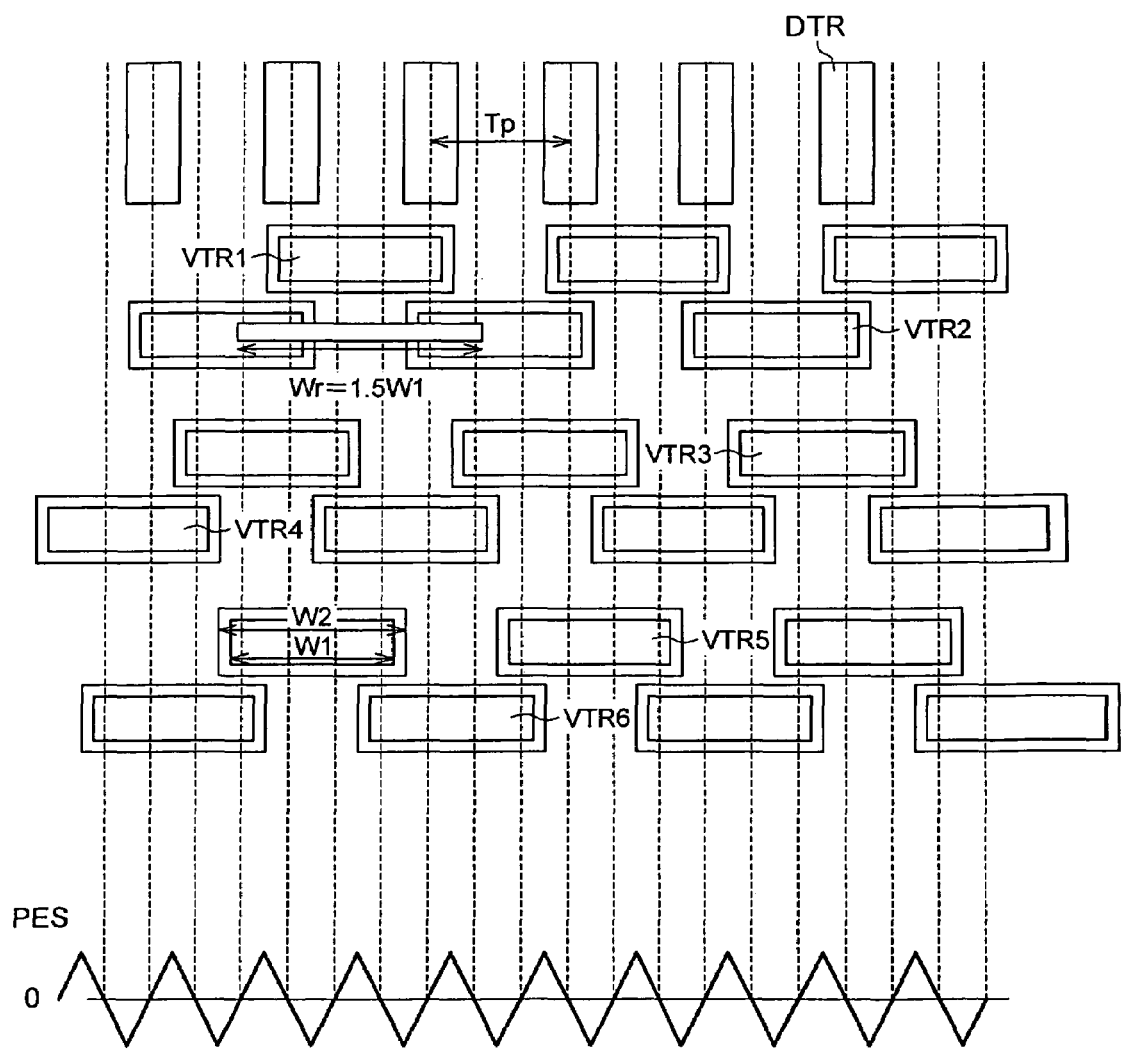
FIG. 60 is illustrative of a further specific experimentation embodiment, wherein the relations of burst patterns W1, W2 and track pitch Tp to magnetic read width Wr are schematically illustrated together with position error signal PES.

| Embodi-ment | Relation between Tp and W1 or W2 | Relation between Wr and W1, W2 or Tp | Level | Linearity of PES | Pertinent Drawing |
|---|---|---|---|---|---|
| 2-I-1 | W2 < Tp | Wr = 0.333W2 < W1 | disable(X) | poor | FIG. 38 |
| | | Wr = 0.5W2 < W1 | enable(Δ) | usable | FIG. 39 |
| | | Wr = W1 | enable(○) | usable | FIG. 40 |
| | | Wr = Tp | enable(○) | good | FIG. 41 |
| | | Wr = 2W1 | enable(○) | good | FIG. 42 |
| | | Wr = 2W2 | disable(X) | poor | FIG. 43 |
| 2-I-2 | W2 = Tp | Wr = 0.333W2 < W1 | disable(X) | poor | FIG. 44 |
| | | Wr = 0.444W2 < W1 | enable(○) | good | FIG. 45 |
| | | Wr = W2 | enable(○) | good | FIG. 46 |
| | | Wr =2W2 − W1 > W2 | enable(○) | good | FIG. 47 |
| | | Wr = 2W1 | disable(X) | poor | FIG. 48 |
| 2-I-3 | W1 = Tp | Wr = 0.333W1 < W1 | disable(X) | poor | FIG. 49 |
| | | Wr = 0.444W1 < W1/2 | enalbe(○) | good | FIG. 50 |
| | | Wr = W2/2 | enable(○) | good | FIG. 51 |
| | | Wr = W2 | enable(○) | good | FIG. 52 |
| | | Wr = 1.5W1 | enable(○) | good | FIG. 53 |
| | | Wr = 1.5W2 | disable(X) | poor | FIG. 54 |
| 2-I-4 | W1 > Tp | Wr = 0.25W2 | disable(X) | poor | FIG. 55 |
| | | Wr = 0.333W2 | enable(○) | good | FIG. 56 |
| | | Wr = 0.5W2 < W1 | enable(○) | good | FIG. 57 |
| | | Wr = W1 | enable(○) | good | FIG. 58 |
| | | Wr = W2 | enable(○) | good | FIG. 59 |
| | | Wr = 1.5W1 | enable(○) | poor | FIG. 60 |
| | | Wr = 1.5W2 | disable(X) | no PES signal | — |

(1) The conditions for Embodiment 2-1-1 shown in Table 2-1 were found as a result of making examinations of how the position error signals PES changed when, under the condition of Tp>W2, there were changes in the relations between the burst patterns W1, W2 and the track pitch Tp with respect to the magnetic read width Wr. The drawings pertinent to the respective cases correspond to FIGS. 38-43.

As can be seen from FIGS. 38-43, if the range of 2W2>Wr≧0.5W2, and 0.5W2<W1 is satisfied under the condition of Tp>W2, the position error detection signals can then gain linearity, indicating that the position error signals are at an enable level.

As can be seen from these drawings, the position error detection signal has no geometrically perfect linearity; yet it is still at an acceptable enable level due to the presence of a guard band for the discrete track.

Note here that the FIG. 84 is a sectional view taken on A-A arrows in FIG. 38, and like references in FIGS. 38 and 30 denote like components.

(2) The conditions for Embodiment 2-1-2 shown in Table 2-1 were found as a result of making examinations of how the position error signals PES changed when, under the condition of W2=Tp, there were changes in the relations between the burst patterns W1 and W2 with respect to the magnetic read width Wr. The drawings pertinent to the respective cases correspond to FIGS. 44-48.

As can be seen from FIGS. 44-48, if the range of $2W2-W1 \geq Wr \geq 0.444W2$, and $0.444W2 < W1$ is satisfied under the condition of Tp=W2, the position error detection signals can then gain linearity, indicating that the position error signals are at an enable level.

(3) The conditions for Embodiment 2-1-3 shown in Table 2-1 were found as a result of making examinations of how the position error signals PES changed when, under the condition of W1=Tp, there were changes in the relations between the burst patterns W1 and W2 with respect to the magnetic read width Wr. The drawings pertinent to the respective cases correspond to FIGS. 49-54.

As can be seen from FIGS. 49-54, if the range of $1.5W1 \geq Wr \geq 0.444W1$ is satisfied under the condition of Tp=W1, the position error detection signals can then gain linearity, indicating that the position error signals are at an enable level.

(4) The conditions for Embodiment 2-1-4 shown in Table 2-1 were found as a result of making examinations of how the position error signals PES changed when, under the condition of W1>Tp, there were changes in the relations between the burst patterns W1, W2 and the track pitch Tp with respect to the magnetic read width Wr. The drawings pertinent to the respective cases correspond to FIGS. 55-60.

As can be seen from FIGS. 55-60, if the range of $1.5W1 \geq Wr \geq 0.333W2$ is satisfied under the condition of Tp<W1, the position error detection signals can then gain linearity, indicating that the position error signals are at an enable level.

However, under the condition of W1>Tp in Embodiment 2-1-4, no PES signals could be obtained at Wr=1.5W2. This, therefore, is not shown in the drawing.

[II] EXPERIMENTAL EXAMPLE 2-2 WHERE M=3, AND n=4

Figure 35:
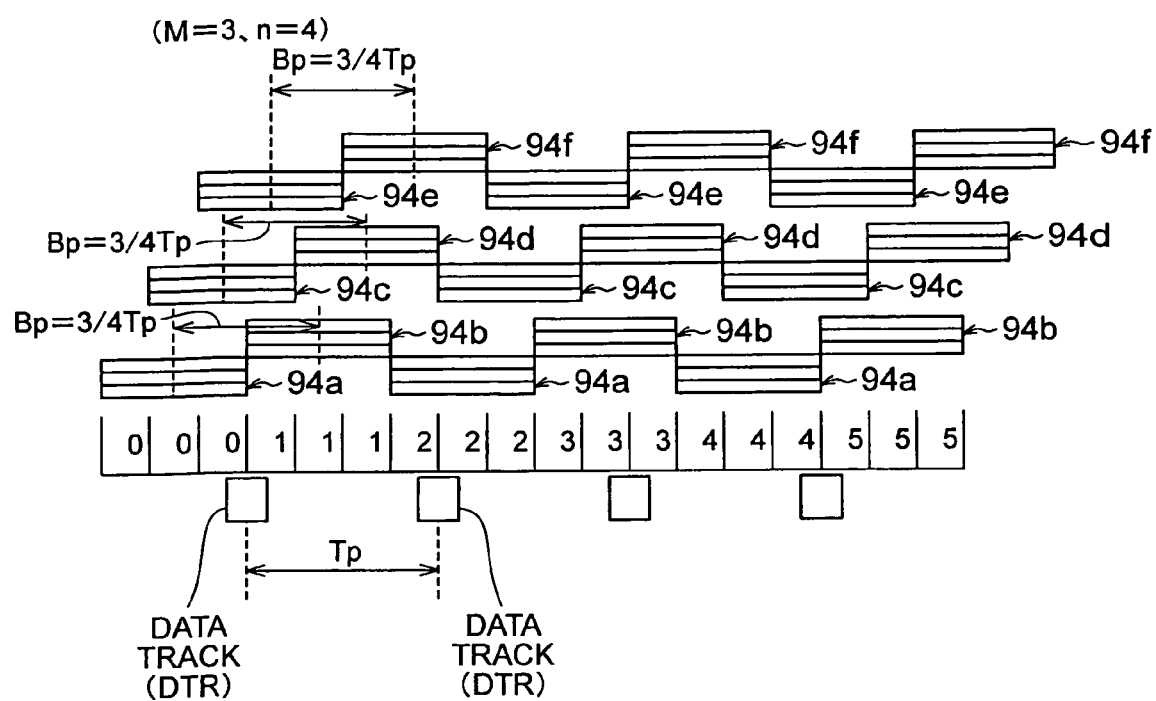
FIG. 35 is illustrative of what relation burst pattern pitch Bp has to data track pitch Tp at a burst portion comprising three pairs (sets) of burst patterns especially in the case where M=3 where M is the number of pairs (sets) of burst patterns and n in the burst pattern pitch Bp vs. data track pitch Tp relation Bp=(3/n)Tp is n=4.

As shown in FIG. 35, this example is directed to the case where M=3 (where M is the number of pairs (sets) of burst patterns, and when the burst pattern pitch Bp vs. data track pitch Tp relation is represented by Bp=(3/n)Tp, n=4. In other words, Example 2-2 is directed to the case where in the burst division comprising three pairs (sets) of burst patterns, the burst pattern pitch Bp is 3/4 of the data track pitch Tp (Bp=(3/4)Tp).

In this case, the first burst (VTR1) 94*a* and the second burst (VTR2) 94*b* in pair form are located such that the convex-form magnetic recording layers are formed while centerlines are defined at positions mutually offset by a (3/4) track pitch of distance ((3/4)Tp) in the track width direction, as shown in FIG. 35.

The third burst (VTR3) 94*c* and the fourth burst (VTR4) 94*d* in pair form are located such that the convex-form magnetic recording layers are formed while centerlines are defined at positions mutually offset by a (3/4) track pitch of distance ((3/4)Tp) in the track width direction, and the third burst (VTR3) 94*c* and the fourth burst (VTR4) 94*d* are located such that the convex-form magnetic recording layers are formed while centerlines are defined at positions offset from the centerlines of the first burst (VTR1) 94*a* and the second burst (VTR2) 94*b* by a (1/4) track pitch of distance ((1/4)Tp).

The fifth burst (VTR5) 94*e* and the sixth burst (VTR6) 94*f* in pair form are located such that the convex-form magnetic recording layers are formed while centerlines are defined at positions mutually offset by a (3/4) track pitch of distance ((3/4)Tp) in the track width direction, and the fifth burst (VTR53) 94*e* and the sixth burst (VTR6) 94*f* are located such that the convex-form magnetic recording layers are formed while centerlines are defined at positions offset from the centerlines of the first burst (VTR1) 94*a* and the second burst (VTR2) 94*b* by a (1/2) track pitch of distance ((1/2)Tp).

Construction of the Magnetic Recording Medium

The structure (M=3 and n=3) of the burst division of the magnetic recording medium in the above Experimental Example 2-1 was changed to that where M=3 and n=4 (FIG. 35). Otherwise, the magnetic recording medium used in Experimental Example 2-2 was prepared as in Experimental Example 2-1. Using such a magnetic recording medium, tracking control experimentation was performed as in the above Experimental Example 2-1.

Specifically, at the discrete track disk and read magnetic head shown in Table 2-2 given below, W1, W2 and Wr were applied in combinations of values smaller and/or larger than the reference value of the track pitch Tp to find all position error signals PES. Then, whether the linearity of PES as tracking characteristics was at an enable or disable level was determined.

In this conjunction, see the pertinent drawings referred to in Table 2-2 and illustrative in schematic of the relations between W1, W2, Tp and Tr in the experimental examples performed here. The EPS signals, too, are indicated in these drawings.

TABLE 2-2

Figure 61:
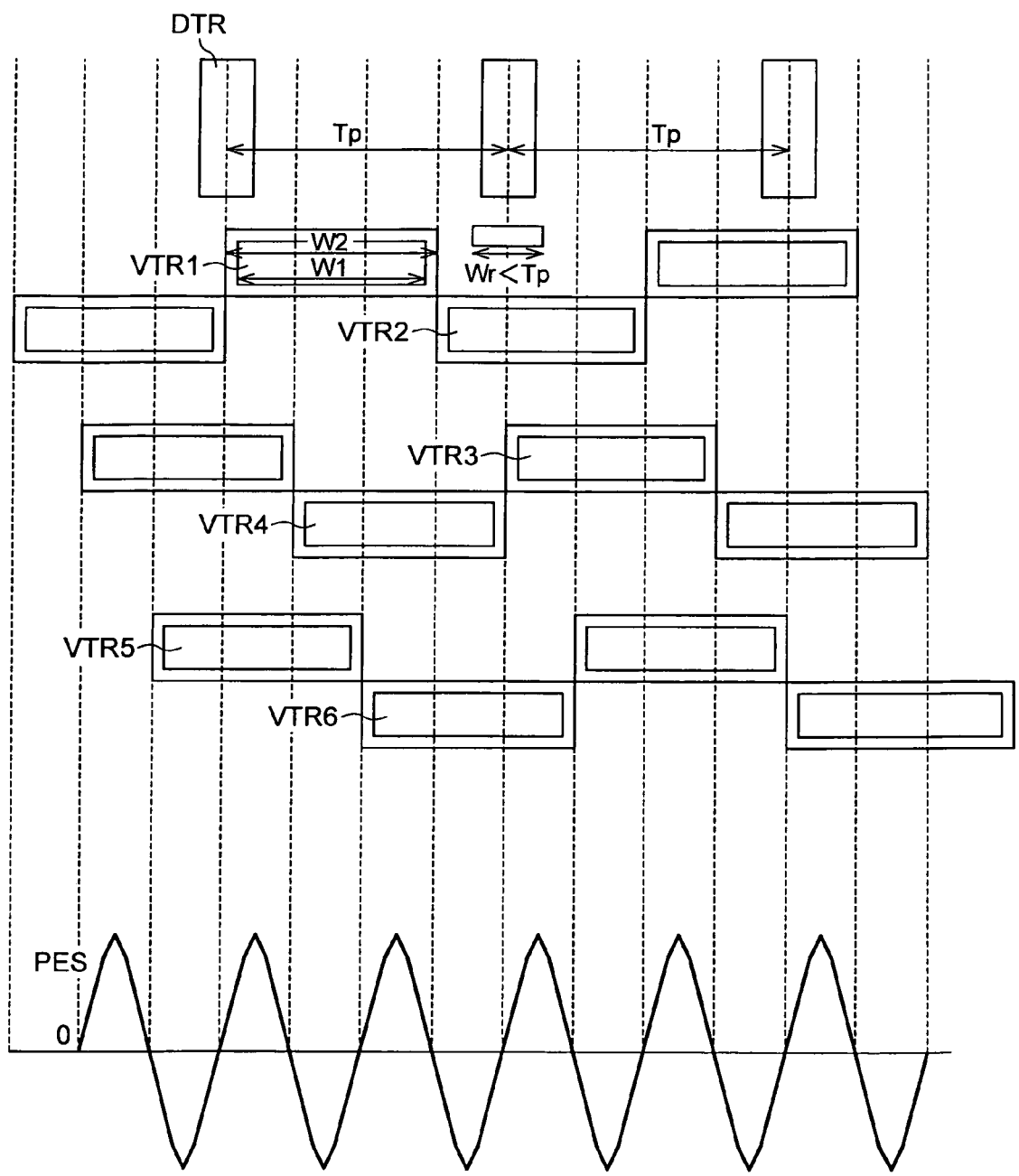
FIG. 61 is illustrative of a further specific experimentation embodiment, wherein the relations of burst patterns W1, W2 and track pitch Tp to magnetic read width Wr are schematically illustrated together with position error signal PES.
Figure 62:
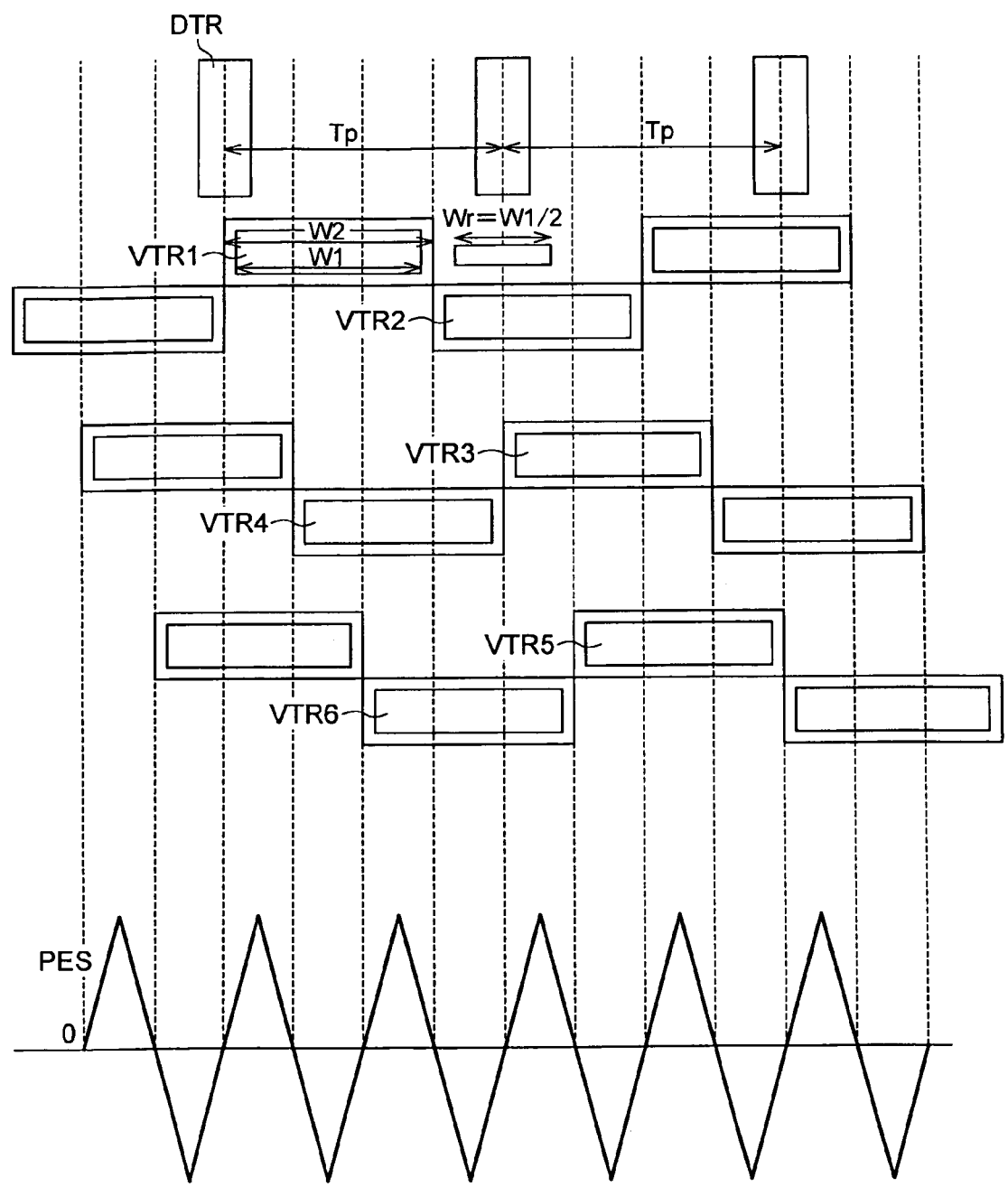
FIG. 62 is illustrative of a further specific experimentation embodiment, wherein the relations of burst patterns W1, W2 and track pitch Tp to magnetic read width Wr are schematically illustrated together with position error signal PES.
Figure 63:
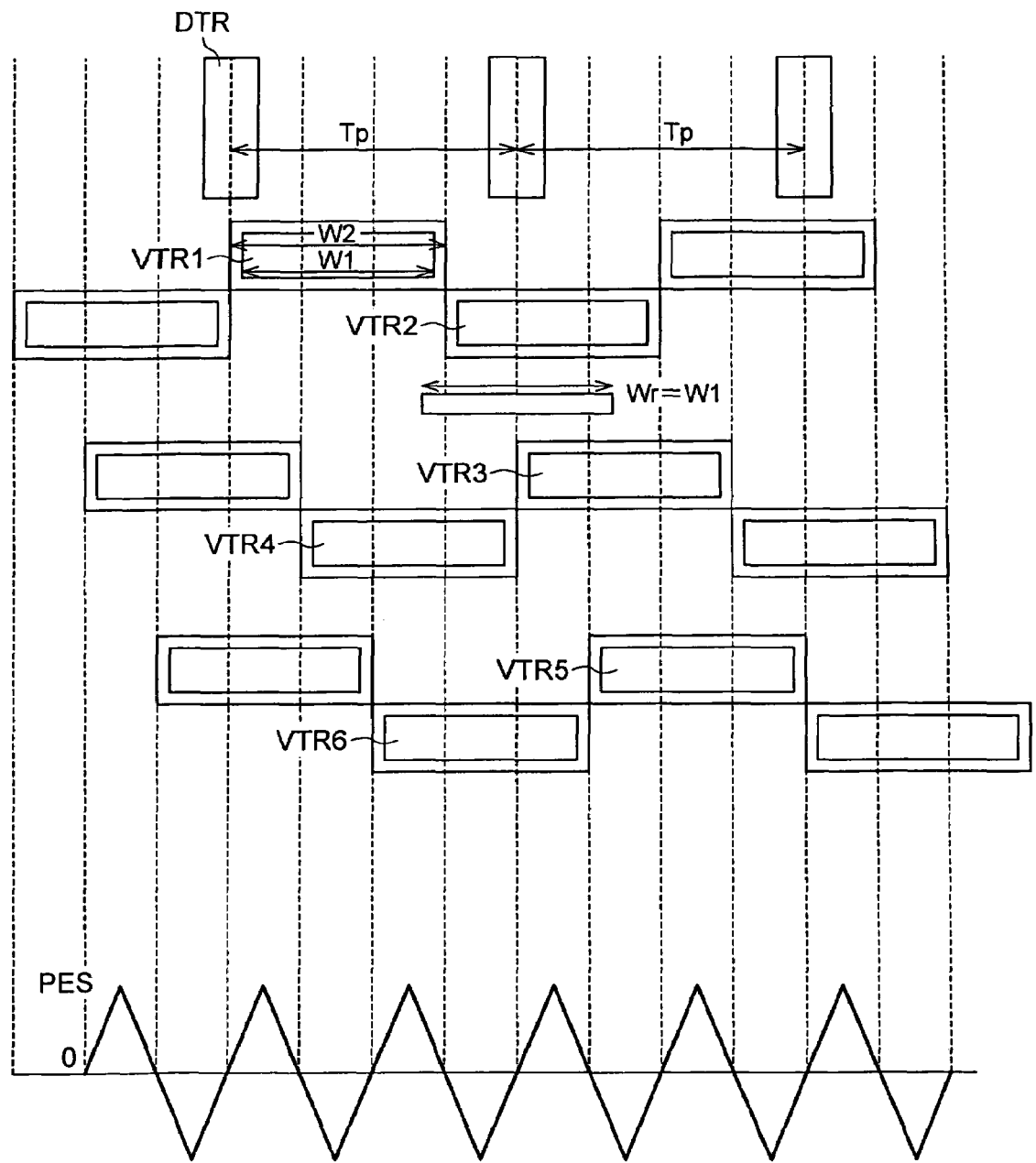
FIG. 63 is illustrative of a further specific experimentation embodiment, wherein the relations of burst patterns W1, W2 and track pitch Tp to magnetic read width Wr are schematically illustrated together with position error signal PES.
Figure 64:
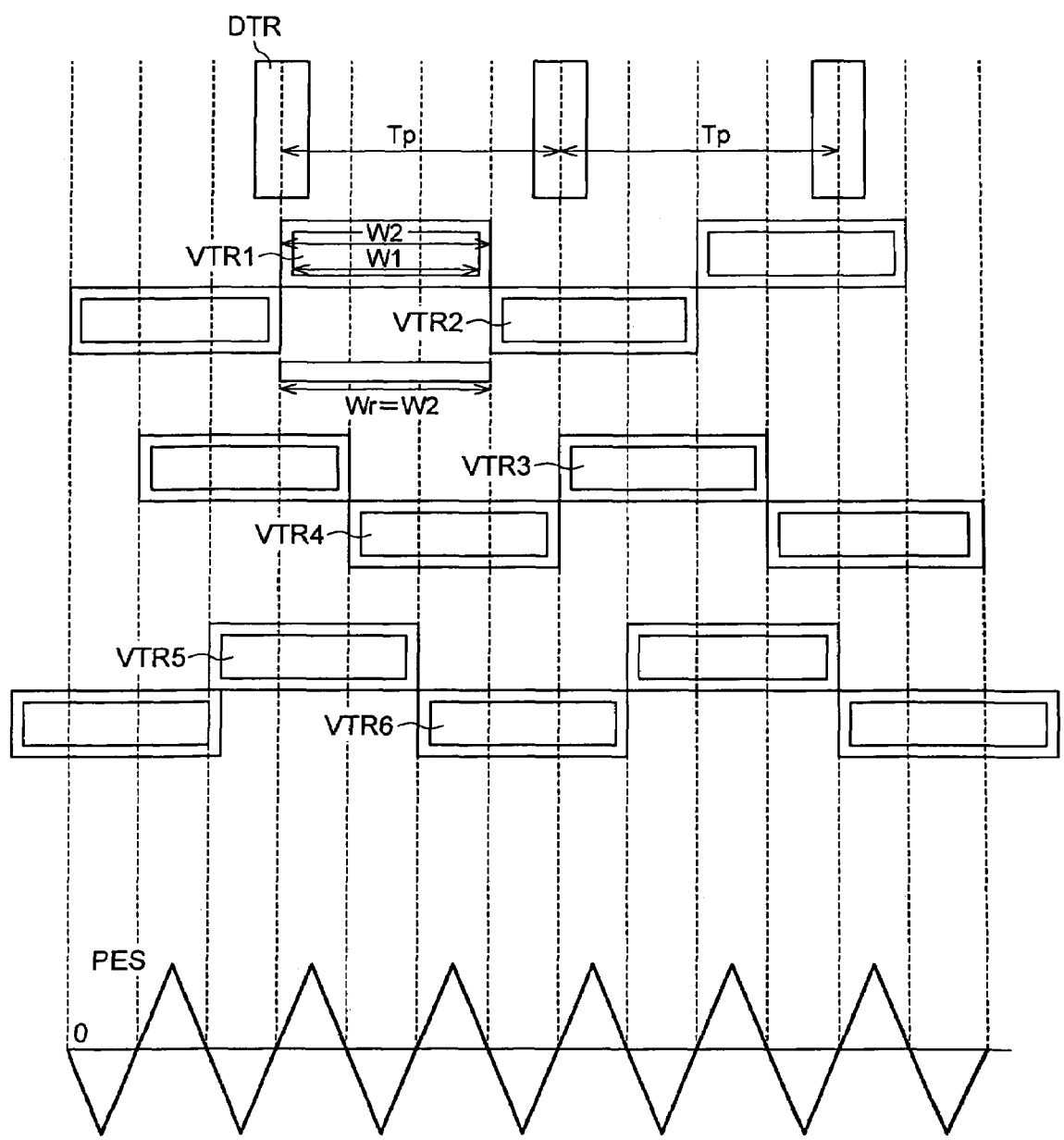
FIG. 64 is illustrative of a further specific experimentation embodiment, wherein the relations of burst patterns W1, W2 and track pitch Tp to magnetic read width Wr are schematically illustrated together with position error signal PES.
Figure 65:
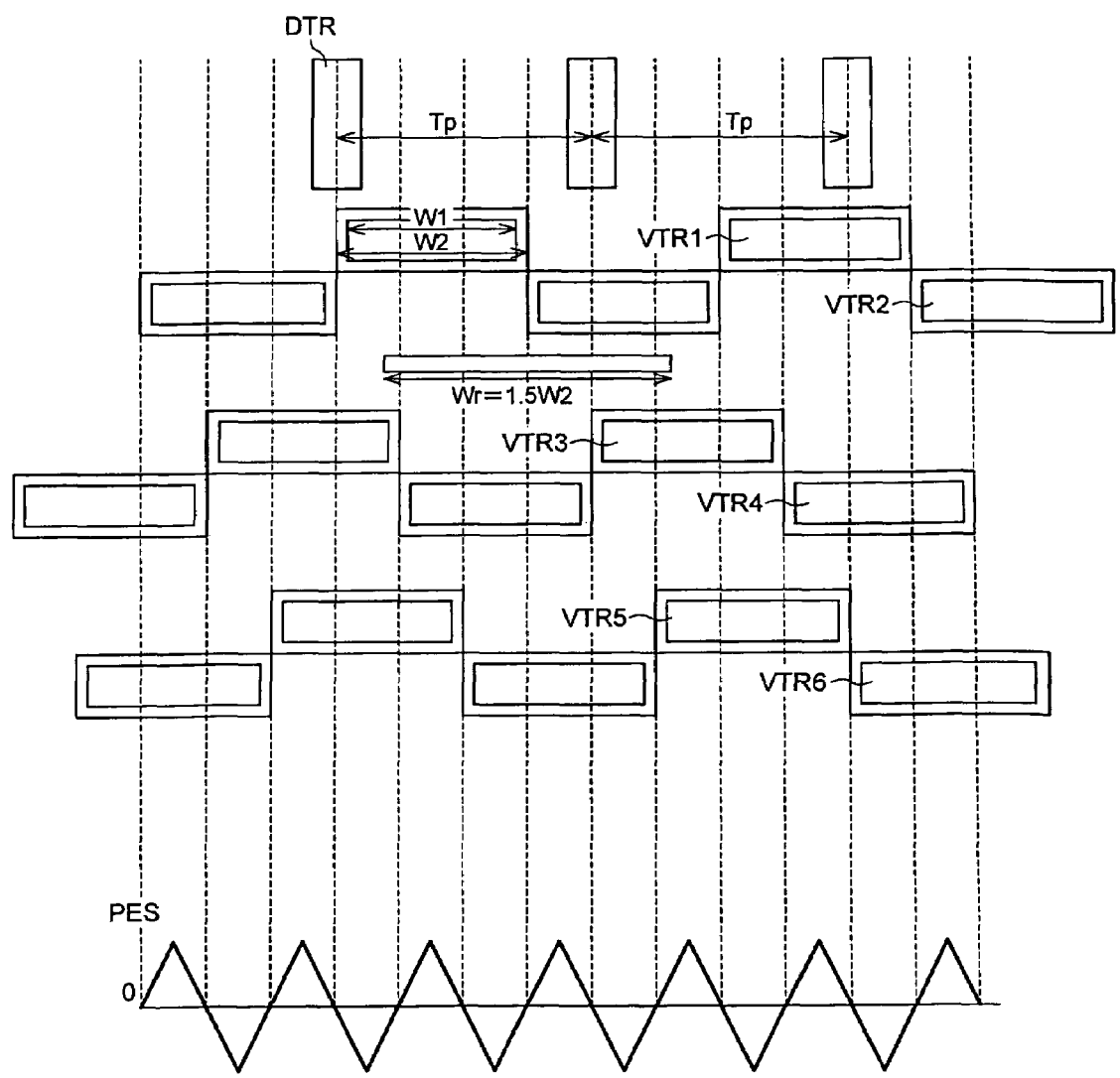
FIG. 65 is illustrative of a further specific experimentation embodiment, wherein the relations of burst patterns W1, W2 and track pitch Tp to magnetic read width Wr are schematically illustrated together with position error signal PES.
Figure 66:
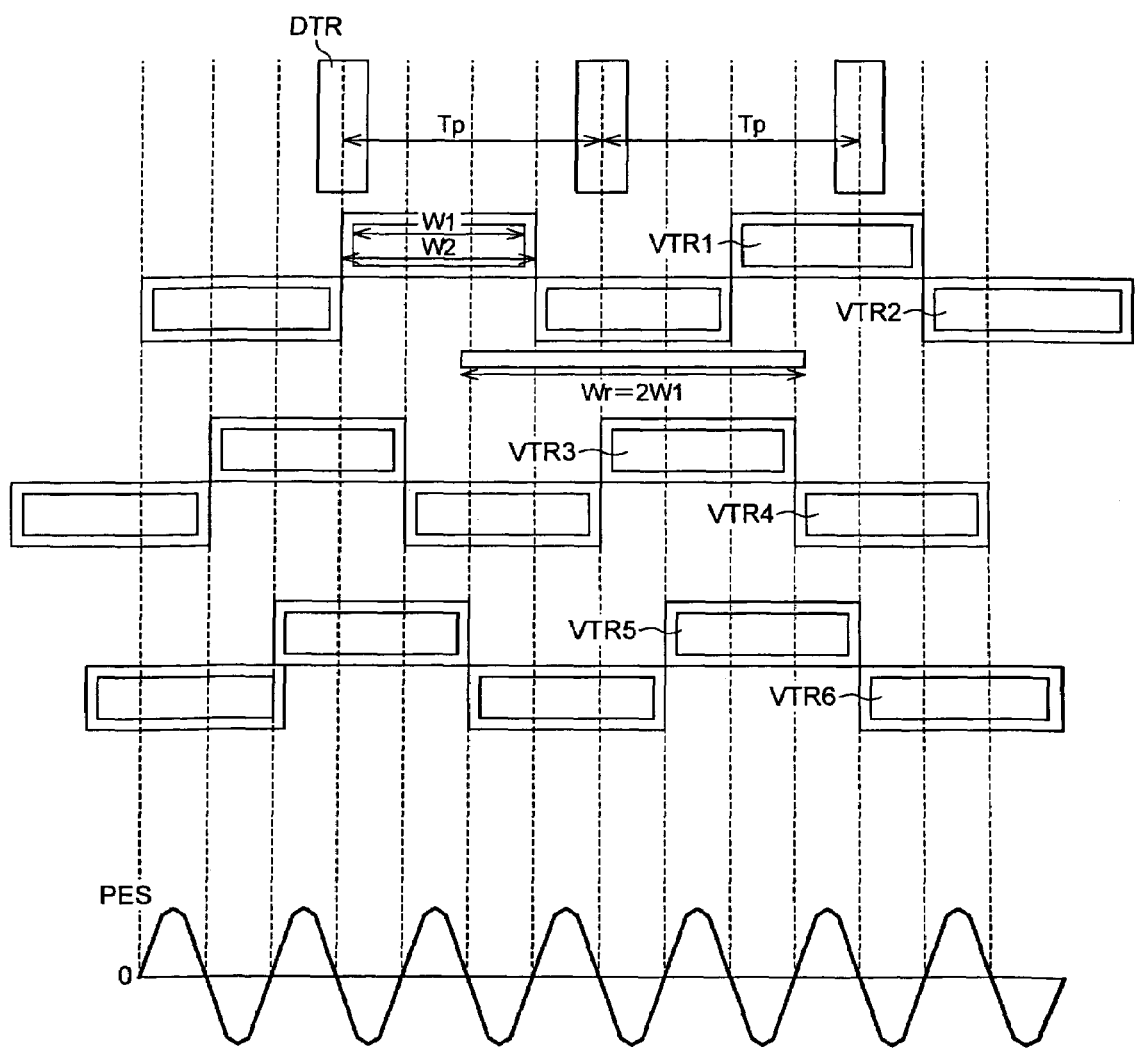
FIG. 66 is illustrative of a further specific experimentation embodiment, wherein the relations of burst patterns W1, W2 and track pitch Tp to magnetic read width Wr are schematically illustrated together with position error signal PES.

| | | (M = 3; n = 4) | | | |
|---|---|---|---|---|---|
| Embodiment | Relation between Tp and W1 or W2 | Relation between Wr and W1, W2 or Tp | Level | Linearity of PES | Pertinent Drawing |
| 2-II-1 | W2 < Tp | Wr = 0.375W1 | disable(X) | poor | FIG. 61 |
| | | Wr = 0.5W1 | enable(○) | good | FIG. 62 |
| | | Wr = W1 | enable(○) | good | FIG. 63 |
| | | Wr = W2 | enable(○) | Good | FIG. 64 |
| | | Wr = 1.5W2 | enable(○) | good | FIG. 65 |
| | | Wr = 2W1 | disable(X) | poor | FIG. 66 |

(1) The conditions for Embodiment 2-II-1 shown in Table 2-2 were found as a result of making examinations of how the position error signals PES changed when, under the condition of Tp>W2, there were changes in the relations between the burst patterns W1, W2 and the track pitch Tp with respect to the magnetic read width Wr. The drawings pertinent to the respective cases correspond to FIGS. 61-68.

As can be seen from FIGS. 61-68, if the range of $1.5W2 > Wr \geq 0.5W1$ is satisfied under the condition of Tp>W2, the position error detection signals can then gain linearity, indicating that the position error signals are at an enable level.

Note here that in the structure where M=3 and n=4, it is only required to take the above case of Tp>W2 into account, as shown in FIG. 35.

[III] EXPERIMENTAL EXAMPLE 2-3 WHERE M=3, AND n=2

Figure 36:
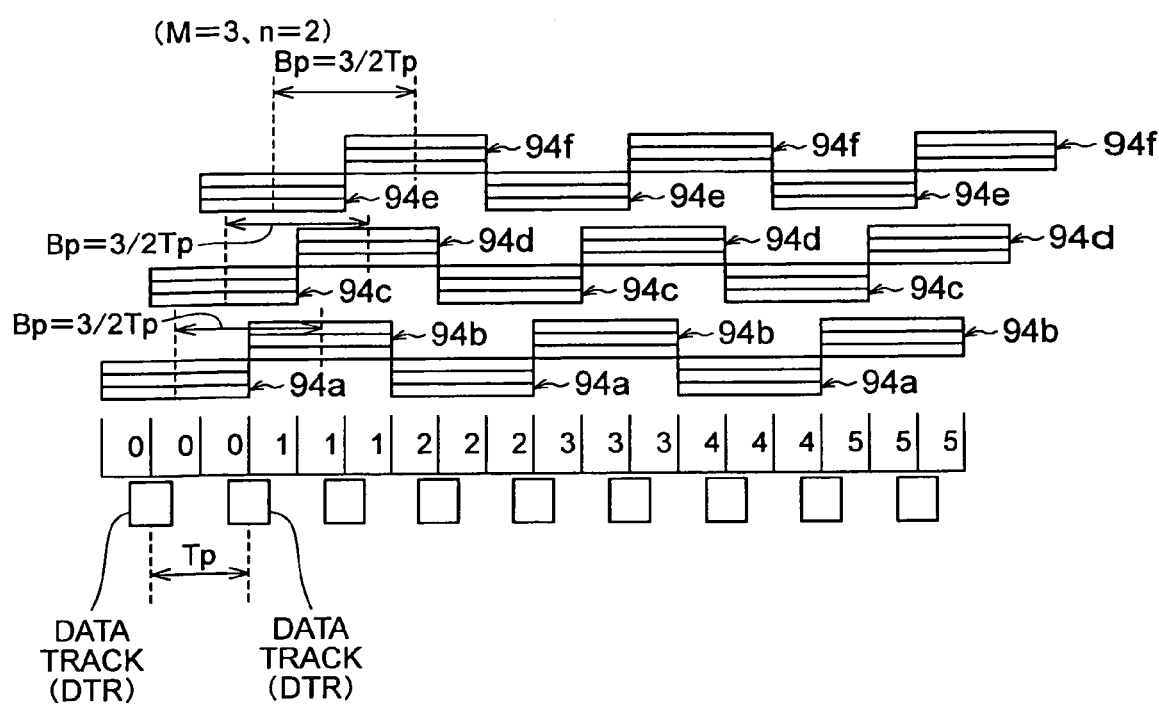
FIG. 36 is illustrative of what relation burst pattern pitch Bp has to data track pitch Tp at a burst portion comprising three pairs (sets) of burst patterns especially in the case where M=3 where M is the number of pairs (sets) of burst patterns and n in the burst pattern pitch Bp vs. data track pitch Tp relation Bp=(3/n)Tp is n=2.

As shown in FIG. 36, this example is directed to the case where M=3 (where M is the number of pairs (sets) of burst patterns, and when the burst pattern pitch Bp vs. data track pitch Tp relation is represented by Bp=(3/n)Tp, n=2. In other words, Example 2-3 is directed to the case where in the burst portion comprising three pairs (sets) of burst patterns, the burst pattern pitch Bp is 3/2 of the data track pitch Tp (Bp=(3/2)Tp).

In this case, the first burst (VTR1) 94*a* and the second burst (VTR2) 94*b* in pair form are located such that the convex-form magnetic recording layers are formed while centerlines are defined at positions mutually offset by a (3/2) track pitch of distance ((3/2)Tp) in the track width direction, as shown in FIG. 36.

The third burst (VTR3) 94*c* and the fourth burst (VTR4) 94*d* in pair form are located such that the convex-form magnetic recording layers are formed while centerlines are defined at positions mutually shifted by a (3/2) track pitch of distance ((3/2)Tp) in the track width direction, and the third burst (VTR3) 94*c* and the fourth burst (VTR4) 94*d* are located such that the convex-form magnetic recording layers are formed while centerlines are defined at positions offset from the centerlines of the first burst (VTR1) 94*a* and the second burst (VTR2) 94*b* by a (1/2) track pitch of distance ((1/2)Tp).

The fifth burst (VTR5) 94*e* and the sixth burst (VTR6) 94*f* in pair form are located such that the convex-form magnetic recording layers are formed while centerlines are defined at positions mutually offset by a (3/2)-track pitch of distance ((3/2)Tp) in the track width direction, and the fifth burst (VTR53) 94*e* and the sixth burst (VTR6) 94*f* are located such that the convex-form magnetic recording layers are formed while centerlines are defined positions offset from the centerlines of the first burst (VTR1) 94*a* and the second burst (VTR2) 94*b* by one track pitch of distance (1Tp).

Construction of the Magnetic Recording Medium

The structure (M=3 and n=3) of the burst division of the magnetic recording medium in the above Experimental Example 2-1 was changed to that where M=3 and n=2 (FIG. 36). Otherwise, the magnetic recording medium used in Experimental Example 2-3 was prepared as in Experimental Example 2-1. Using such a magnetic recording medium, tracking control experimentation was performed as in the above Experimental Example 2-1.

Specifically, at the discrete track disk and read magnetic head shown in Table 2-3 given below, W1, W2 and Wr were applied in combinations of values smaller and/or larger than the reference value of the track pitch Tp to find all position error signals PES. Then, whether the linearity of PES as tracking characteristics was at an enable or disable level was determined.

In this conjunction, see the pertinent drawings referred to in Table 2-3 and illustrative in schematic of the relations between W1, W2, Tp and Tr in the experimental examples performed here. The EPS signals, too, are indicated in these drawings.

TABLE 2-3

(M = 3; n = 2)

Figure 67:
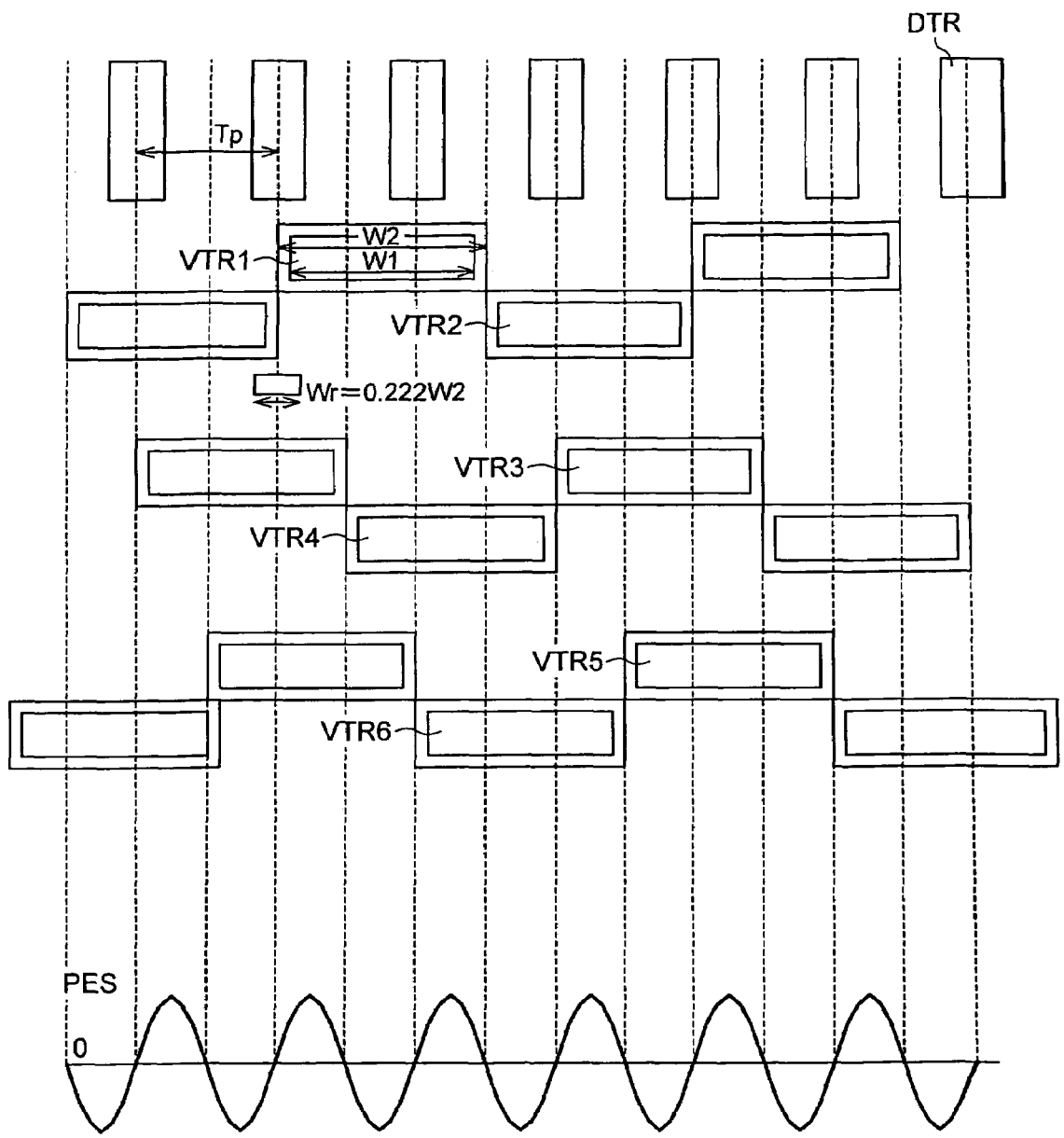
FIG. 67 is illustrative of a further specific experimentation embodiment, wherein the relations of burst patterns W1, W2 and track pitch Tp to magnetic read width Wr are schematically illustrated together with position error signal PES.
Figure 68:
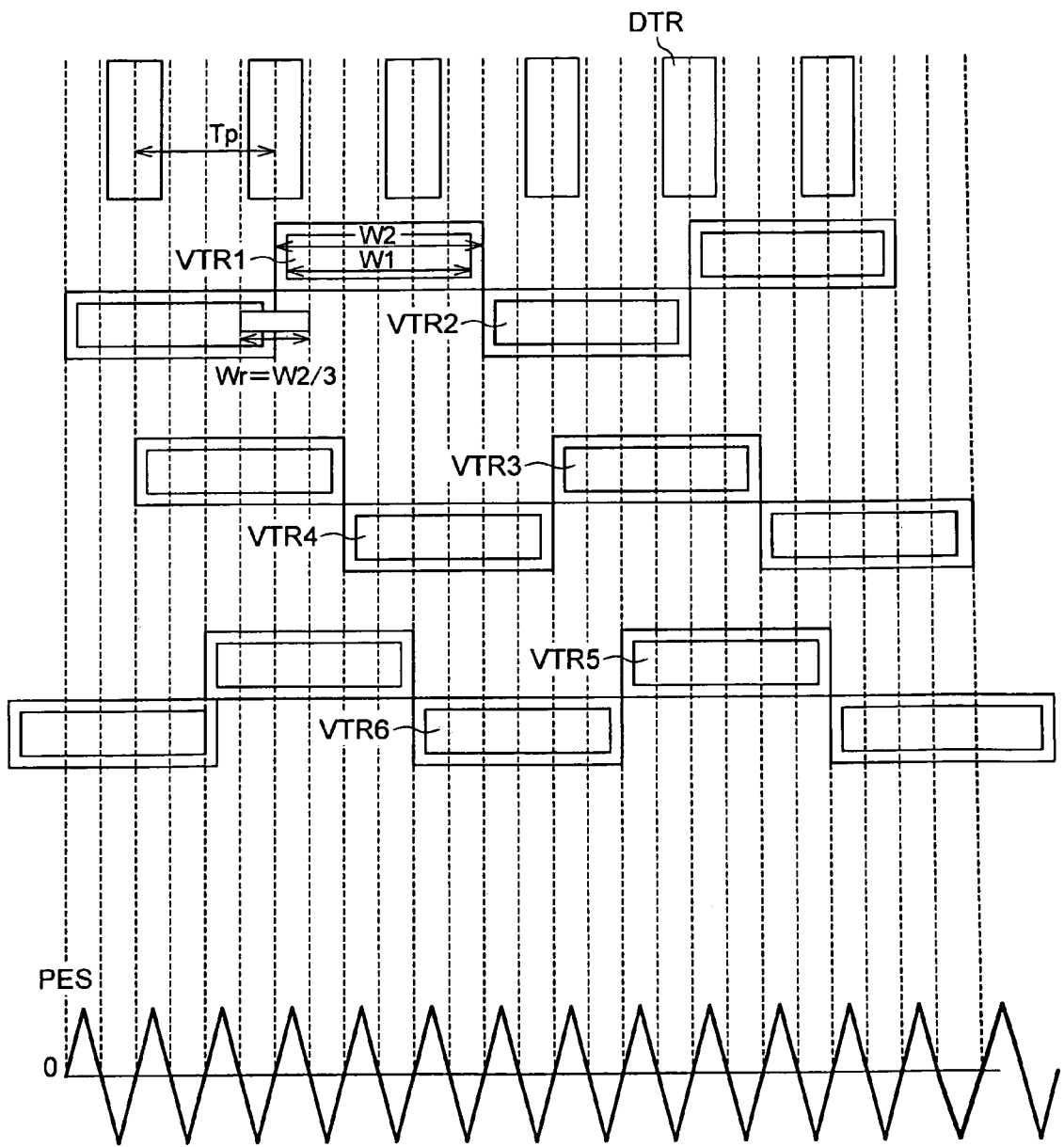
FIG. 68 is illustrative of a further specific experimentation embodiment, wherein the relations of burst patterns W1, W2 and track pitch Tp to magnetic read width Wr are schematically illustrated together with position error signal PES.
Figure 69:
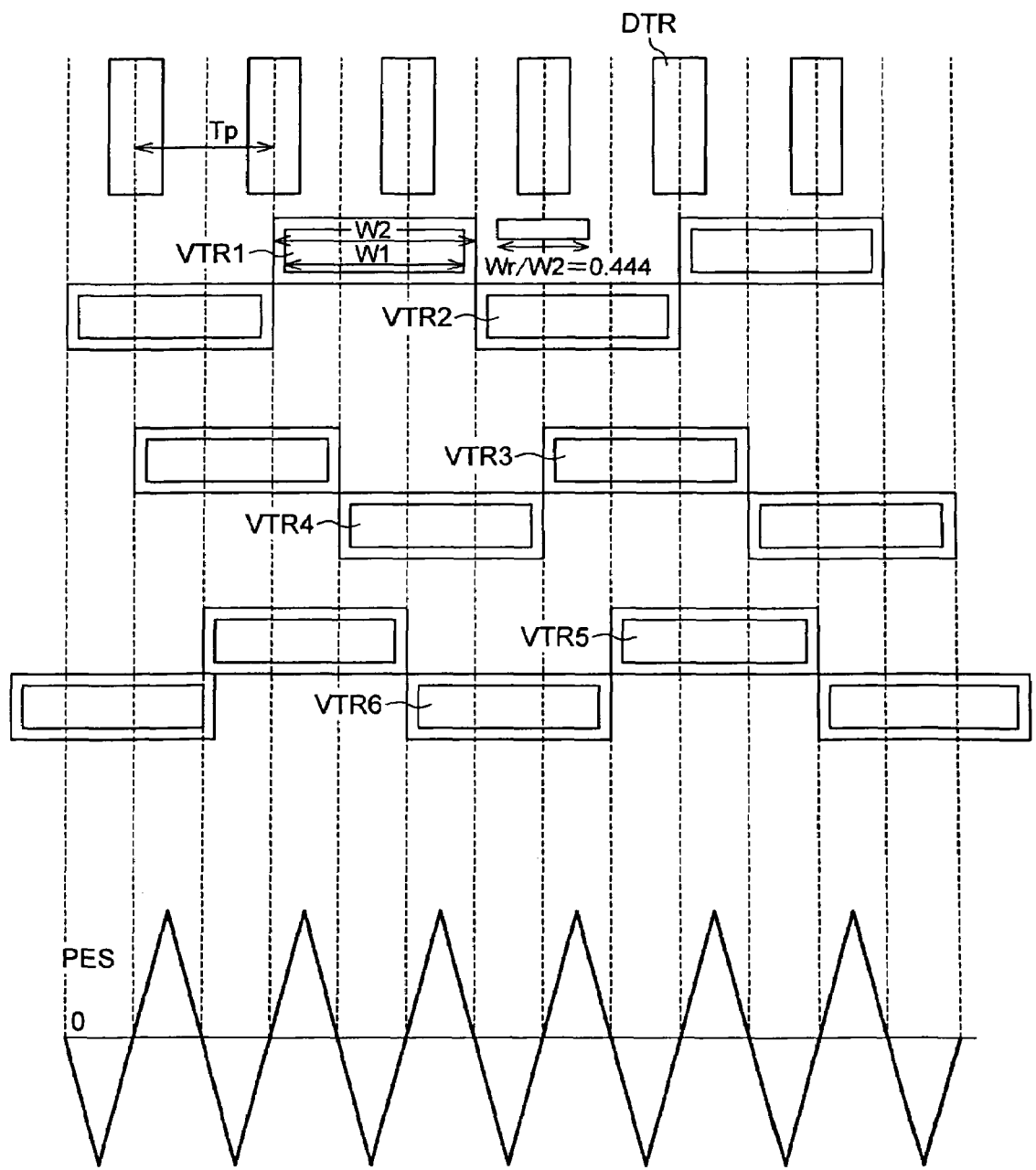
FIG. 69 is illustrative of a further specific experimentation embodiment, wherein the relations of burst patterns W1, W2 and track pitch Tp to magnetic read width Wr are schematically illustrated together with position error signal PES.
Figure 70:
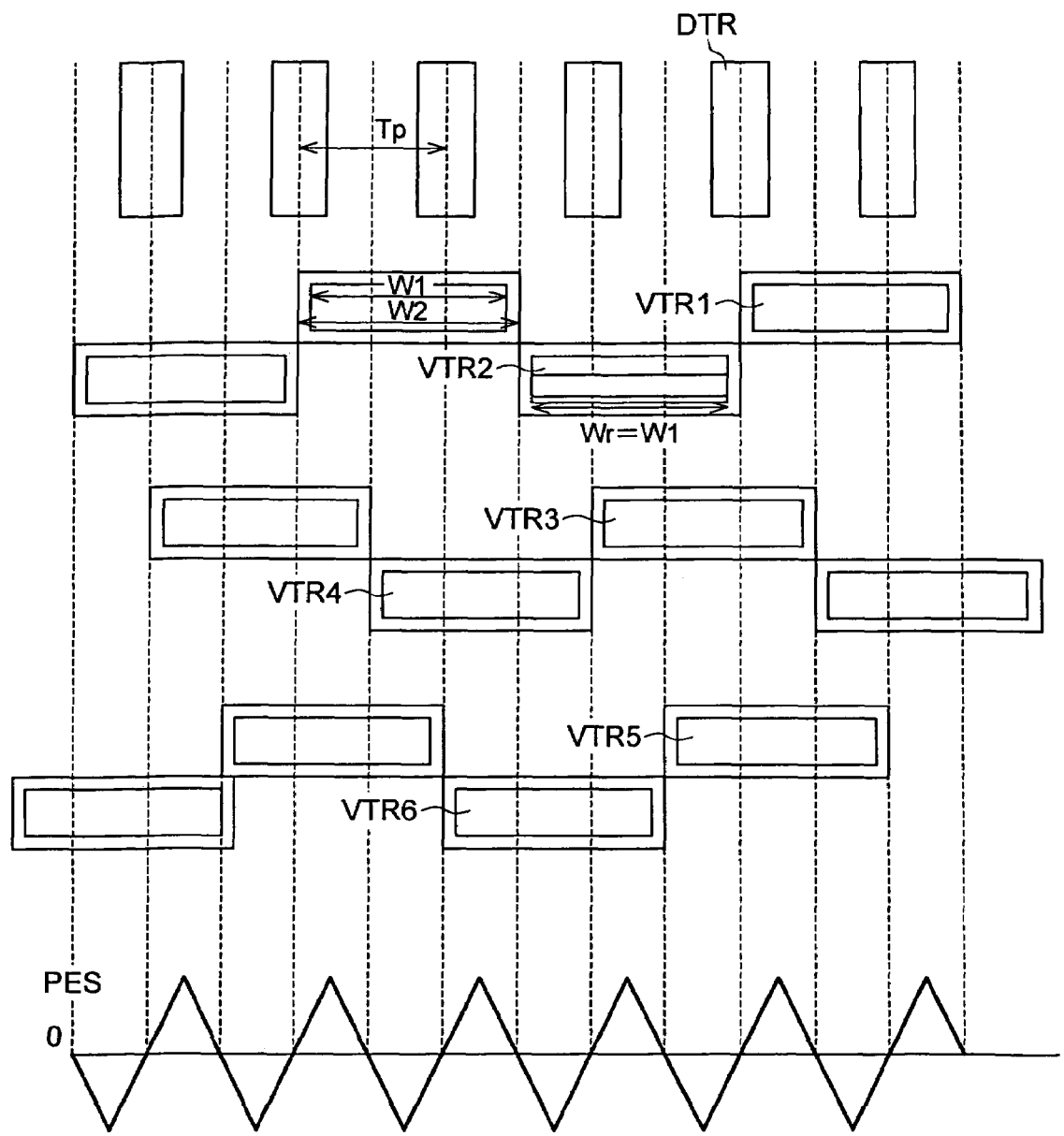
FIG. 70 is illustrative of a further specific experimentation embodiment, wherein the relations of burst patterns W1, W2 and track pitch Tp to magnetic read width Wr are schematically illustrated together with position error signal PES.
Figure 71:
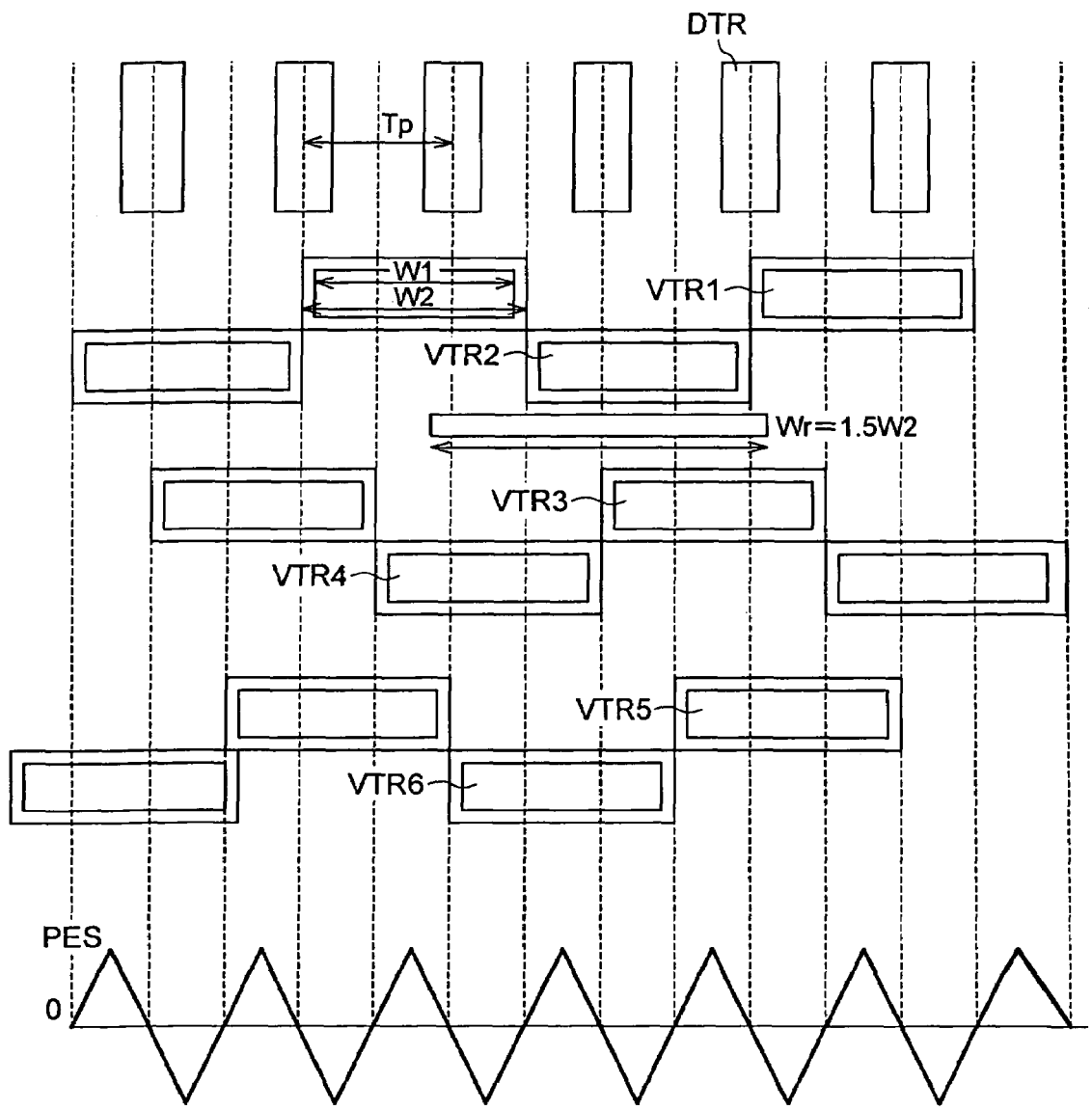
FIG. 71 is illustrative of a further specific experimentation embodiment, wherein the relations of burst patterns W1, W2 and track pitch Tp to magnetic read width Wr are schematically illustrated together with position error signal PES.
Figure 72:
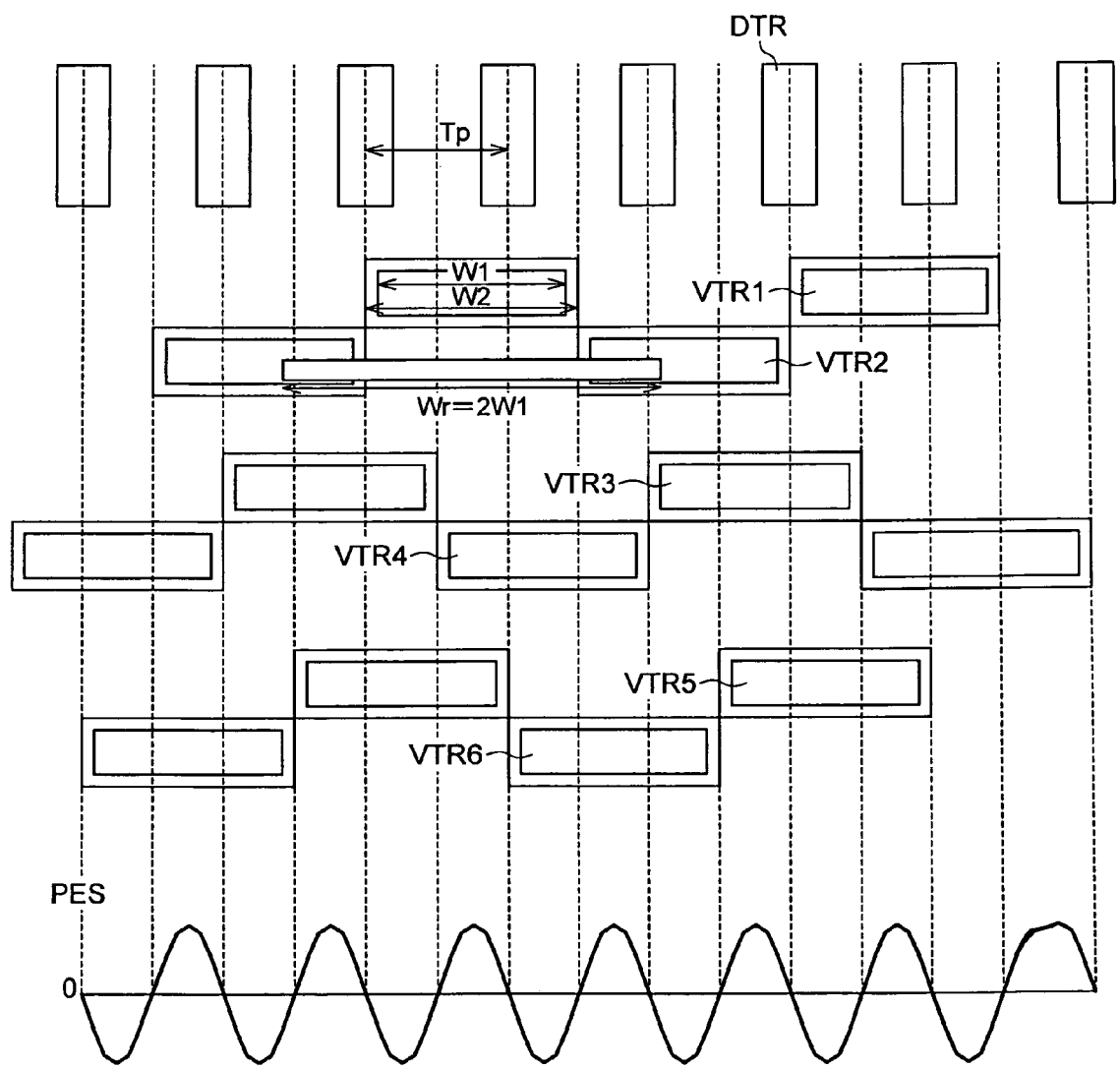
FIG. 72 is illustrative of a further specific experimentation embodiment, wherein the relations of burst patterns W1, W2 and track pitch Tp to magnetic read width Wr are schematically illustrated together with position error signal PES.

| Embodiment | Relation between Tp and W1 or W2 | Relation between Wr and W1, W2 or Tp | Level | Linearity of PES | Pertinent Drawing |
|---|---|---|---|---|---|
| 2-III-1 | W1 > Tp | Wr < 0.333W2 | disable(X) | poor | FIG. 67 |
| | | Wr = 0.333W2 < W1 | enable(○) | good | FIG. 68 |
| | | Wr = 0.444W2 | enable(○) | good | FIG. 69 |
| | | Wr = W1 | enable(○) | Good | FIG. 70 |
| | | Wr = 1.5W2 | enable(○) | good | FIG. 71 |
| | | Wr = 2W1 | disable(X) | poor | FIG. 72 |

(1) The conditions for Embodiment 2-III-1 shown in Table 2-3 were found as a result of making examinations of how the position error signals PES changed when, under the condition of W1>Tp, there were changes in the relations between the burst patterns W1, W2 and the track pitch Tp with respect to the magnetic read width Wr. The drawings pertinent to the respective cases correspond to FIGS. 67-72.

As can be seen from FIGS. 67-72, if the range of 1.5W2>Wr≧0.333W2, and 0.333W2<W1 is satisfied under the condition of W1>Tp, the position error detection signals can then gain linearity, indicating that the position error signals are at an enable level.

Note here that in the structure where M=3 and n=2, it is only required to take the above case of W1>Tp into account, as shown in FIG. 36.

[IV] EXPERIMENTAL EXAMPLE 2-4 WHERE M=3, AND n=1

Figure 37:
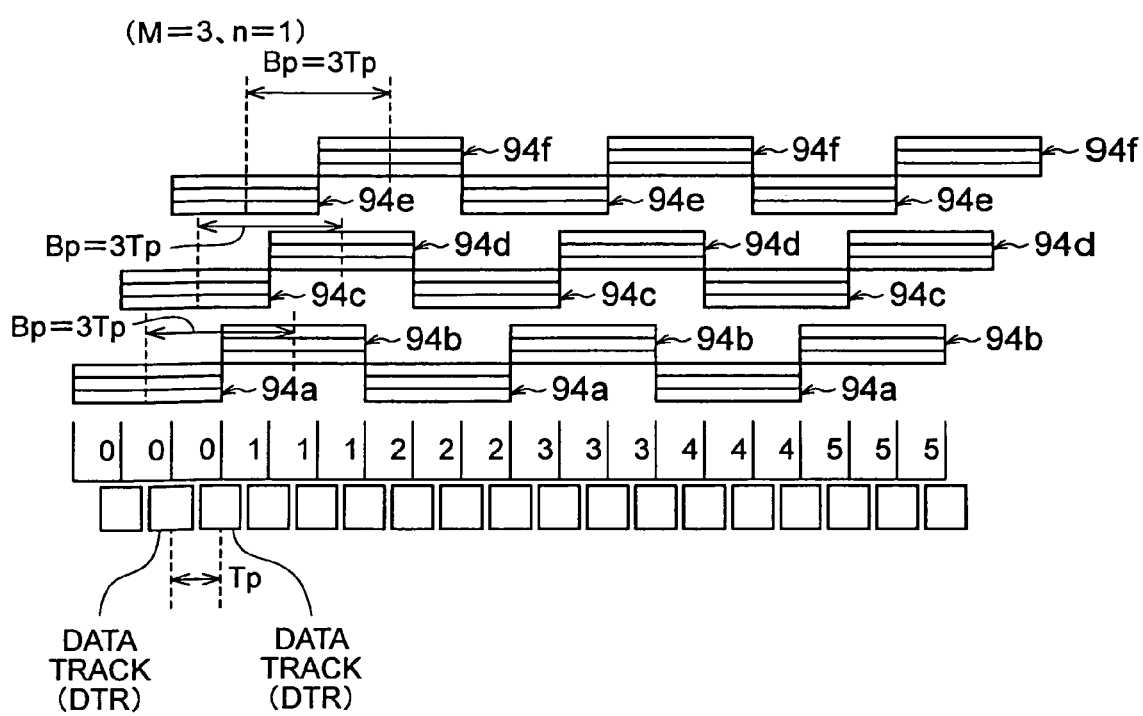
FIG. 37 is illustrative of what relation burst pattern pitch Bp has to data track pitch Tp at a burst portion comprising three pairs (sets) of burst patterns especially in the case where M=3 where M is the number of pairs (sets) of burst patterns and n in the burst pattern pitch Bp vs. data track pitch Tp relation Bp=(3/n)Tp is n=1.

As shown in FIG. 37, this example is directed to the case where M=3 (where M is the number of pairs (sets) of burst patterns, and when the burst pattern pitch Bp vs. data track pitch Tp relation is represented by Bp=(3/n)Tp, n=1. In other words, Example 2-4 is directed to the case where in the burst portion comprising three pairs (sets) of burst patterns, the burst pattern pitch Bp is three times as large as the data track pitch Tp (Bp=3Tp.

In this case, the first burst (VTR1) 94*a* and the second burst (VTR2) 94*b* in pair form are located such that the convex-form magnetic recording layers are formed while centerlines are defined at positions mutually offset by three track pitches of distance (3Tp) in the track width direction, as shown in FIG. 37.

The third burst (VTR3) 94*c* and the fourth burst (VTR4) 94*d* in pair form are located such that the convex-form magnetic recording layers are formed while centerlines are defined at positions mutually offset by three track pitches of distance (3Tp) in the track width direction, and the third burst (VTR3) 94*c* and the fourth burst (VTR4) 94*d* are located such that the convex-form magnetic recording layers are formed while centerlines are defined at positions offset from the centerlines of the first burst (VTR1) 94*a* and the second burst (VTR2) 94*b* by one track pitch of distance (1Tp).

The fifth burst (VTR5) 94*e* and the sixth burst (VTR6) 94*f* in pair form are located such that the convex-form magnetic recording layers are formed while centerlines are defined at positions mutually offset by three track pitches of distance (3Tp) in the track width direction, and the fifth burst (VTR53) 94*e* and the sixth burst (VTR6) 94*f* are located such that the convex-form magnetic recording layers are formed while centerlines are defined at positions offset from the centerlines of the first burst (VTR1) 94a and the second burst (VTR2) 94b by two track pitches of distance (2Tp).

Construction of the Magnetic Recording Medium

The structure (M=3 and n=3) of the burst division of the magnetic recording medium in the above Experimental Example 2-1 was changed to that where M=3 and n=1 (FIG. 37). Otherwise, the magnetic recording medium used in Experimental Example 2-4 was prepared as in Experimental Example 2-1. Using such a magnetic recording medium, tracking control experimentation was performed as in the above Experimental Example 2-1.

Specifically, at the discrete track disk and read magnetic head shown in Table 2-4 given below, W1, W2 and Wr were applied in combinations of values smaller and/or larger than the reference value of the track pitch Tp to find all position error-signals PES. Then, whether the linearity of PES as tracking characteristics was at an enable or disable level was determined.

In this conjunction, see the pertinent drawings referred to in Table 2-4 and illustrative in schematic of the relations between W1, W2, Tp and Tr in the experimental examples performed here. The EPS signals, too, are indicated in these drawings.

TABLE 2-4

Figure 73:
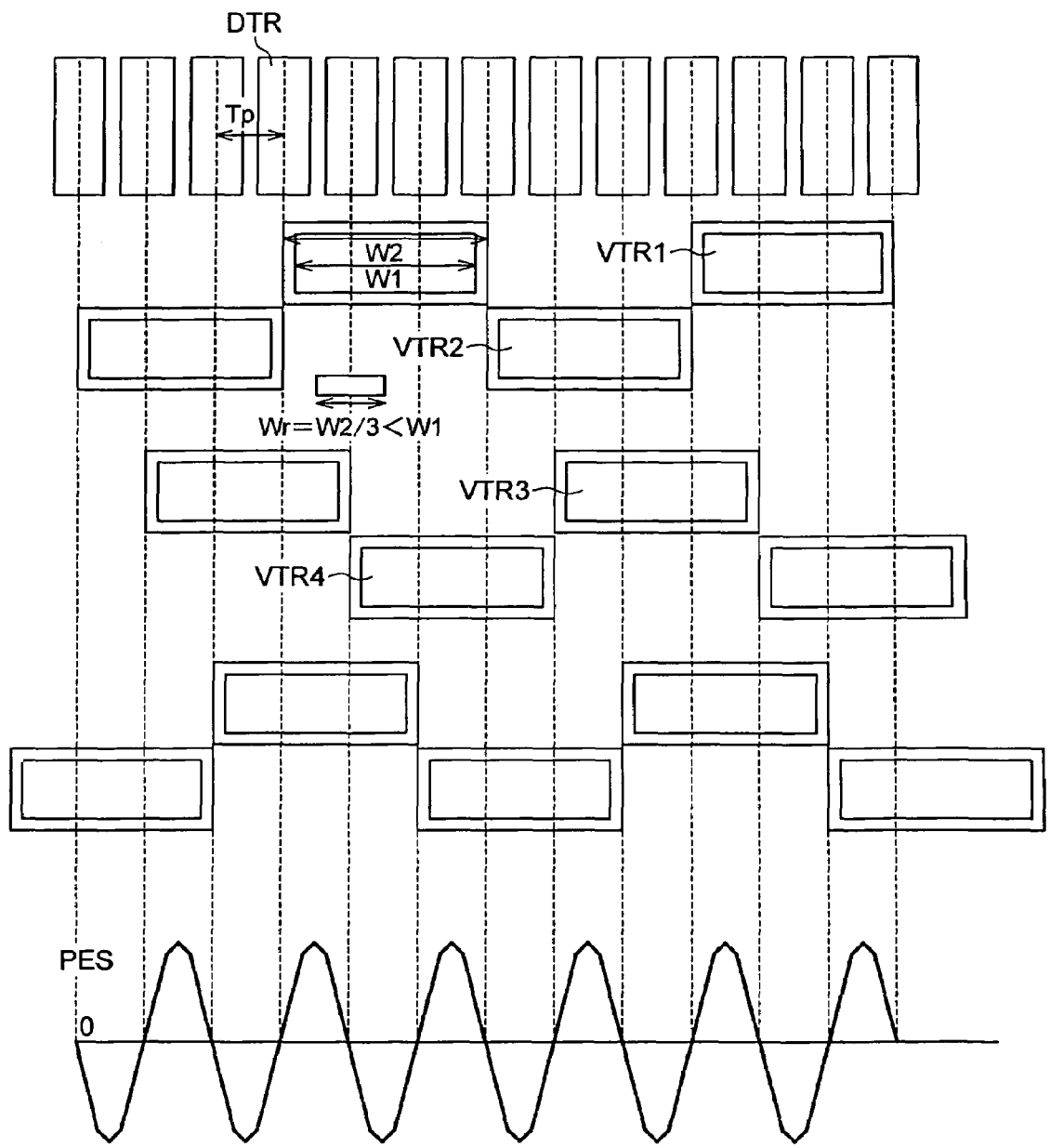
FIG. 73 is illustrative of a further specific experimentation embodiment, wherein the relations of burst patterns W1, W2 and track pitch Tp to magnetic read width Wr are schematically illustrated together with position error signal PES.
Figure 74:
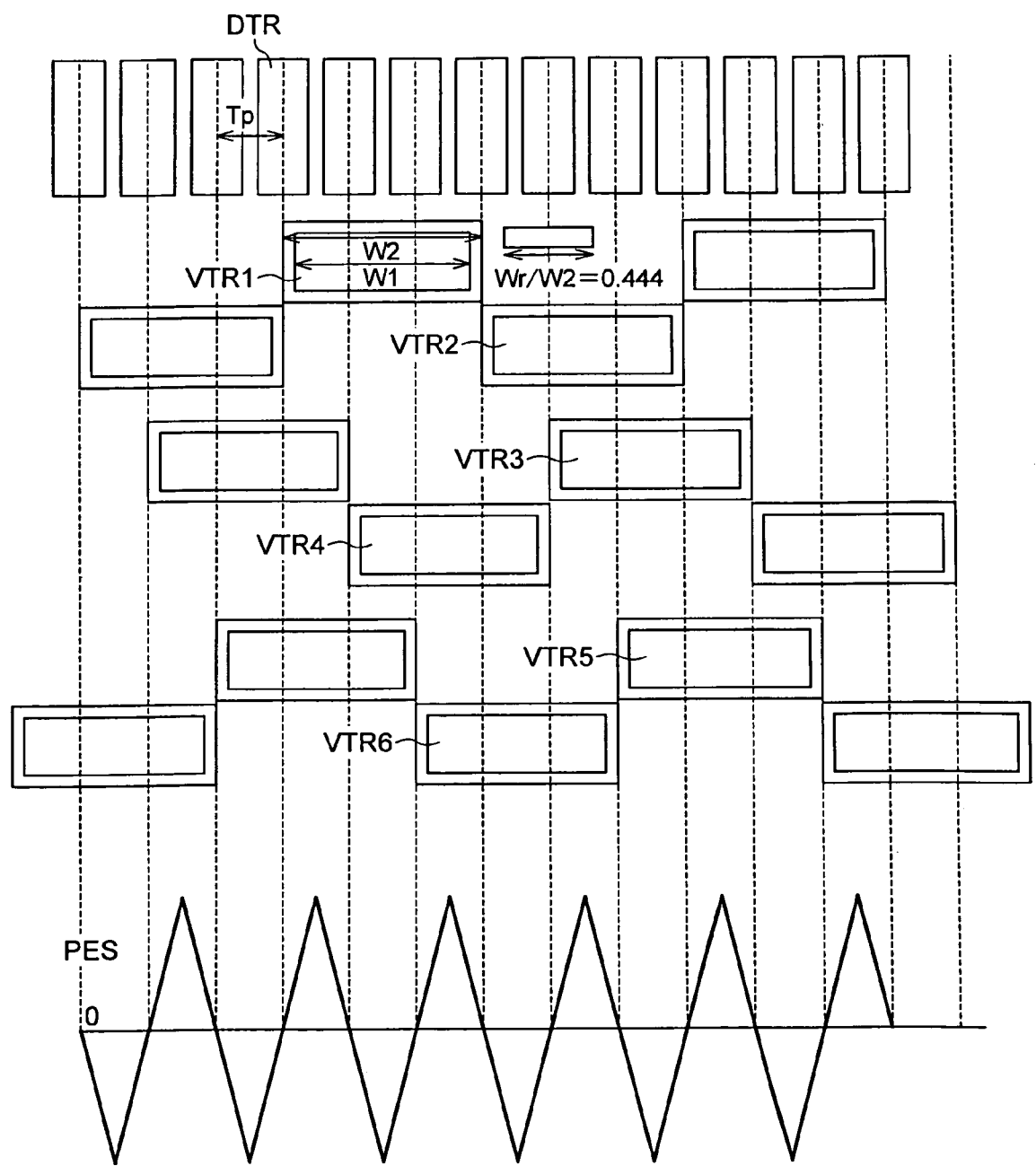
FIG. 74 is illustrative of a further specific experimentation embodiment, wherein the relations of burst patterns W1, W2 and track pitch Tp to magnetic read width Wr are schematically illustrated together with position error signal PES.
Figure 75:
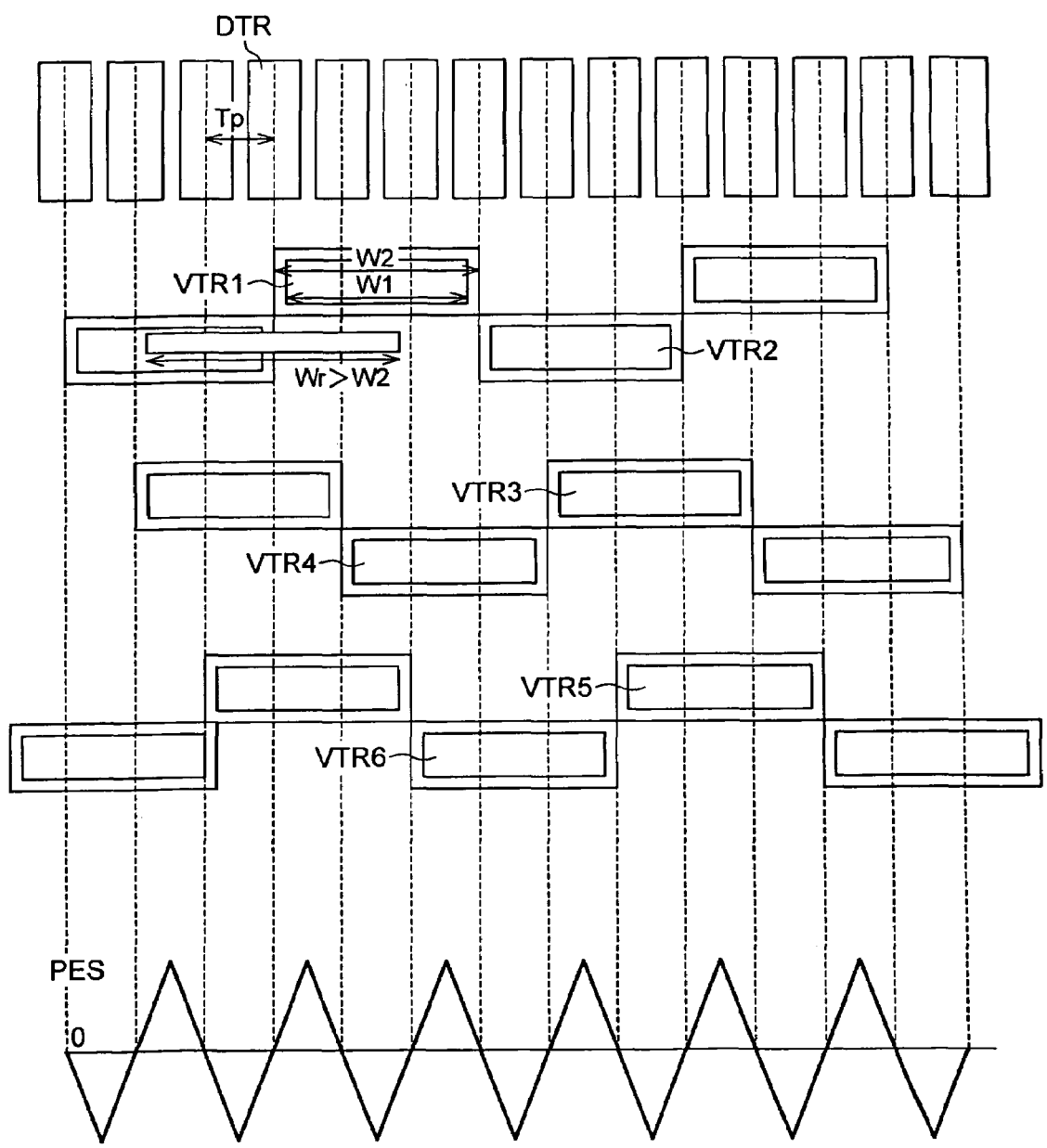
FIG. 75 is illustrative of a further specific experimentation embodiment, wherein the relations of burst patterns W1, W2 and track pitch Tp to magnetic read width Wr are schematically illustrated together with position error signal PES.
Figure 76:
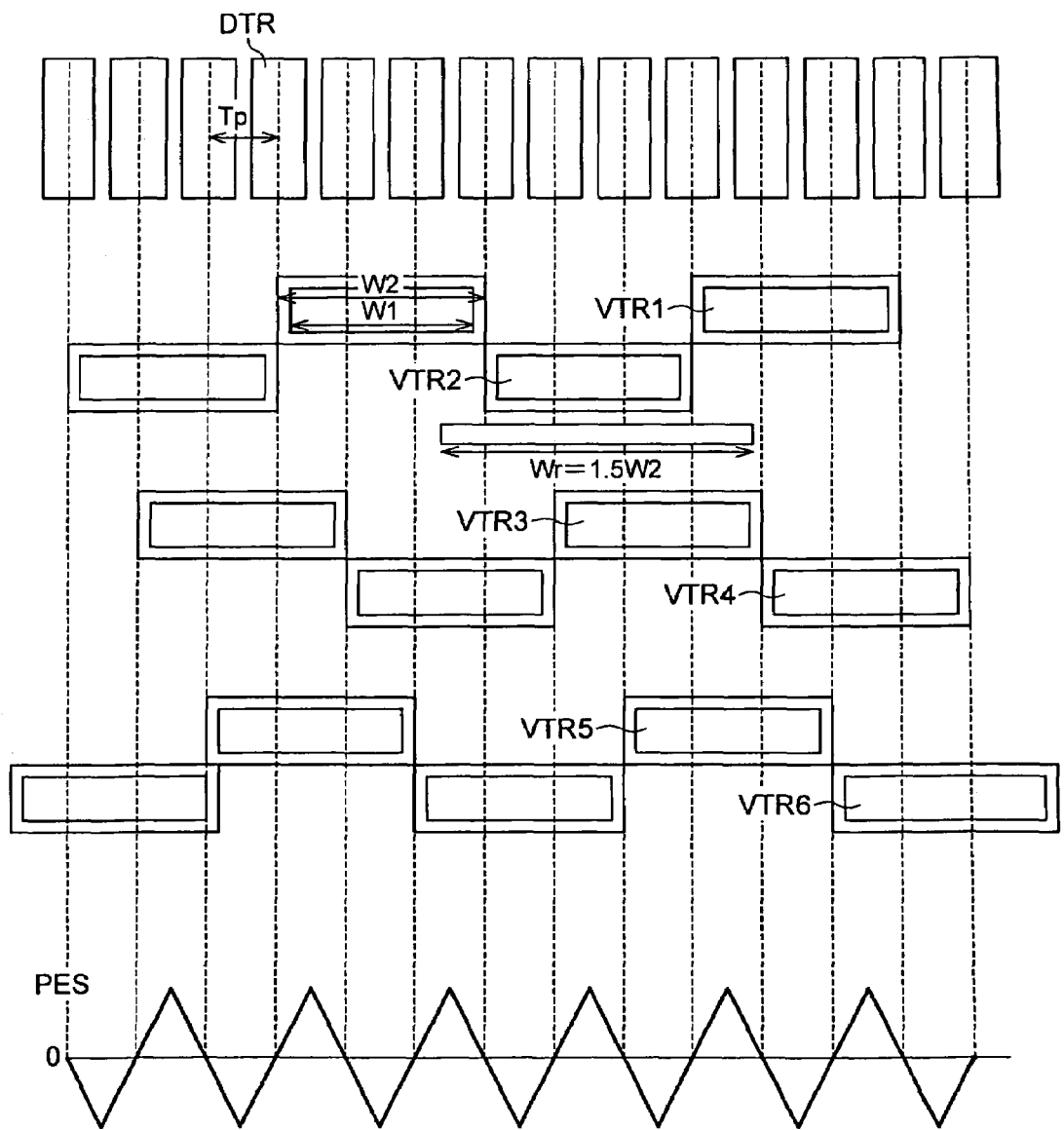
FIG. 76 is illustrative of a further specific experimentation embodiment, wherein the relations of burst patterns W1, W2 and track pitch Tp to magnetic read width Wr are schematically illustrated together with position error signal PES.
Figure 77:
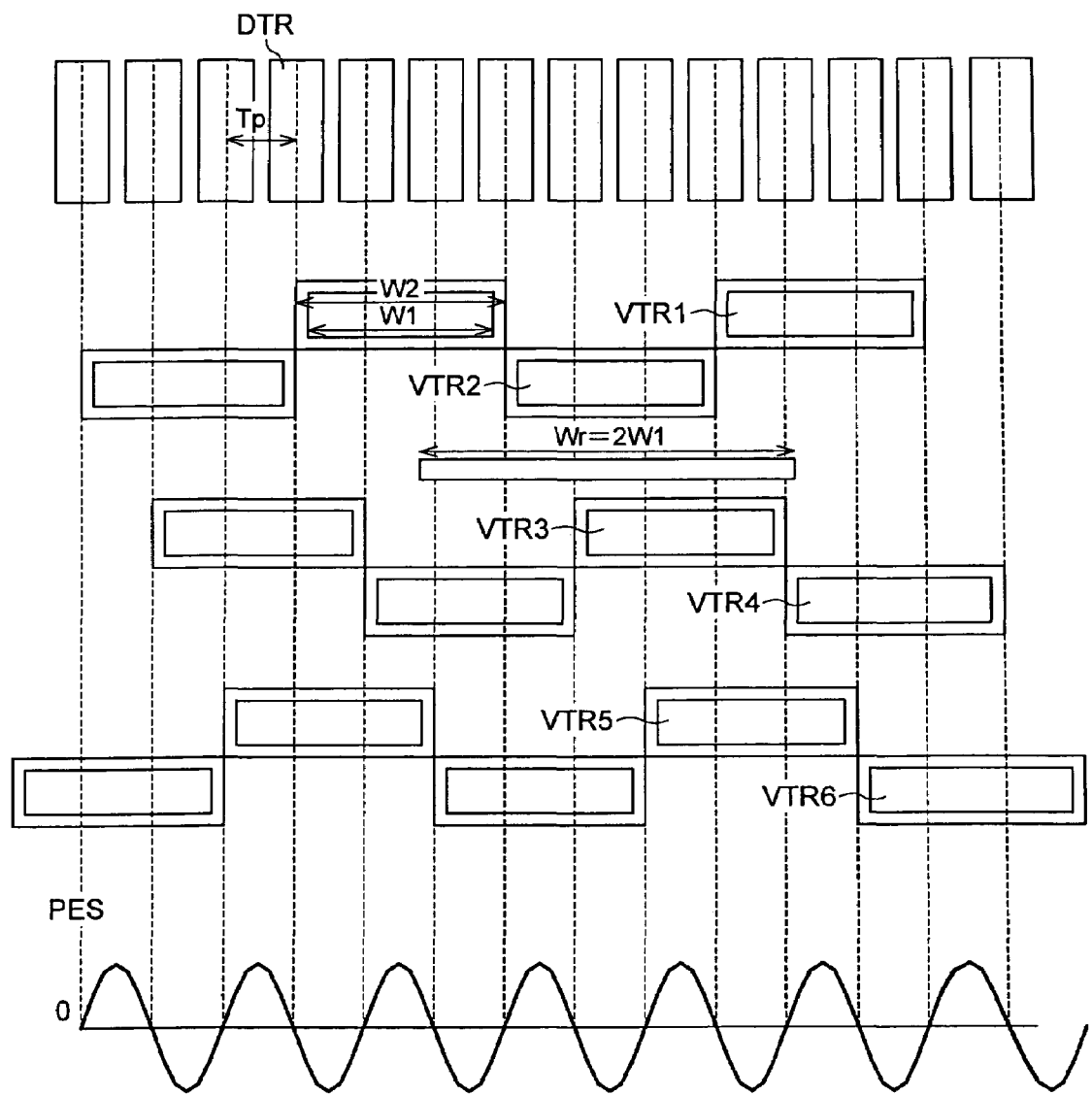
FIG. 77 is illustrative of a further specific experimentation embodiment, wherein the relations of burst patterns W1, W2 and track pitch Tp to magnetic read width Wr are schematically illustrated together with position error signal PES.

| | (M = 3; n = 1) | | | |
|---|---|---|---|---|
| Embodiment | Relation between Tp and W1 or W2 | Relation between Wr and W1, W2 or Tp | Level | Linearity of PES | Pertinent Drawing |
| 2-IV-1 | W1 > Tp | Wr < 0.333W2 | disable(X) | poor | FIG. 73 |
| | | Wr = 0.444W2 | enable(○) | good | FIG. 74 |
| | | Wr = W2 | enable(○) | good | FIG. 75 |
| | | Wr = 1.5W2 | enable(○) | good | FIG. 76 |
| | | Wr = 2W1 | disable(X) | poor | FIG. 77 |

(1) The conditions for Embodiment 2-IV-1 shown in Table 2-4 were found as a result of making examinations of how the position error signals PES changed when, under the condition of W1>Tp, there were changes in the relations between the burst patterns W1, W2 and the track pitch Tp with respect to the magnetic read width Wr. The drawings pertinent to the respective cases correspond to FIGS. 73-77.

As can be seen from FIGS. 73-77, if the range of 1.5W2>Wr≧0.444W2 is satisfied under the condition of W1>Tp, the position error detection signals can then gain linearity, indicating that the position error signals are at an enable level.

Note here that in the structure where M=3 and n=2, it is only required to take the above case of W1>Tp into account, as shown in FIG. 37.

[V] EXPERIMENTAL EXAMPLE 2-5

Experimentation was conducted of the dependency on angle of the slant of a trapezoidal shape. Specifically, the dependency on angle of slants of a trapezoidal pattern was examined with respect to the lower limit condition Wr=0.444W1 (FIG. 50) in Embodiment 2-I-3 in the above Table 2-1. The requirement of Wr=0.444W1 in Embodiment 2-I-3 would be some severe condition for obtaining linearity.

Set out in Table 2-5 are the results of examination of the dependency on angle of the slant of the trapezoidal pattern, and in FIGS. 78-82 are the PESs when the angle θ of the slant of the trapezoidal pattern was set at 21°, 31°, 38.7°, 50°, and 85°, respectively. In Table 2-5, the "enable" and "disable (hard-to-use)" levels in view of linearity are indicated by ○ and X, respectively.

TABLE 2-5

Figure 78:
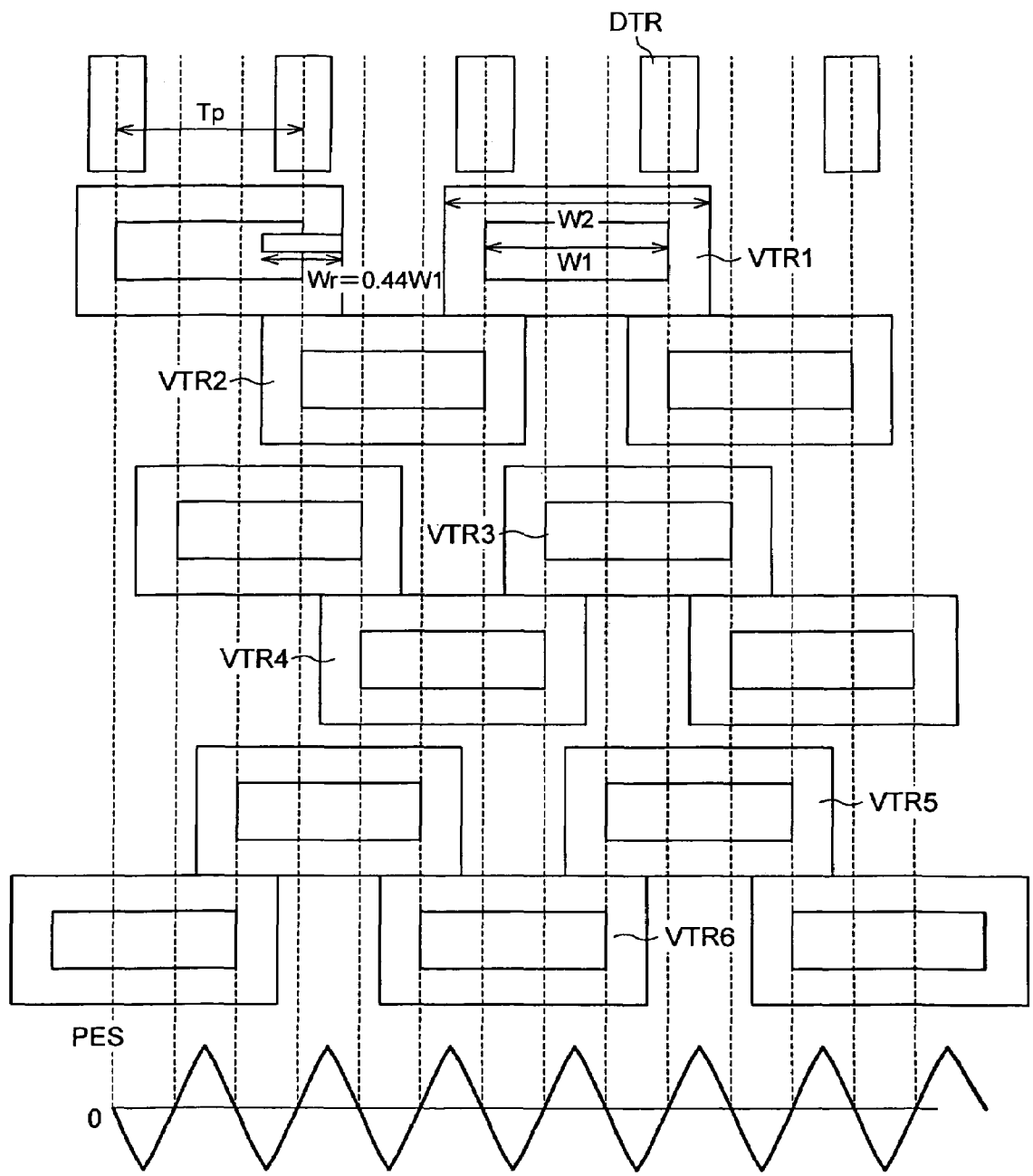
FIG. 78 is illustrative of one experimentation embodiment carried out for the examination of the dependency on angle of a trapezoidal slant of the trapezoidal pattern.
Figure 79:
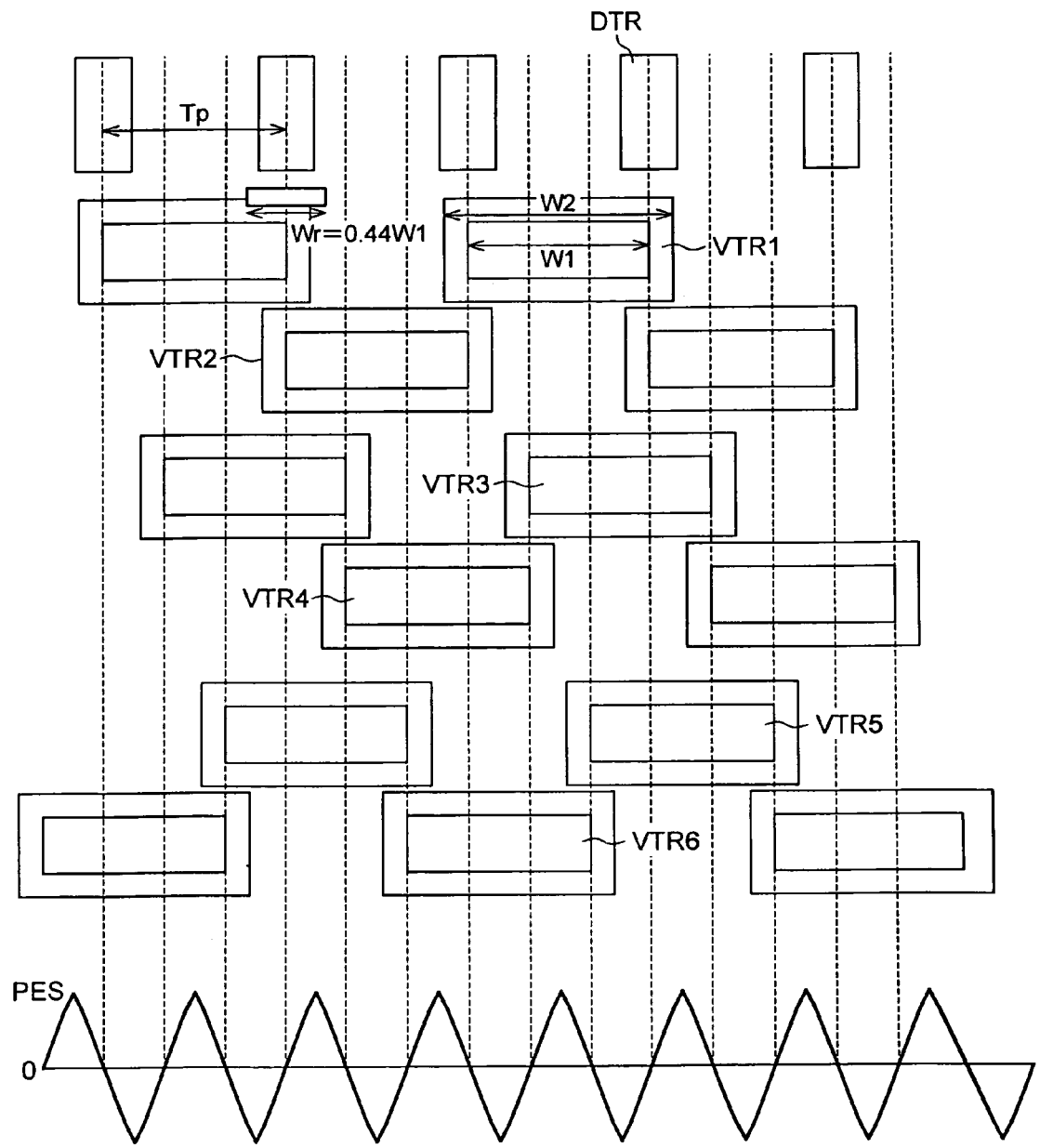
FIG. 79 is illustrative of another experimentation embodiment carried out for the examination of the dependency on angle of a trapezoidal slant of the trapezoidal pattern.
Figure 80:
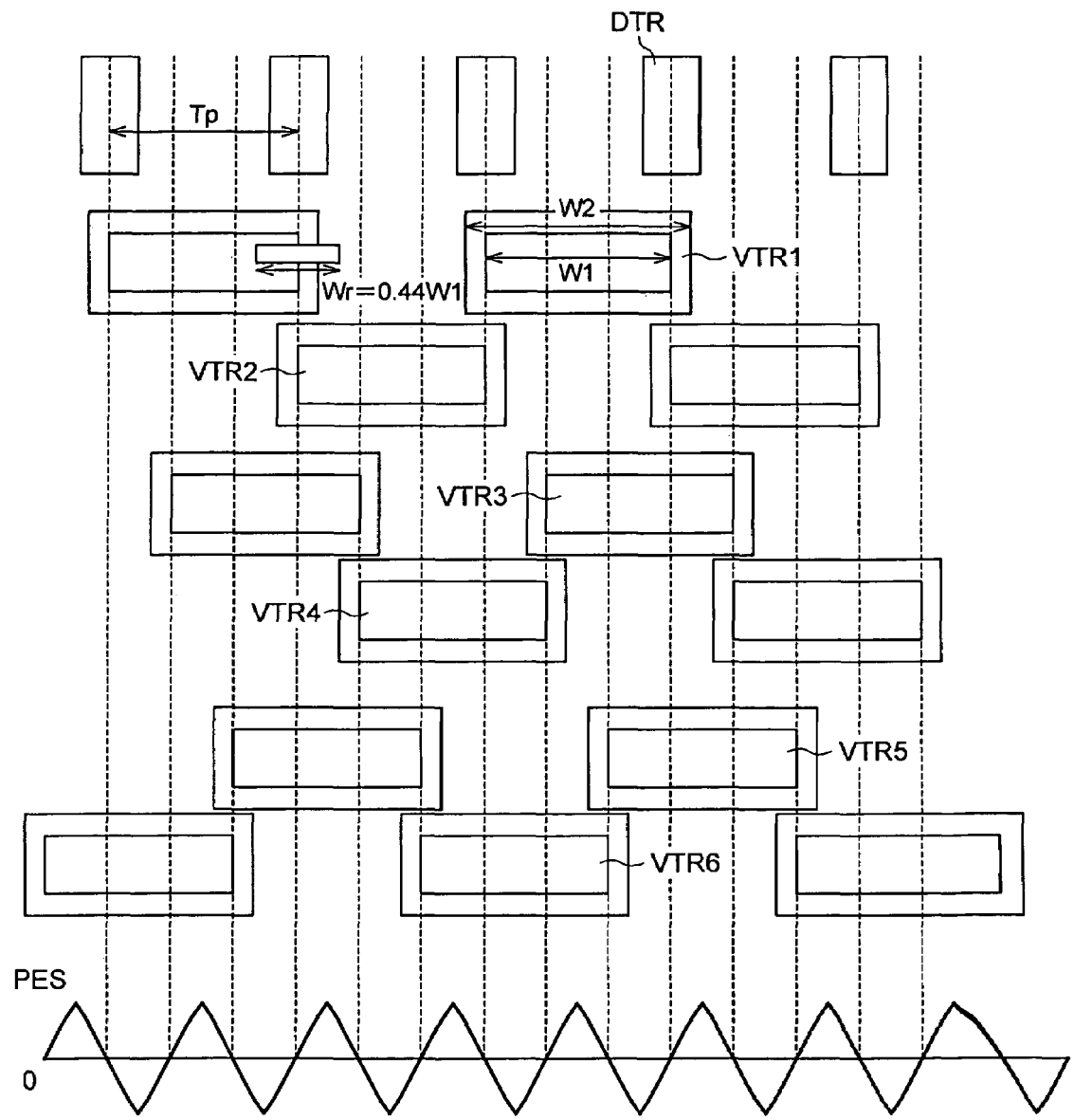
FIG. 80 is illustrative of yet another experimentation embodiment carried out for the examination of the dependency on angle of a trapezoidal slant of the trapezoidal pattern.
Figure 81:
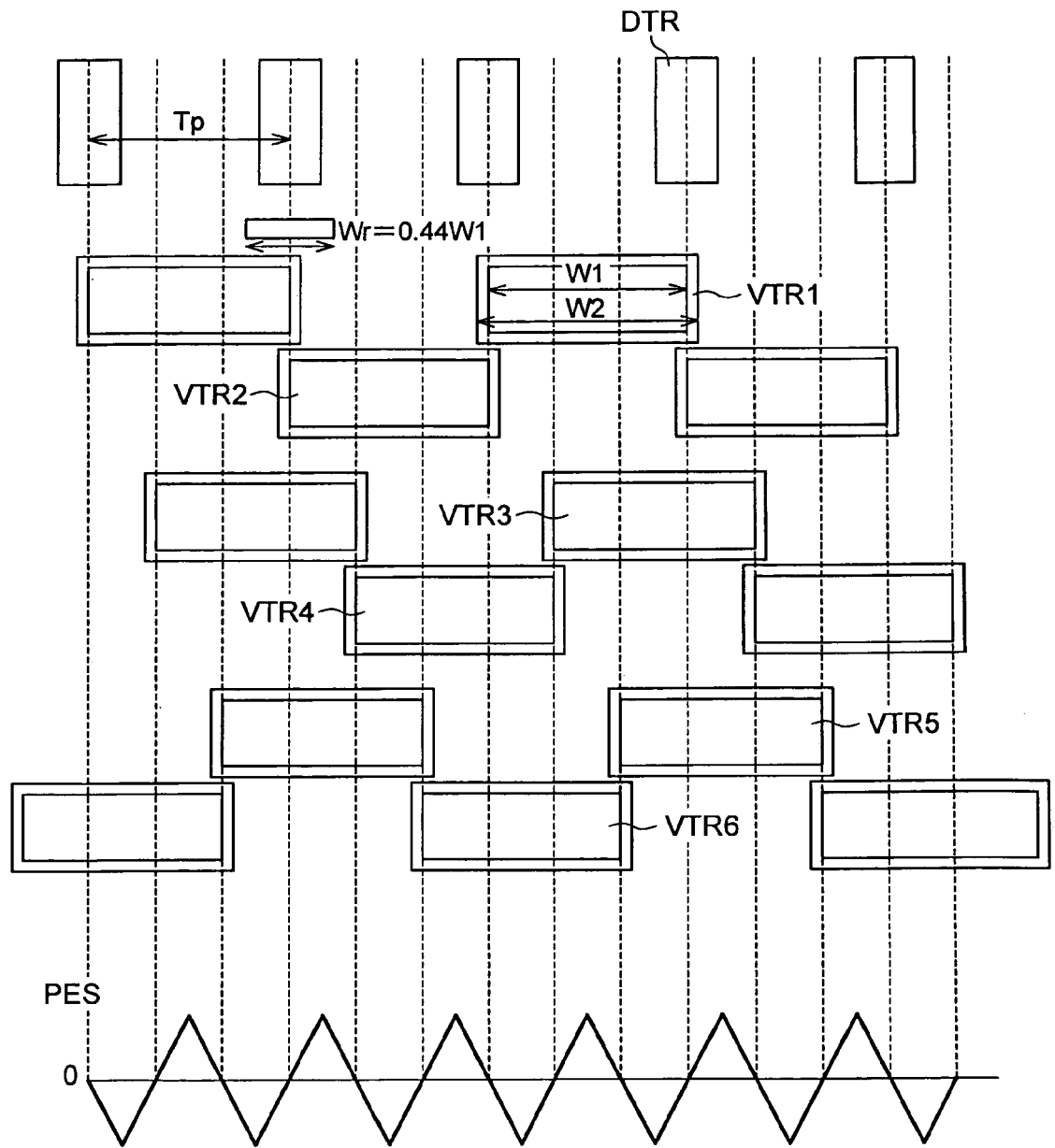
FIG. 81 is illustrative of a further experimentation embodiment carried out for the examination of the dependency on angle of a trapezoidal slant of the trapezoidal pattern.
Figure 82:
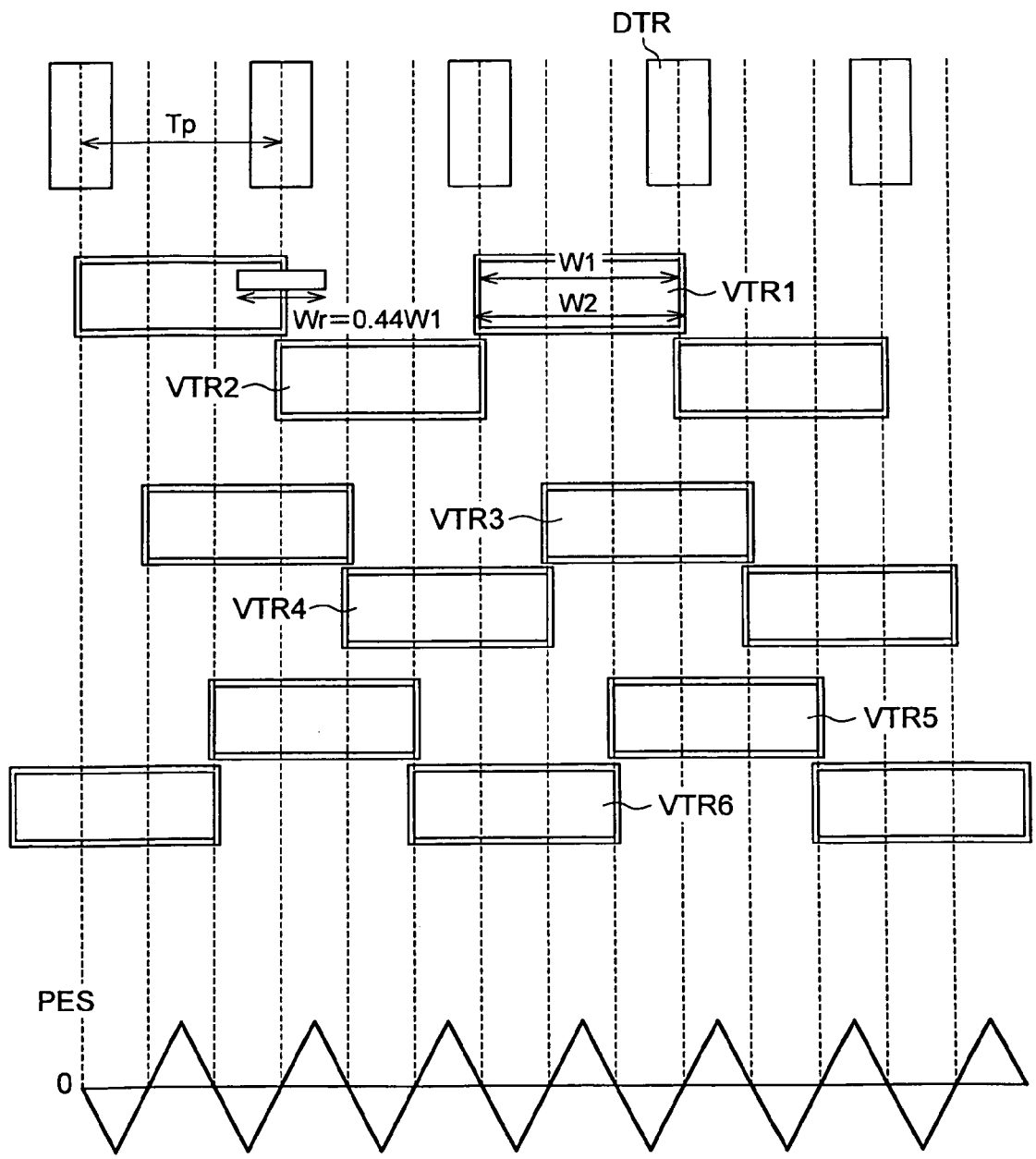
FIG. 82 is illustrative of a further experimentation embodiment carried out for the examination of the dependency on angle of a trapezoidal slant of the trapezoidal pattern.
Figure 83:
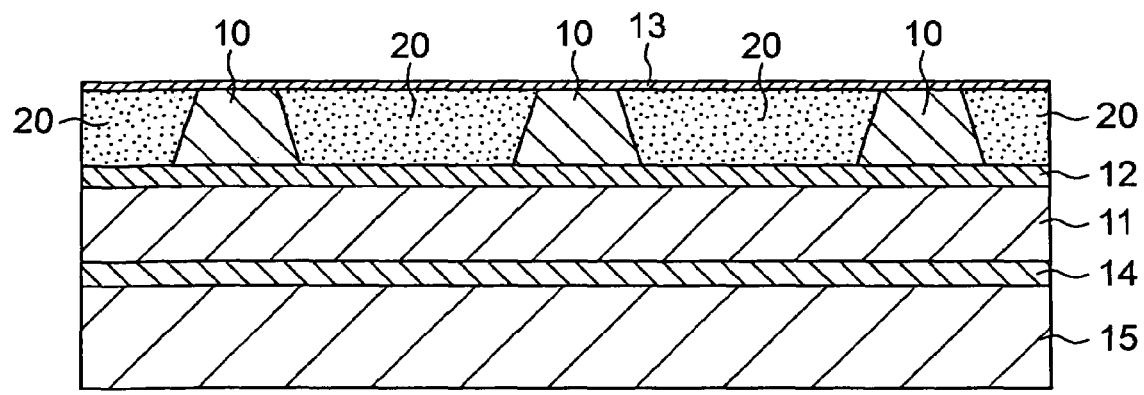
FIG. 83 is a schematic section taken on A-A' arrows in FIG. 38

| Slant Angle | 21° | 31° | 38.7° | 50° | 85° |
|---|---|---|---|---|---|
| Level | X | X | X | ○ | ○ |
| Pertinent Drawing | FIG. 78 | FIG. 79 | FIG. 80 | FIG. 81 | FIG. 82 |

From the results of Table 2-5, it is found that even when severe conditions are applied to the trapezoidal pattern, the angle between the slant and the base of the trapezoidal structure should preferably be at least 50° in the track width direction in particular, and the maximum slant angle should preferably be at most 85°.

That is, let h be the height from the lower side W2 to the upper side W1 of the convex magnetic recording layer. Then, $$\tan 85° \geq 2h/(W2-W1) \geq \tan 50°$$

Preferably, $$\tan 80° \geq 2h/(W2-W1) \geq \tan 70°$$

The advantages of, and the requirements for, the invention will become apparent from the above results. That is, the present invention provides a magnetic recording medium having a burst pattern configuration that can get hold of some dimensional accuracy margin upon medium fabrication processes to lessen loads on medium fabrication yet gain precise position error signals and a magnetic recording/reproducing system incorporating it, because the burst pattern in the discrete medium is configured in a substantially trapezoidal shape (truncated quadrangular pyramid shape) in both the track width direction and the track circumference direction, and in such a way as to satisfy the predetermined relations between W1, W2, Tp and Wr wherein W1 and W2 are the upper side and the lower side of the trapezoidal shape in the track width direction, which correspond to the surface and the bottom surface of the convex magnetic recording layer, respectively, Tp is the data track pitch at the data information recording portion, and Wr is the read width of the magnetic head.

The invention could also be applied even to an embodiment wherein a part of the magnetic layer is left behind as depicted in FIG. 31, because the remaining thin magnetic layer portion has no or little influence on the magnetic characteristics of the medium; the lower side of the trapezoidal shape corresponding to the bottom surface of the magnetic recording layer could be thought of as W2 without taking care of the remaining portion.

Note here that even when one more pair of burst patterns adds up to four pairs of burst patterns (M=4), there might be a lot wider practical range capable of gaining precise position error signals. In this arrangement, however, the effect on making the practical range wider is in saturation relative to the need of a lot more intrigue fabrication processes and a lot more sophisticated controls; this arrangement is much less effective than the inventive arrangement comprising a total of three pairs of burst patterns (M=3).

Also note that the above experimental examples are given to determine the minimum requirement for getting hold of the linearity of position error signals; that is, an additional condition for preventing the read head width Wr (magnetic read width Wr) from direct reproduction of data at the adjacent data tracks is provided to an actual system.

Specifically, there need be $$Wr<2Tp-W$$

Figure 85:
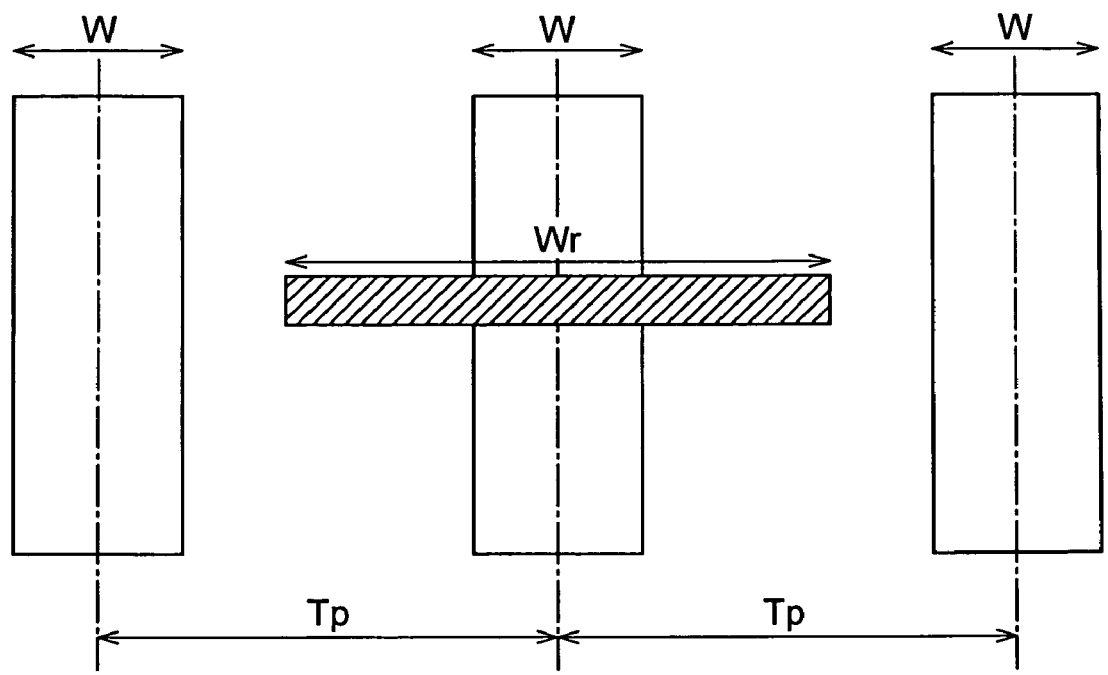
FIG. 85 is illustrative of the condition for the upper limit to the magnetic read width Wr.

Here W is the data track width, and Tp is the track pitch. It follows that there need be a condition for preventing the magnetic read width Wr from spreading over the adjoining two data, as depicted in FIG. 85.

The magnetic recording media of the invention are used with computers in particular, and in the information recoding system industry in general.

What we claim is:

1. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
    said data information recording portion comprises a data track having a data track pitch Tp,
    said servo information portion comprises a magnetic recording layer formed in a given concave-convex pattern,
    said servo information portion comprises a burst division on which tracking burst signals are recorded,
    said burst division comprises a first burst, a second burst, a third burst and a fourth burst, each comprising a plurality of convex-form magnetic recording layers with the burst signals recorded thereon,
    said first burst and said second burst in pair form are located such that the convex-form magnetic recording layers are formed with centerlines defined at positions mutually offset by two track pitches of distance (2Tp) in a track width direction,
    said third burst and said fourth burst in pair form are located such that the convex-form magnetic recording layers are formed with centerlines defined at positions mutually offset by two track pitches of distance (2Tp) in the track width direction, and said third burst and said fourth burst are located such that the convex-form magnetic recording layers are formed with centerlines defined at positions offset from centerlines of said first burst and said second burst by one track pitch of distance (1Tp),
    said convex-form magnetic layers are each configured in a substantially trapezoidal shape (truncated quadrangular pyramid shape) in the track width direction and in a track circumference direction, respectively, and
    said magnetic recording/reproducing system satisfies the following condition provided that W1>Tp:

$$1.25W2>Wr\geq 0.5W2$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

2. A magnetic recording/reproducing system according to claim 1, which further satisfies the following condition:

$$\tan 85°\geq 2h/(W2-W1)\geq \tan 50°$$

where h is a height from the lower side W2 of to the upper side W1 of the convex-form magnetic recording layer.

3. A magnetic recording/reproducing system according to claim 1, which further satisfies the following condition:

$$Wr<2Tp-W$$

where W is a data track width, Wr is the magnetic read width, and Tp is the track pitch.

4. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
    said data information recording portion comprises a data track having a data track pitch Tp,
    said servo information portion comprises a magnetic recording layer formed in a given concave-convex pattern,
    said servo information portion comprises a burst division on which tracking burst signals are recorded,
    said burst division comprises a first burst, a second burst, a third burst and a fourth burst, each comprising a plurality of convex-form magnetic recording layers with the burst signals recorded thereon,
    said first burst and said second burst in pair form are located such that the convex-form magnetic recording layers are formed with centerlines defined at positions mutually offset by a (2/3) track pitch of distance ((2/3)Tp) in a track width direction,
    said third burst and said fourth burst in pair form are located such that the convex-form magnetic recording layers are formed with centerlines defined at positions mutually offset by a (2/3) track pitch of distance ((2/3)Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp),
    said convex-form magnetic layers are each configured in a substantially trapezoidal shape (truncated quadrangular pyramid shape) in the track width direction and in a track circumference direction, respectively, and
    said magnetic recording/reproducing system satisfies the following condition provided that Tp>W2:

$$1.5W2\geq Wr\geq 0.5W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

5. A magnetic recording/reproducing system according to claim 4, which further satisfies the following condition:

$$\tan 85°\geq 2h/(W2-W1)\geq \tan 50°$$

where h is a height from the lower side W2 of to the upper side W1 of the convex-form magnetic recording layer.

6. A magnetic recording/reproducing system according to claim 2, which further satisfies the following condition:

$$Wr<2Tp-W$$

where W is a data track width, Wr is the magnetic read width, and Tp is the track pitch.

7. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
said data information recording portion comprises a data track having a data track pitch Tp,
said servo information portion comprises a magnetic recording layer formed in a given concave-convex pattern,
said servo information portion comprises a burst division on which tracking burst signals are recorded,
said burst division comprises a first burst, a second burst, a third burst, a fourth burst, a fifth burst and a sixth burst, each comprising a plurality of convex-form magnetic recording layers with the burst signals recorded thereon,
said first burst and said second burst in pair form are located such that the convex-form magnetic recording layers are formed with centerlines defined at positions mutually offset by one track pitch of distance (1Tp) in a track width direction,
said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp),
said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp),
said convex-form magnetic layers are each configured in a substantially trapezoidal shape (truncated quadrangular pyramid shape) in the track width direction and in a track circumference direction, respectively, and
said magnetic recording/reproducing system satisfies the following conditions provided that Tp>W2:

$$2W2 > Wr \geq 0.5W2$$

$$0.5W2 < W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

8. A magnetic recording/reproducing system according to claim 7, which further satisfies the following condition:

$$\tan 85° \geq 2h/(W2-W1) \geq \tan 50°$$

where h is a height from the lower side W2 of to the upper side W1 of the convex-form magnetic recording layer.

9. A magnetic recording/reproducing system according to claim 7, which further satisfies the following condition:

$$Wr < 2Tp - W$$

where W is a data track width, Wr is the magnetic read width, and Tp is the track pitch.

10. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
said data information recording portion comprises a data track having a data track pitch Tp,
said servo information portion comprises a magnetic recording layer formed in a given concave-convex pattern,
said servo information portion comprises a burst division on which tracking burst signals are recorded,
said burst division comprises a first burst, a second burst, a third burst, a fourth burst, a fifth burst and a sixth burst, each comprising a plurality of convex-form magnetic recording layers with the burst signals recorded thereon,
said first burst and said second burst in pair form are located such that the convex-form magnetic recording layers are formed with centerlines defined at positions mutually offset by one track pitch of distance (1Tp) in a track width direction,
said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp),
said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp),
said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that Tp=W2:

$$2W2 - W1 \geq Wr \geq 0.444W2$$

$$0.444W2 < W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

11. A magnetic recording/reproducing system according to claim 10, which further satisfies the following condition:

$$\tan 85° \geq 2h/(W2-W1) \geq \tan 50°$$

where h is a height from the lower side W2 of to the upper side W1 of the convex-form magnetic recording layer.

12. A magnetic recording/reproducing system according to claim 10, which further satisfies the following condition:

$$Wr < 2Tp - W$$

where W is a data track width, Wr is the magnetic read width, and Tp is the track pitch.

13. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
  said data information recording portion comprises a data track having a data track pitch Tp,
  said servo information portion comprises a magnetic recording layer formed in a given concave-convex pattern,
  said servo information portion comprises a burst division on which tracking burst signals are recorded,
  said burst division comprises a first burst, a second burst, a third burst, a fourth burst, a fifth burst and a sixth burst, each comprising a plurality of convex-form magnetic recording layers with the burst signals recorded thereon,
  said first burst and said second burst in pair form are located such that the convex-form magnetic recording layers are formed with centerlines defined at positions mutually offset by one track pitch of distance (1Tp) in a track width direction,
  said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp),
  said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp),
  said convex-form magnetic layers are each configured in a substantially trapezoidal shape (truncated quadrangular pyramid shape) in the track width direction and in a track circumference direction, respectively, and said magnetic recording/reproducing system satisfies the following condition provided that Tp=W1:

$$1.5W1 \geq Wr \geq 0.444W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

14. A magnetic recording/reproducing system according to claim 13, which further satisfies the following condition:

$$\tan 85° \geq 2h/(W2-W1) \geq \tan 50°$$

where h is a height from the lower side W2 of to the upper side W1 of the convex-form magnetic recording layer.

15. A magnetic recording/reproducing system according to claim 13, which further satisfies the following condition:

$$Wr < 2Tp - W$$

where W is a data track width, Wr is the magnetic read width, and Tp is the track pitch.

16. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
  said data information recording portion comprises a data track having a data track pitch Tp,
  said servo information portion comprises a magnetic recording layer formed in a given concave-convex pattern,
  said servo information portion comprises a burst division on which tracking burst signals are recorded,
  said burst division comprises a first burst, a second burst, a third burst, a fourth burst, a fifth burst and a sixth burst, each comprising a plurality of convex-form magnetic recording layers with the burst signals recorded thereon,
  said first burst and said second burst in pair form are located such that the convex-form magnetic recording layers are formed with centerlines defined at positions mutually offset by one track pitch of distance (1Tp) in a track width direction,
  said third burst and said fourth burst in pair form are located such that the convex-form magnetic recording layers are formed with centerlines defined at positions mutually offset by one track pitch of distance (1Tp) in the track width direction, and said third burst and said fourth burst are located such that the convex-form magnetic recording layers are formed with centerlines defined at positions offset from centerlines of said first burst and said second burst by a (1/3) track pitch of distance ((1/3)Tp),
  said fifth burst and said sixth burst in pair form are located such that the convex-form magnetic recording layers are formed with centerlines defined at positions mutually offset by one track pitch of distance (1Tp) in the track width direction, and said fifth burst and said sixth burst are located such that the convex-form magnetic recording layers are formed with centerlines defined at positions offset from centerlines of said first burst and said second burst by a (2/3) track pitch of distance ((2/3)Tp),
  said convex-form magnetic layers are each configured in a substantially trapezoidal shape (truncated quadrangular pyramid shape) in the track width direction and in a track circumference direction, respectively, and
  said magnetic recording/reproducing system satisfies the following condition provided that Tp<W1:

$$1.5W1 \geq Wr \geq 0.333W2$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

17. A magnetic recording/reproducing system according to claim 16, which further satisfies the following condition:

$$\tan 85° \geq 2h/(W2-W1) \geq \tan 50°$$

where h is a height from the lower side W2 of to the upper side W1 of the convex-form magnetic recording layer.

18. A magnetic recording/reproducing system according to claim 16, which further satisfies the following condition:

$$Wr<2Tp-W$$

where W is a data track width, Wr is the magnetic read width, and Tp is the track pitch.

19. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
   said data information recording portion comprises a data track having a data track pitch Tp,
   said servo information portion comprises a magnetic recording layer formed in a given concave-convex pattern,
   said servo information portion comprises a burst division on which tracking burst signals are recorded,
   said burst division comprises a first burst, a second burst, a third burst, a fourth burst, a fifth burst and a sixth burst, each comprising a plurality of convex-form magnetic recording layers with the burst signals recorded thereon,
   said first burst and said second burst in pair form are located such that the convex-form magnetic recording layers are formed with centerlines defined at positions mutually offset by a (3/4) track pitch of distance ((3/4)Tp) in a track width direction,
   said third burst and said fourth burst in pair form are located such that the convex-form magnetic recording layers are formed with centerlines defined at positions mutually offset by a (3/4) track pitch of distance ((3/4)Tp) in the track width direction, and said third burst and said fourth burst are located such that the convex-form magnetic recording layers are formed with centerlines defined at positions offset from centerlines of said first burst and said second burst by a (1/4) track pitch of distance ((1/4)Tp),
   said fifth burst and said sixth burst in pair form are located such that the convex-form magnetic recording layers are formed with centerlines defined at positions mutually offset by a (3/4) track pitch of distance ((3/4)Tp) in the track width direction, and said fifth burst and said sixth burst are located such that the convex-form magnetic recording layers are formed with centerlines defined at positions offset from centerlines of said first burst and said second burst by a (1/2) track pitch of distance ((1/2)Tp),
   said convex-form magnetic layers are each configured in a substantially trapezoidal shape (truncated quadrangular pyramid shape) in the track width direction and in a track circumference direction, respectively, and
   said magnetic recording/reproducing system satisfies the following condition provided that Tp>W2:

$$1.5W2 \geq Wr \geq 0.5W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

20. A magnetic recording/reproducing system according to claim 19, which further satisfies the following condition:

$$\tan 85° \geq 2h/(W2-W1) \geq \tan 50°$$

where h is a height from the lower side W2 of to the upper side W1 of the convex-form magnetic recording layer.

21. A magnetic recording/reproducing system according to claim 19, which further satisfies the following condition:

$$Wr<2Tp-W$$

where W is a data track width, Wr is the magnetic read width, and Tp is the track pitch.

22. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:
   said data information recording portion comprises a data track having a data track pitch Tp,
   said servo information portion comprises a magnetic recording layer formed in a given concave-convex pattern,
   said servo information portion comprises a burst division on which tracking burst signals are recorded,
   said burst division comprises a first burst, a second burst, a third burst, a fourth burst, a fifth burst and a sixth burst, each comprising a plurality of convex-form magnetic recording layers with the burst signals recorded thereon,
   said first burst and said second burst in pair form are located such that the convex-form magnetic recording layers are formed with centerlines defined at positions mutually offset by (3/2) track pitches of distance ((3/2)Tp) in a track width direction,
   said third burst and said fourth burst in pair form are located such that the convex-form magnetic recording layers are formed with centerlines defined at positions mutually offset by (3/2) track pitches of distance ((3/2)Tp) in the track width direction, and said third burst and said fourth burst are located such that the convex-form magnetic recording layers are formed with centerlines defined at positions offset from centerlines of said first burst and said second burst by a (1/2) track pitch of distance ((1/2)Tp),
   said fifth burst and said sixth burst in pair form are located such that the convex-form magnetic recording layers are formed with centerlines defined at positions mutually offset by (3/2) track pitches of distance ((3/2)Tp) in the track width direction, and said fifth burst and said sixth burst are located such that the convex-form magnetic recording layers are formed with centerlines defined at positions offset from centerlines of said first burst and said second burst by one track pitch of distance (1Tp),
   said convex-form magnetic layers are each configured in a substantially trapezoidal shape (truncated quadrangular pyramid shape) in the track width direction and in a track circumference direction, respectively, and
   said magnetic recording/reproducing system satisfies the following conditions provided that W1>Tp:

$$1.5W2>Wr \geq 0.333W2$$

$$0.333W2<W1$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

23. A magnetic recording/reproducing system according to claim 22, which further satisfies the following condition:

$$\tan 85° \geq 2h/(W2-W1) \geq \tan 50°$$

where h is a height from the lower side W2 of to the upper side W1 of the convex-form magnetic recording layer.

24. A magnetic recording/reproducing system according to claim 22, which further satisfies the following condition:

$$Wr < 2Tp - W$$

where W is a data track width, Wr is the magnetic read width, and Tp is the track pitch.

25. A magnetic recording/reproducing system, comprising a magnetic recording medium having a data information recording portion and a servo information portion for tracking, and a magnetic head operable to detect servo information at said servo information portion and record and reproduce data information on and from said data information recording portion, wherein:

said data information recording portion comprises a data track having a data track pitch Tp, said servo information portion comprises a magnetic recording layer formed in a given concave-convex pattern, said servo information portion comprises a burst division on which tracking burst signals are recorded, said burst division comprises a first burst, a second burst, a third burst, a fourth burst, a fifth burst and a sixth burst, each comprising a plurality of convex-form magnetic recording layers with the burst signals recorded thereon, said first burst and said second burst in pair form are located such that the convex-form magnetic recording layers are formed with centerlines defined at positions mutually offset by three track pitches of distance (3Tp) in a track width direction, said third burst and said fourth burst in pair form are located such that the convex-form magnetic recording layers are formed with centerlines defined at positions mutually offset by three track pitches of distance (3Tp) in the track width direction, and said third burst and said fourth burst are located such that the convex-form magnetic recording layers are formed with centerlines defined at positions offset from centerlines of said first burst and said second burst by one track pitch of distance (1Tp), said fifth burst and said sixth burst in pair form are located such that the convex-form magnetic recording layers are formed with centerlines defined at positions mutually offset by three track pitches of distance (3Tp) in the track width direction, and said fifth burst and said sixth burst are located such that the convex-form magnetic recording layers are formed with centerlines defined at positions offset from centerlines of said first burst and said second burst by two track pitches of distance (2Tp), said convex-form magnetic layers are each configured in a substantially trapezoidal shape (truncated quadrangular pyramid shape) in the track width direction and in a track circumference direction, respectively, and said magnetic recording/reproducing system satisfies the following conditions provided that W1>Tp:

$$1.5W2 > Wr \geq 0.444W2$$

where W1 is an upper side of said trapezoidal shape in the track width direction, which corresponds to a surface of said convex-form magnetic recoding layer, W2 is a lower side of said trapezoidal shape in the track width direction, which corresponds to a bottom surface of said convex-form magnetic layer, Tp is a data track pitch at said data information recording portion, and Wr is a read width of said magnetic head.

26. A magnetic recording/reproducing system according to claim 25, which further satisfies the following condition:

$$\tan 85° \geq 2h/(W2-W1) \geq \tan 50°$$

where h is a height from the lower side W2 of to the upper side W1 of the convex-form magnetic recording layer.

27. A magnetic recording/reproducing system according to claim 25, which further satisfies the following condition:

$$Wr < 2Tp - W$$

where W is a data track width, Wr is the magnetic read width, and Tp is the track pitch.

* * * * *